(12) United States Patent
Ozair et al.

(10) Patent No.: US 12,486,189 B2
(45) Date of Patent: Dec. 2, 2025

(54) METHODS FOR MONITORING MARINE WATERBODY SUSTAINABILITY AT DISCHARGE SITES

(71) Applicant: Power and Water Utility Company for Jubail and Yanbu (MARAFIQ), Jubail Industrial (SA)

(72) Inventors: Ghazi Ozair, Sarasota, FL (US); Ali Ahmad Al-Shubaili, Yanbu Industrial (SA); Salman Atiah Al-Zahrany, Yanbu Industrial (SA)

(73) Assignee: Power and Water Utility Company for Jubail and Yanbu (MARAFIQ), Jubail Industrial (SA)

( * ) Notice: Subject to any disclaimer, the term of this patent is extended or adjusted under 35 U.S.C. 154(b) by 182 days.

(21) Appl. No.: 17/335,300

(22) Filed: Jun. 1, 2021

(65) Prior Publication Data
US 2022/0324737 A1 Oct. 13, 2022

Related U.S. Application Data

(60) Provisional application No. 63/170,479, filed on Apr. 3, 2021.

(51) Int. Cl.
*C02F 9/00* (2023.01)
*C02F 9/20* (2023.01)
*C02F 103/08* (2006.01)

(52) U.S. Cl.
CPC ............ *C02F 9/20* (2023.01); *C02F 2103/08* (2013.01); *C02F 2209/01* (2013.01); *C02F 2209/02* (2013.01); *C02F 2209/05* (2013.01); *C02F 2209/06* (2013.01); *C02F 2209/10* (2013.01); *C02F 2209/11* (2013.01); *C02F 2209/20* (2013.01); *C02F 2209/22* (2013.01); *C02F 2209/36* (2013.01)

(58) Field of Classification Search
CPC .. C02F 1/008; C02F 9/20; C02F 9/005; C02F 9/00; C02F 2103/08; C02F 2209/01; C02F 2209/02; C02F 2209/05; C02F 2209/06; C02F 2209/10; C02F 2209/11; C02F 2209/20; C02F 2209/22; C02F 2209/36
USPC ........................................................ 210/232
See application file for complete search history.

(56) References Cited

U.S. PATENT DOCUMENTS

| | | | | |
|---|---|---|---|---|
| 2009/0236286 A1* | 9/2009 | Salyer | ................. | B01D 5/0057 210/652 |
| 2015/0125212 A1* | 5/2015 | Fischmann | ............. | E02B 15/06 405/63 |
| 2016/0311703 A1* | 10/2016 | Benaissa | ............... | C02F 11/006 |
| 2018/0224164 A1* | 8/2018 | Lakic | ...................... | F24S 90/00 |

OTHER PUBLICATIONS

Abaychi, et al., "Trace Elements Geochemical Association in the Arabian Gulf", Mar. Pollut. Bull., 17(8):353-356 (1986).
Abdul-Wahhab, et al., "Levels of Heavy Metals in Sub-tidal Sediments in the Vicinity of Thermal Power/Desalination Plants: A Case Study", Desalination, 244(1-3):261-282 (2009).
Abu Qdais, "Environmental Impact of Desalination Plants on the Arabian Gulf", Proc. IDA World Cong. on Desalination & Water Reuse, San Diego, USA, 249-260 (1999).
Al-Ghabdan, et al., "Environmental Impact Assessment: Integrated Methodology—A Case Study of Kuwait, Arabian Gulf", Coastal Management, 21(4):271-298 (1993).
Al-Gobaisi, "A quarter-century of seawater desalination by large multistage flash plants in Abu Dhabi (Plant performance analysis, assessment, present efforts toward enhancement and future hopes)", Desalination, 99(2-3):509-512 (1994).
Belkin, et al., "Rapid warming of large marine ecosystems, Progress in Oceanography", 81:207-213 (2009).
Boyer, et al., "Objective analyses of annual, seasonal, & monthly temperature & salinity for the World Ocean on a 0.25-degree grid", Int. Jour. Climatol., 25(7):931-945 (2005).
Burrows, et al., "Geographical limits to species-range shifts are suggested by climate velocity", Nature, 507:492-495 (2014).
Burrows, et al., "The pace of shifting climate in marine & terrestrial ecosystems", Science, 334:652-655 (2011).
Caldera, et al., "Learning curve for seawater reverse osmosis Desalination plants: capital cost trend of the past, present, & future", Water Resour. Res., 53(12):10523-10538 (2017).
Cantin, et al., "Ocean warming slows coral growth in the central Red Sea", Science, 329:322-325 (2010).
Chaidez, et al., "Decadal trends in Red Sea maximum surface temperature", Scientific Reports, 7:8144 (2017).
Chen, et al., "Distribution of Extracellular Polymeric Substances in Aerobic Granules", Appl. Microbiol. Biotechnol., 73:1463-1469 (2007).

(Continued)

*Primary Examiner* — Akash K Varma
(74) *Attorney, Agent, or Firm* — Pabst Patent Group LLP

(57) ABSTRACT

Described are methods for monitoring marine water-body sustainability at a site of discharge of water into the water-body. Typically, the discharge of water occurs at a discharge of streams, rivers, water purification plants, water desalination plants, power plants, and discharge of oil refineries. The methods provide for daily, quarterly, as well as annual monitoring of water-body quality to ensure sustainability. The methods typically include establishing monitoring sites at a plurality of designated distances from the site of discharge, at a plurality of designated depths at the monitoring sites, and obtaining samples from the water-body at the monitoring sites. Interrogating the obtained samples for physical and chemical monitoring, biological monitoring, biochemical and organic monitoring, microbial monitoring, and phylogenetic analysis, as well as monitoring the sites for marine observational surveys, helps establish the marine water-body sustainability at a site of discharge.

24 Claims, 8 Drawing Sheets

(56) References Cited

OTHER PUBLICATIONS

Chen, et al., "Utilization of Oxygen in a Sanitary Gravity Sewer", Water Res., 34(15):3813-3821 (2000).
Christy, et al., "Characterization of Natural Organic Matter by Pyrolysis/GC-MS", Environ. International, 25(2-3):181-189 (1998).
Cole, et al., "The Ribosomal Database Project—Improved Alignments and New Tools for rRNA Analysis", Nucleic Acids Research, 37:D141-145 (2009).
Dalvi, et al., "Studies on Organic Foulants in the Seawater Feed of Reverse Osmosis Plants of SWCC", Desalination, 132(1-3):217-232 (2000).
Darre, et al., "Desalination of water: a review", Curr. Pollut., 5 Rep:1-8 (2018).
Dawoud, et al., "Environmental Impacts of Seawater Desalination: Arabian Gulf Case Study", International Journal of Environment & Sustainability, 1(3):22-37 (2012).
Djuma, et al., "non-conventional water resources research in semi-arid countries of the Middle East", Desalin. Water Treat., 57(5):2290-2303 (2016).
Dowd, et al., "Evaluation of the Bacterial Diversity in the Feces of Cattle Using 16s rDNA Bacterial Tag-encoded FLX Amplicon Pyrosequencing (bTEFAP)", BMC Microbiology, 8(1):125 (2008a).
Dowd, et al., "Survey of Bacterial Diversity in Chronic Wounds Using Pyrosequencing, DGGE, and Full Ribosome Shotgun Sequencing", BMC Microbiol., 8:43 (2008b).
Drami, et al., "Seawater Quality & Microbial Communities at a Desalination plant marine Outfall—A Filed Study at the Israeli Mediterranean Coast", Water Research, 45(17):5449-5462 (2011).
Elshorbagy, et al., "Risk Assessment Maps of Oil Spill for Major Desalination Plants in United Arab Emirates", Desalination, 228:200-216 (2008).
Fernandez-Torquemada, et al., "Dispersion of brine discharge from seawater reverse osmosis Desalination plants", Desalination & Water Treatment, 5:137-145 (2009).
Fishelson, et al., "Ecology & distribution of the benthic fauna in the shallow waters of the Red Sea", Marine Biology, 10:113-133 (1971).
Flemming, et al., "Biofouling—The Achilles Heel of Membrane Processes", Desalination, 113(2-3):215-225 (1997).
Ghaffour, et al., "Technical review & evaluation of the economics of water Desalination: current & future challenges for better water supply sustainability", Desalination, 309:197-207 (2013).
Gushing, et al., "Biological Response in the Sea to Climatic Changes", Adv. Mar. Biol., 14:1-122 (1977).
Hammond, "Seawater desalination plant for Southern California", Desalination, 99(2-3):483-508 (1994).
Hoepner, et al., "Chemical Impacts from Seawater Desalination Plants—A Case Study of the Northern Red Sea", Desalination, 152:133-140 (2002).
Hong, et al., "Monitoring Airborne Biotic Contaminants in the Indoor Environment of Pig & Poultry Confinement Buildings", Environ. Microbio., 14(6):1420-1431 (2012).
Hopner, et al., "Elements of Environmental Impact Studies on Coastal Desalination Plants", Desalination, 108(1-3):11-18 (1996).
Huber, et al., "Characterization of Aquatic Humic and Non-humic Matter with Size-exclusion Chromatography—Organic Carbon Detection—Organic Nitrogen Detection (LC-OCD-OND)", Water Res., 45:879-885 (2011).
Hwang, et al., "*Ponticoccus litoralis* gen. nov., Sp. nov., a marine bacterium in the family Rhodobacteraceae", Int. Jour. Syst. Evol. Micr., 58:1332-1338 (2008).
Jawwad, et al., "Impact of Current Power Generation & Water Desalination Activities on Kuwaiti Marine Environment", Proc. IDA World Congress on Desalination & Water Reuse, San Diego, USA, Aug. 29-Sep. 3, 231-240 (1999).
Johns, et al., "Arabian marginal seas and gulfs", University of Miami RSMAS technical report, Jan. 2000, 60 (1999).
Kinne, et al., "The effect of Temperature and Salinity on Marine and Brackish Water Animals, I. Temperature", Oceanogr. Mar. Biol Ann. Review, 1:304-340 (1963).
Kirchman, et al., "Biogeography of major bacterial groups in the Delaware estuary", Limnol. Oceanogr., 50: 1697-1706 (2005).
Lange, "Isosmotic Intracellular Regulation and Euryhalinity in Marine Bivalves", J. Exp. Mar. Bio. Ecol., 5(2):170-179 (1970).
Latif, et al., "Trihalomethane Formation in Multistage Flash Distillation Plants", Desalination, 74: 205-226 (1989).
Lattemann, "Development of an Environment Impact Assessment & Decision Support System for Seawater Desalination Plants", 2010 Dissertation on webpage <repository.tudelft.nl>, retrieved from webpage < https://repository.tudelft.nl/islandora/object/uuid%3Afe9c27c4-6329-4314-9ae3-5d2e5fc11e28?collection=research>, (Oct. 21, 2022).
Lattemann, "How Has Desalination Affected the Arabian Gulf?", IDA Journal of Desalination and Water Reuse, 3(1):12-13 (2011).
Lattemann, et al., "Environmental impact and impact assessment of seawater deslaination", Desalination, 220:1-15 (2003).
Lebaron, et al., "Does the High Nucleic Acid Content of Individual Bacterial Cells Allow Us to Discriminate Between Active Cells & Inactive Cells in Aquatic Systems?", Applied and Environ. Microbio., 67(4):1775-1782 (2001).
Leenheer, et al., "Comprehensive Isolation of Natural Organic Matter from Water for Spectral Characterizations & Reactivity Testing", Natural Organic Matter & Disinfection By-Products, 5:68-83 (2000).
Leenheer, et al., "Systematic Approaches to Comprehensive Analyses of Natural Organic Matter", Ann. Environ. Sci., 3:1-130 (2009).
Leenheer, et al., "Terpenoids as Major Precursors of Dissolved Organic Matter in Landfill Leachates, Surface Water & Ground Water", Environ. Sci. Technol., 37(11):2323-2331 (2003).
Majewski, et al., "Predicting Effects of Power Plant Once-Through Cooling on Aquatic Systems", UNESCO, (1979).
Malik, et al., "Materials Performance & Failure Evaluation in SWCC MSF Plants", Desalination, 97(1-3): 171-187 (1994).
Manes, et al., Dynamic Bacterial Communities on Reverse-Osmosis Membranes in a Full-scale Desalination Plant, Biofouling, 27(1):47-58 (2011b).
Manes, et al., "Impact of Seawater-Quality and Water Treatment Procedures on the Active Bacterial Assemblages at Two Desalination Sites", Environ. Sci. Technol., 45(14):5943-5951 (2011a).
Mayan, et al., "Monitoring of Oil Spill Contaminants on Water Samples from SWCC Desalination Plants at Al-Jubail and Al-Khobar", Research Activities & Studies, Research & Technical Affairs Department, SWCC, vol. II:156-181 (1991).
Mekonnen, et al., "Four billion people facing severe water scarcity", Sci. Adv., 2(2): e1500323 (2016).
Mohsen, et al., "Brackish Water Desalination: An Alternative for Water Supply Enhancement", Desalination, 124:163-174 (1999).
Morris, et al., "SAR11 Clade Dominates Ocean Surface Bacterioplankton Communities", Nature, 420:806-810 (2002).
Nanninga, et al., "Environmental gradients predict the genetic population structure of a coral reef fish in the Red Sea", Mol. Ecol., 23(3):591-602 (2014).
Ngugi, et al., "Biogeography of pelagic bacterioplankton across an antagonistic temperature salinity gradient in the Red Sea", Molecular Ecology, 21(2):388-405 (2012).
Ozair, et al., "Best Practices in the Management of Disinfection By-Products & Their Formation Potential", submitted for presentation at the International Desalination Association World Congress on Desalination and Water Reuse, (2013b).
Ozair, et al., "Brine Disposal Implications on Near-shore Physico-Chemical Quality of Marine Environment", Proceed. IDA World Cong. on Desalination & Water Re-Use, (2013a).
Poloczanska, et al., "Global imprint of climate change on marine life", Nature Climate Change, 3:919-925 (2013).
Price, et al., "Abundance of Zooplankton and Peneid Shrimp Larvae in the Western Gulf—Analysis of Pre-War and Post-War Data", Mar. Pollut. Bull., 27: 273-278 (1993).
Raitsos, et al., "Abrupt warming of the Red Sea", Geophysical Research Letters, 38:L14601 (2011).
Raitsos, et al., "Remote sensing the phytoplankton seasonal succession of the Red Sea", PloS one, 8:e64909 (2013).
Raitsos, et al., "Sensing coral reef connectivity pathways from space", Sci. Rep., 7:9338 (2017).

(56) References Cited

OTHER PUBLICATIONS

Reasoner, et al., "A New Medium for the Enumeration and Subculture of Bacteria from Potable Water", Appl. Environ. Microbiol., 49(1):1-7 (1985).
Richter, et al., "Tapped out: how can cities secure their water future?", Water Policy, 15(3):335-363 (2013).
Rijsberman, "Water scarcity: Fact or fiction?", Agric. Water Manag., 80(1-3):5-22 (2006).
Roberts, et al., "Impacts of Desalination plant Discharges on the Marine Environment: A Critical Review of Published Studies", Water Research, 44(18):5117-5128 (2010).
Rogers, "The Global State of the Ocean: Interactions between Stresses, Impacts and Some Potential Solutions", Marine Pollution Bulletin, 74(2):491-552 (2013).
Rohling, et al., "Glacial conditions in the Red Sea", Paleoceanography, 9(5):653-660 (1994).
Roik, et al., "Spatial & seasonal reef calcification in corals and calcareous crusts in the central Red Sea", Coral Reefs, 35:681-693 (2016).
Saenz-Agudelo, et al., "Seascape genetics along environmental gradients in the Arabian Peninsula: Insights from ddRAD sequencing of anemonefishes", Mol. Ecol., 24(24):6241-6255 (2015).
Safrai, et al., "Environmental Regulations for Discharging Desalination Brine to the Sea & Its Possible Impacts", Ministry of Environmental Protection, Israel, Web page <ildesal.org.il/pdf/130.pdf>.
Sawall, et al., "Spatio-temporal analyses of Symbiodinium physiology of the coral Pocillopora verrucosa along large-scale nutrient & temperature gradients in the Red Sea", PloS one, 9(8):e103179 (2014).
Schewe, et al., "Multimodel assessment of water scarcity under climate change", PNAS, 111(9):3245-3250 (2014).
Schmitt, et al., "FTIR Spectroscopy in Microbial & Material 5 Analysis", International Biodeterioration & Biodegradation, 41:1-11 (1998).
Shams, et al., "Electricity & Water Production in the Emirate of Abu Dhabi & Its Impact on the Environment", Desalination, 97(1-3):373-388 (1994).
Shams, et al., "On the Chlorination of Seawater", Desalination, 129(1):53-62 (2000).
Sherman, et al., "Accelerated warming & emergent trends in fisheries biomass yields of the world's large marine ecosystems", AMBIO, 38(4):215-224 (2009).
Siccha, et al., Factors controlling the distribution of planktonic foraminifera in the Red Sea & implications for the development of transfer functions, Mar. Micropaleontol., 72(3):146-156 (2009).
Sofianos, et al., "Heat & freshwater budgets in the Red Sea from direct observations at Bab el Mandeb", Deep Sea Res. Part III. Topical Studies in Oceanography, 49 (7-8):1323-1340 (2002).
Sood, et al., "Can desalinization & clean energy combined help to alleviate global water scarcity?", Jour. Am. Water Resour. Assoc., JAWRA-13-0021-P (2014).
Stillman, "Acclimation capacity underlies susceptibility to climate change", Science, 301:65-65 (2003).
Sweet, et al., "Development of Bacterial Biofilms on Artificial Corals in Comparison to Surface-Associated Microbes of Hard Corals", PLoS ONE, 6(6):e21195 (2011).
Train, et al., "Development Document for Best Technology Available for the Location, Design, Construction and Capacity of Cooling Water Adverse Environmental Impact", (1976).
Venkatesan, et al., "Salinity reduction & energy conservation in direct & indirect potable water reuse", Desalination, 272:120-127 (2011). doi:10.1016/j.desal.2011.01.007.
Wenner, et al., "Project Financing of Desalination Facilities", Desalination, 102(1-3):119-153 (1995).
World Bank, "The Role of Desalination in an Increasingly Water-Scarce World", p. 93 (2019).
Zimmermann, et al., "US-EPA Method #440.0: Determination of Carbon & Nitrogen in Sediments & Particulates of Estuarine/Coastal Waters Using Elemental Analysis", US Environmental Protection Agency (1997).

* cited by examiner

METHODS FOR MONITORING MARINE WATERBODY SUSTAINABILITY AT DISCHARGE SITES

CROSS-REFERENCE TO RELATED APPLICATIONS

This application claims benefit of U.S. Provisional Application No. 63/170,479, filed Apr. 3, 2021. Application No. 63/170,479, filed Apr. 3, 2021, is hereby incorporated herein by reference in its entirety.

FIELD OF THE INVENTION

The disclosed invention is generally in the field of marine water-body sustainability and specifically in the area of continuous and periodic monitoring for marine water-body sustainability at and around sites of discharge into the water-body.

BACKGROUND OF THE INVENTION

The world has witnessed a remarkable progress in desalination industry offering a perpetual source of fresh water to the traditionally water deficient regions. At present, globally the desalination plants pump out about 142 $Mm^3/d$ of salty brine to produce a total of 95 $Mm^3$ of fresh water. About 55% of the total brine is produced in the Middle East by Saudi Arabia, United Arab Emirates and Qatar. The hyper-salty water is mostly pumped back into the sea as surface coastal discharge, which modifies the water quality in the discharge area as a result of continuous flow of the effluents. Apparently, the elevations of temperature and salinity are the most common effects. This brine comprises of about 5% salt compared to about 3.5% in the ambient seawater, and often includes traces of toxins, such as chlorine, copper, biocides, etc., which are used in desalination processes. It is assumed that the waste chemicals present in the effluents from desalination plants "accumulate in the environment and can have toxic effects in fish" and pose potential threat to the marine environment and the diversity of aquatic species. Brine can cut levels of oxygen in seawater near desalination plants with "profound impacts" on shellfish, crabs and other creatures on the seabed, leading to "ecological effects observable throughout the food chain". Brine "could be a serious issue in a small water-body" like an inland lake. Some environmental concerns grew to such an extent that raised alarm for the desalination plants, particularly on Arabian Gulf coastline, viz., "No time to whine about brine, could Gulf States reach peak salt?" or "The Gulf: a young sea in decline", "Are the world's Oceans on the Brink of Disaster?", "The hyper-salty water . . . , over a year, would be enough to cover the U.S. state of Florida with 30 cm of brine", etc., assuming that fast-growing desalination technology "is not a sustainable" solution to water scarcity in the region.

Despite significant developments of the desalination industry offering uninterrupted supply of drinking water to water scarce regions, the awareness and real-time data about the impacts of concentrated brine disposal on marine ecosystem is very limited. Inadequate published literature and lack of spatio-temporal data are the main drive to steer all above mentioned environmental concerns.

There remains a need for methods to effectively evaluate marine water sustainability at sites of water discharge into water-bodies from industrial plants.

Therefore, it is an object of the invention to provide methods for spatio-temporal evaluation of marine water-body sustainability at a site of discharge into a water-body.

It is a further object of the invention to provide methods for processing samples for the spatio-temporal evaluation of marine water-body sustainability at a site of discharge into a water-body.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

Disclosed are methods for monitoring marine water-body sustainability at a site of discharge. The methods typically include establishing monitoring sites at a plurality of designated distances from the site of discharge, at a plurality of designated depths at the monitoring sites, and obtaining samples from the water-body at the monitoring sites. The samples are typically obtained over time, and provide a spatio-temporal sampling of marine water-body sustainability at a site of discharge into a water-body. The sites and samples taken from the sites are typically processed for evaluating physico-chemical composition, oceanographic features, marine organism content, species diversity, and microbial strains and diversity.

The method uses biodiversity as a reliable quantitative tool to evaluate the environmental impacts of anthropogenic activities, particularly coastal brine discharge, on marine ecosystem. This provides spatio-temporal evaluation of marine water-body sustainability at a site of discharge into a water-body. The spatio-temporal evaluation evaluates 1) actual immediate impacts on primary production and 2) overall impacts on biotic resources of discharge into marine water-body, thereby providing short-term acute and long-term cumulative impacts on living resources.

The discharge into the water-body may be discharge of streams, discharge of rivers, discharge from dams, discharge of water purification plants, discharge of water desalination plants, discharge of power plants, discharge of oil refineries, cement plants, leather tanneries, pharmaceuticals plants, chemical plants, agricultural runoffs, municipal sewage dumping, and discharge from floods or storm-water into the water-body. The site of discharge may be a site of discharge from desalination plants.

The monitoring sites may be a Mixing Zone work station, Recovery Zone work station, control work station. Typically, the monitoring sites are positioned at a plurality of designated distances from the site of discharge. The designated distances may be between about 45 m and 55 m offshore (far from the immediate brine outfall, Mixing Zone work station); between about 95 m and 105 m offshore (Recovery work station); and between about 1,250 and 1,750 m offshore from the closest seashore (control work station). Typically, the monitoring sites are also positioned at a plurality of designated depths. The designated depths may be one or more of depths between about 0 m and about 5 m, between about 5 m and about 10 m, between about 25 m and about 30 m, and the seabed.

The method may include obtaining samples at the monitoring sites prior to any discharge. This typically establishes the baseline samples for monitoring. The method may include obtaining samples at the monitoring sites for the first time before any discharge. This typically establishes the baseline samples for monitoring. The method also includes obtaining test samples at the monitoring sites after obtaining the baseline samples. The baseline samples and the test samples may be obtained daily, every three months, and/or annually.

The samples may be processed for any one or more of physical and chemical monitoring; marine observational surveys; biological monitoring; biochemical and organic monitoring; microbial monitoring; and phylogenetic analysis.

The samples are typically processed to measure temperature, salinity, density, total hardness, total suspended solids (TSS), turbidity, hydrogen ion concentration (pH), electrical conductivity, dissolved oxygen (DO), total dissolved solids (TDS), heavy metals, residual $Cl_2$, disinfection byproducts (DBPs), petroleum hydrocarbons (PHCs), persistent organic pollutants (POPs), polychlorinated biphenyls (PCBs), and other chemical compositions for physical and chemical monitoring.

Typically, the monitoring sites are physically surveyed and marine habitats are enumerated and accounted for marine observational surveys. The samples may be processed for assessing plankton health, for nutrient analysis, for biochemical and organic monitoring, for adenosine-5'-triphosphate (ATP) analysis, heterotrophic plate count (HPC) analysis, and microbial cell counts, and algal cell counts for microbial monitoring. The samples may be processed using 16S ribosomal RNA gene pyro-sequencing for phylogenetic analysis.

Typically, the methods identify the marine water-body at a site of discharge as sustainable when data from the test samples correspond to between about 90% and 100% of the data from the baseline samples, establishing zero or minimal impact of the discharge.

Typically, the methods identify the marine water-body at a site of discharge as moderately sustainable when data from the test samples correspond to between about 80% and about 90% of the data from the baseline samples, establishing some or moderate impact of the discharge.

Typically, the methods identify the marine water-body at a site of discharge as marginally or partially sustainable when data from the test samples correspond to between about 70% and about 80% of the data from the baseline samples, establishing partial or noticeable impact of the discharge.

Typically, the methods identify the marine water-body at a site of discharge as not sustainable when data from the test samples correspond to below about 70% of the data from the baseline samples, establishing alarming impact of the discharge.

The methods are particularly important for monitoring marine water-body sustainability in waterbodies undergoing natural seasonal fluctuations in biodiversity. The natural seasonal fluctuations in biodiversity may be due to water currents unique to the water-body, animal migration, and/or biological life cycles of the marine organisms at the discharge site.

Additional advantages of the disclosed method will be set forth in part in the description which follows, and in part will be understood from the description, or may be learned by practice of the disclosed method. The advantages of the disclosed method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed method and together with the description, serve to explain the principles of the disclosed method.

DETAILED DESCRIPTION OF THE INVENTION

Figure 1:
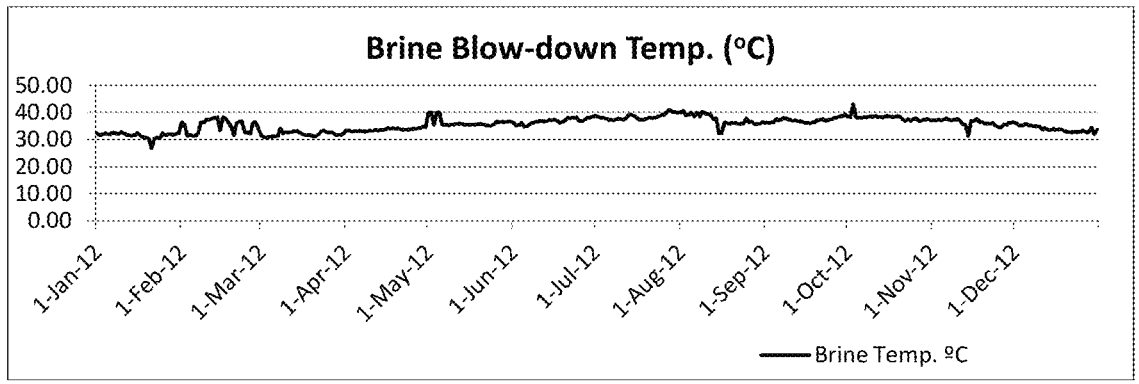
FIG. 1 is a graph showing brine blow-down temp. (° C.) over time (Prior Art).

The disclosed method may be understood more readily by reference to the following detailed description of particular embodiments and the Example included therein and to the Figures and their previous and following description.

Disclosed herein are methods of assessing and maintaining the sustainability of the water-body, wherein concentrated brine is discharged from the desalination facilities.

It is to be understood that the disclosed method are not limited to specific analytical techniques, or to particular reagents unless otherwise specified, and, as such, may vary. It is also to be understood that the terminology used herein is for the purpose of describing particular embodiments only and is not intended to be limiting.

A. Definitions

As used herein, the term "baseline sample" refers to a sample of water-body obtained at the monitoring sites prior to any discharge, including any discharge in case of new desalination plants, or obtained for the first time after any discharge, including after any discharge in case of assessing the existing or already in operation plant. The baseline sample may be replicate samples obtained daily, every three months (quarterly), and/or annually.

As used herein, the term "test sample" refers to a sample of water-body obtained at the monitoring sites prior or after any discharge. The test sample may be replicate samples obtained daily, every three months (quarterly), and/or annually.

As used herein, the term "sustainability" refers to lack of significant change in marine water-body over a period of time. The period of time may be several months to several years. Lack of significant change may be presented by an estimated marine water-body biodiversity in the test sample that corresponds to between about 80% and 100% of an estimated marine water-body biodiversity in the baseline sample obtained for the same period of time in the year. The estimated marine water-body biodiversity is estimated by any one of identification of microbial strains, characterization of microbial diversity, and taxonomic affiliation of the sequences.

The methods identify the marine water-body at a site of discharge as "sustainable" when data from the test samples correspond to between about 90% and 100% of the data from the baseline samples, establishing zero or minimal impact of the discharge.

The methods identify the marine water-body at a site of discharge as "moderately sustainable" when data from the test samples correspond to between about 80% and about 90% of the data from the baseline samples, establishing some or moderate impact of the discharge.

The methods identify the marine water-body at a site of discharge as "marginally sustainable" or "partially sustainable" when data from the test samples correspond to between about 70% and about 80% of the data from the baseline samples, establishing partial or noticeable impact of the discharge.

As used herein, the term "brine" or "concentrate" refers to "residual", "reject", "brine blow-down", or "effluent" water released from a seawater desalination plant.

B. Marine Water-Bodies Used for Discharge and Intake

1. Marine Water-Bodies for Discharge and Intake

Marine water-bodies affected by discharge due to anthropologic activities include water-bodies surrounding or flowing through heavily populated regions of the world where the neighboring nations sharing these water-bodies exploit these marine resources to discharge comparatively warmer and concentrated brine into these water-bodies.

The different water-bodies differ in their oceanographic features, including currents, waves, tides, stratification, discharge transport patterns, buoyancy, discoloration due to residual pretreatment chemicals, and ultimate fate of the discharge.

Figure 7:
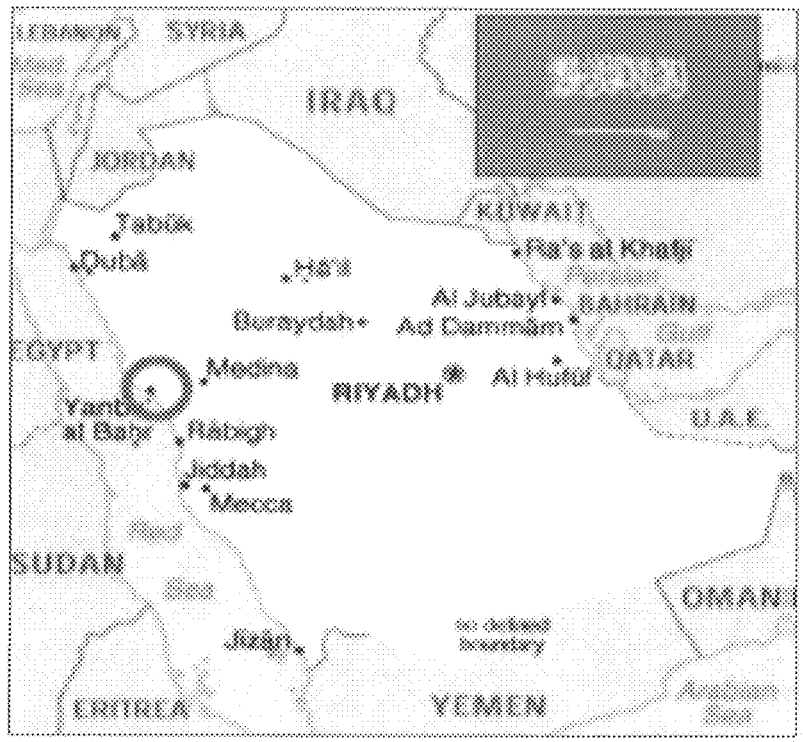
FIG. 7 is a map of the geographical location of the Marafiq facility at Yanbu Al-Bahar (Prior Art).

For the desalination industry in the Middle East region, some studies were carried out by Power and Water Utility Company for Jubail and Yanbu (Marafiq), assessing the impacts of concentrated brine disposal on the physico-chemical quality of the near-shore marine system and also examining all possible effects of long term brine disposal on the ecosystems adjacent to Marafiq's Power & Desalination Plant at Yanbu. Marafiq is one of the private sector desalination facility in the Kingdom of Saudi Arabia, situated at about 350 Km northwest of Jeddah port city on the Red Sea coast (FIG. 7). The facility consists of two Phases, Y-1 and Y-2. Phase Y-1 comprises three Multistage Flash desalination (MSF) evaporators, two Multi-Effect Distillation/Thermal Vapor Compression (MED/TVC) units, six Seawater Reverse Osmosis (SWRO) and three Brackish Water Reverse Osmosis (BWRO) trains with a net installed production capacity of 152,400 $m^3$/day. Whereas, phase Y-2 consists of two MED/TCD units with a total production capacity of 62,900 $m^3$/d. The Y-1 Plants started commercial operation in several stages, viz., two MSF in 1997, one MSF in 1999, SWRO trains in 2006, BWRO in 2010, MED/TVC in 2013 and Y-2 MED/TCD in September 2016.

The site under study is characterized by several special features, such as south to northwards bound seawater currents, high Biological Activity in the ecosystem, unstable weather conditions, abruptly changing seawater conditions, particularly the Turbidity, 7 desalination and power complexes within a coastal stretch of about 20 km, viz., SWCC-Yanbu-I MSF, SWCC SWRO, SWCC-MED, SWCC Yanbu-III MSF, NOMAC SWRO Barges, Marafiq-YII MED and Marafiq-YI MSF, MED, SWRO, huge Petrochemical industries, nearby Aramco's oil-loading facility and a zone of heavy shipping/tankers' traffic.

This desalination facility was exclusively selected for the study to assess the long-term cumulative impact of the brine disposal. Since Marafiq-Y1 has been operational for over 3 decades, there was potential that the plume characterized by elevated temperature, higher salt concentration and low velocity might have distinct detrimental effect on the marine ecology during this extended period.

The changes in the physico-chemical quality of live seawater resource due to warm and concentrated brine effluents discharged by nearby power and desalination plants are generally anticipated to affect the biodiversity and disrupt the distribution of marine production and food chains. The detailed accounts on the influence of all water quality parameters likely to prevail near shore on the ecosystem resulting in some biological changes at microscopic level, particularly on the microscopic species floating freely in seawater column, were discussed in this study.

The following two examples of marine water-bodies are illustrative of the complexity of oceanographic features which should be considered when monitoring a discharge site for sustainability. These examples should not be construed as limiting for the described methods. The methods for monitoring marine water-body sustainability may be equally applied to monitoring marine water-body sustainability at any discharge site, including the discharge sites mentioned above.

a. The Red Sea
1 Topographic Features of the Red Sea

The Red Sea, also known in Arabic as "Al-Bahr Al-Ahmar" or "Bahr Al-Qalzam", is semi-enclosed by the deserts, unique in characteristics amongst other deep-water-bodies in the world. It is a seawater inlet of the Indian Ocean, lying between Africa and Asia. It has a natural connection with the Gulf of Aden in south through the shallow and narrow straits of Bab Al-Mandeb, a 28 km wide opening with a sill depth of 130 m. In south a line exists joining Husn Murad (12° 40'N43° 30'E12.667° N 43.500° E12.667; 43.500) and Ras Siyyan (12° 29'N 43° 20'E12.483° N 43.333° E12.483; 43.333), whereas in north, there are Sinai Peninsula, the Gulf of Aqaba and the Gulf of Suez, which connects the Red Sea with the Mediterranean Sea through Suez Canal. The Gulf of Aqaba is a line running from Ras Al-Fasma southwesterly to Requin Island (27° 57'N 34° 36'E27.950° N 34.600° E27.950; 34.600) through Tiran Island to the southwest point thereof and thence westward on a parallel (27° 54'N) to the coast of the Sinai Peninsula and Gulf of Suez is a line running from Ras Muhammed (27° 43'N) to the south point of Shadwan Island (34° 02'E) and thence westward on a parallel (27° 27'N) to the coast of Africa [14, 21].

The Red Sea has a surface area of roughly $438-450 \times 10^2$ $km^2$. It is about 2,250 km long and its widest point is 355 km wide at Massawa (Eritrea). Its average width is 280 km and the minimum 26 km at Bab Al-Mandeb Strait (Yemen). Approximately 40% of the Red Sea is quite shallow (under 100 m) and about 25% is under 50 m deep. About 15% of the Red Sea is over 1.0 km depth that forms the deep axial trough. It has a maximum depth of 2.211 km in the central median trench and the average depth of 490 m. The center of Red Sea has a narrow trough (about 1.0 km; some depths may exceed 2.2 km also). The continental slope has an irregular profile (series of steps down to about 500 m). There are extensive shallow shelf breaks marked by Coral Reefs. It is the world's northernmost tropical sea containing an estimated a volume of 233,000 $km^3$. 79% of the eastern Red Sea coastline has numerous coastal inlets [14, 21, 22].

The Red Sea is thus critically placed between two marine systems. The Gulf of Aqaba is only 30 km wide, but very steep-sided and deep, reaching a maximum depth of 1.8 km near the east coast. It is separated from the Red Sea by the Tiran sill of about 250-300 m deep. There is a net inflow into the Red Sea from south and outflow in north into Mediterranean Sea in order to maintain the overall water balance, as reported by Edwards and Head (1986) [136]. The sea is underlain by the Red Sea Rift, which is part of the Great Rift Valley. An outstanding oceanographic feature of the Red Sea is that there exists a relatively stable double-layered current system in which the surface water from the Gulf of Aden enters the Red Sea as a surface-current and the deep water from the Red Sea flows out to the Gulf of Aden as a subsurface-current. Thus, the Red Sea surface water maintains a constant drift towards the north bathing the coasts.

Due to the very high evaporation rates in this basin (up to about 2 m/yr) [23, 24], low mean annual rainfall from 3 mm/yr (North) to 150 mm/yr (South) [25] and no significant rivers flowing into the basin, the basin is characterized by a pronounced antiestuarine circulation [26]. Since surface waters flow northward while evaporating, result in a strong south-north gradient in salinity. Due to higher rate of evaporation, the surface water becomes denser with salinity reaching up to 42.5 parts per thousand (ppt) in north, i.e., in the Gulf of Suez, while a thin layer of water flows out into Mediterranean Sea. The main layer, which is denser, cooler and more saline, sinks in the Red Sea at a depth of 250-300 m, returns southward and exits at Bab Al-Mandeb beneath the inflowing surface waters. The estimated renewal time for the upper 250 m water is 6 years and 200 years for the whole Red Sea water [14, 21]. Monsoonal winds cause seasonal contrasts, also influencing exchange through Bab Al-Mandeb. During the summer monsoon, circulation becomes three layered due to a wind-driven upper surface layer flowing into the Gulf of Aden [27]. This change in monsoonal strength between summer and winter does not affect salinities noticeably (World Ocean Atlas (WOA) 2001) [28]. However, maximum temperatures become ~2° C. lower at the southernmost position [28]. The temperature gradient opposes the salinity gradient, with temperatures increasing from north to south.

2 Climatic Features of the Red Sea

The Red Sea is a semi-enclosed, extremely warm sea basin, experiencing rapid warming [29-32]. Between 1982-2006, the average annual temperature of the Red Sea increased by 0.74° C. [30], comparable to the global average of 0.85° C. [33]. An intense warming event occurred in 1994 leading to a 0.7° C. increase in the mean annual Sea Surface Temperature (SST) [31]. The latest average temperatures in the Red Sea exceed those of other tropical regions [34, 35]. Although it is considered a fast warming, large marine ecosystem, its thermal regimes and evolution remain largely unresolved [30, 36]. Yet, the Red Sea hosts one of the largest reef systems in the world, where organisms may be already close to their thermal limits. The available analyses of thermal regimes in the Red Sea focus on annual mean values [31, 32, 37, 38], rather than the dynamics of maximum temperature. Chaidez V., et al., [39] have characterized the variability in temperature maxima (Tmax) across the Red Sea over 1982-2015 based on daily values, identifying the rates of change in annual maximum SST and the distribution of anomalies relative to Tmax over time.

3 Climatic Impacts on the Red Sea Marine Organisms

The Red Sea is one of the warmest and most saline basins in the world, characterized by an arid tropical climate regulated by the monsoon. These extreme conditions are particularly challenging for marine life. Ocean warming with climate change [33] is creating challenges for the organisms, which accommodate to warming by shifting their distribution pole-ward and advancing their phenology [40]. While parts of the ocean may be warming gradually, others may experience rapid fluctuations, tipping points or extreme weather events, such as heat waves, likely inducing greater impacts on the biodiversity [33]. Extreme heat events, such as ocean heat waves, are also major concerns for coral reefs as they may lead to bleaching [41]. Thermal collapse, which is determined by the temperature exceeding thermal capacity of the organisms [42], depends on maxima instead of the mean temperature the organisms experience. It is important particularly for the Red Sea where the max. seawater temperatures are extremely high. The magnitude and duration of such events is very important for the organisms experiencing temperature anomalies outside their optimal thermal ranges. High temperature anomalies of air and water are also linked to stratification of the water column, potentially diminishing $O_2$ levels and/or increasing microbial virulence, thus causing mass mortality of the organisms and disrupting community structure. The impacts of warming are likely to be the greatest in semi-enclosed seas, like the Red Sea, making these water-bodies climatic sink seas for marine organisms [43] because the capacity of the organisms to adapt to warming by shifting their biogeographical range pole-ward is limited due to continental masses [44].

4 The Red Sea Microbial Diversities

The Red Sea is a unique marine ecosystem with contrasting gradients of temperature and salinity along its north-to-south axis. It is an extremely oligotrophic environment characterized by perpetual year-round water column stratification, high annual solar irradiation and negligible riverine and precipitation inputs. Ngugi, et al., investigated whether the contemporary environmental conditions shape community assemblages by pyro-sequencing 16S rRNA genes of bacteria in surface water samples collected from the northeastern half of this water-body. A combined total of 1855 Operational Taxonomic Units (OTUs) were recovered from the 'small-cell' and 'large-cell' fractions. A few major OTUs affiliated with cyanobacteria and proteobacteria accounted for about 93% of all sequences, whereas a tail of 'rare' OTUs represented most of the diversity. OTUs allied to Surface 1a/b SAR11 clades and prochlorococcus related to the high-light-adapted (HL2) ecotype were the most widespread and predominant sequence types. The frequency of taxa typically found in the upper mesopelagic zone was significantly elevated in the northern transects compared to those in the central, presumably as a direct effect of deep convective mixing in the Gulf of Aqaba and water exchange with the northern Red Sea. Although temperature was the best predictor of species richness across all major lineages, both spatial and environmental distances correlated strongly with phylogenetic distances. The results suggested that the bacterial diversity of the Red Sea is as high as in other tropical seas and evidenced for fundamental differences in the biogeography of pelagic communities between the northern and central regions [45].

5 Salinity Impacts on the Red Sea Microbial Diversity

Salinity, as physical determinant, has a biological relevance by influencing media density, which requires osmoregulatory functions of organisms. The salinity gradient modifies the microbial composition and affects distinct microbial functions in the ecosystem. Mezger, et al., reported annual average salinity with average annual sea-surface temperature (SST) at 9 sampling intervals, each covering about 225 km on the south to north transect in the Red Sea [46]. The annual average salinity and SST data is derived from the World Ocean Atlas (WOA, 2001) [28].

Studies have shown the dominance of Alphaproteobacteria in the higher salinity regions. Actinobacteria and betaproteobacteria decrease with increasing salinity [47] whereas the abundance of the cytophaga-flavobacterium (CF) cluster does not show a clear relationship with salinity. Bacterial diversity was examined applying 16S rRNA/rRNA gene Tag pyrosequencing analyses, resulting in biogeographical and microbial richness mapping on a high resolution three-dimensional basis. Bacterial community succession along the salinity gradient was studied using Roche-454 pyrosequencing 16S rRNA genes of samples collected along vertical profiles from the designated sampling stations near Marafiq Y-1 in the Red Sea. Along the investigated salinity gradient, a change in the bacterial composition was manifested at broad phylogenetic levels and fine-scale phylogenetic levels, with closely related populations occupying different salinity and depth ranges.

6 The Red Sea Temperature Impacts on Phytoplankton Seasonality

Phytoplankton, at the base of the marine food web, represents a fundamental food source in coral reef ecosystems. The timing (phenology) and magnitude of the phytoplankton biomass are major determinants of trophic interactions [32]; the ratio of the mean chlorophyll concentration during winter (October-May) southeast monsoon to the mean chlorophyll concentration during summer (June-September) northwest monsoon is important. If the ratio is >1, the chlorophyll during winter is higher than the mean chlorophyll during summer.

Racault, et al., estimated the phytoplankton phenological indices using remote sensing ocean-color data for years 1997-2012 from the European Space Agency (ESA) Climate Change Initiative project (OC-CCI) in the entire Red Sea basin. These indices are the timings of initiation, peak, termination and duration, and provide objective and quantitative metrics to characterize phytoplankton seasonality. The OC-CCI product, containing merged and bias-corrected observations from three independent ocean-color sensors (SeaWiFS, MODIS and MERIS), which were processed using the POLYMER algorithm (MERIS period), showed a significant increase in chlorophyll data coverage, especially in the southern Red Sea during the months of summer northwest monsoon. In open and reef-bound coastal waters, the performance of OC-CCI chlorophyll data was comparable with the performance of other standard chlorophyll products for the global oceans. These features enabled to investigate phytoplankton phenology in the entire Red Sea basin, and during winter southeast and summer northwest monsoon periods. The phenological indices were estimated in four open water provinces of the basin and six coral reef complexes of particular socio-economic importance in the Red Sea, viz., Siyal Islands, Sharm El-Sheikh, Al-Wajh bank, Thuwal reefs, Al-Lith reefs and Farasan Islands. No phytoplankton growing period could be detected based on the threshold criterion. The short duration (<20 days) reported during winter in the central part of the Red Sea was due to the basin-wide anti-cyclonic eddies formed in the region [48], that generate short but intense eddy-driven phytoplankton blooms. This phenomenon may locally mislead the phenology detection algorithm. However, this feature is apparent for a small number of pixels and does not impede the analysis of the phenology of phytoplankton in the entire basin.

Phytoplankton and sea-surface temperature (SST) seasonality in open and reef-bound coastal waters in the Red Sea were studies [49]. Most of the open and deeper waters of the basin showed apparent higher chlorophyll concentration and longer growth period of phytoplankton during winter period compared to summer. However, most of the reef-bound coastal waters displayed equal or higher peak chlorophyll concentrations and equal or longer growth period of phytoplankton during summer compared to winter. Racault, et al., studied the ecological and biological significance of the phytoplankton seasonal characteristics in the context of ecosystem state assessment for understanding the structure and functioning of coral reef ecosystems in the Red Sea [50].

Several coral reef dwelling organisms along the Red Sea coast have shown a strong genetic heterogeneity at the southern end where the basin connects to the Indian Ocean, indicative of high gene flow [51]. Connectivity pathways calculation from remote-sensing datasets has indicated that the southern province of the Red Sea is affected by remote upstream regions in the Gulf of Aden and Indian Ocean [52]. The southern Red Sea is subjected to a considerable biannual water influx from the Indian Ocean via the Gulf of Aden facilitating gene flow between the two regions [53, 54].

b. The Mediterranean Sea

Mediterranean hydrodynamics are driven by three layers of water masses: a surface layer, an intermediate layer, and a deep layer that sinks to the bottom; a separate bottom layer is absent. Deepwater formation and exchange rates and the processes of heat and water exchange in the Mediterranean have provided useful models for studying the mechanisms of global climatic change.

The surface layer has a thickness varying from roughly 250 to 1,000 feet (75 to 300 m). This variable thickness is determined in the western basin by the presence of a minimum temperature at its lower limit. In the eastern basin the temperature minimum generally is absent, and a layer of low-temperature decrease is found instead. The intermediate layer is infused with warm and saline water coming from the eastern Mediterranean and is characterized by temperature and salinity maxima at 1,300 feet (400 m). This layer is situated at depths between 1,000 and 2,000 feet (300 and 600 m). The deep layer—containing the great bulk of Mediterranean water—occupies the remaining zone between the intermediate layer and the bottom. In general, the water of this layer is homogeneous.

The Mediterranean Sea receives from the rivers that flow into it only about one-third of the amount of water that it loses by evaporation. In consequence, there is a continuous inflow of surface water from the Atlantic Ocean. After passing through the Strait of Gibraltar, the main body of the incoming surface water flows eastward along the north coast of Africa. This current is the most constant component of the circulation of the Mediterranean. It is most powerful in summer, when evaporation in the Mediterranean is at a maximum. This inflow of Atlantic water loses its strength as it proceeds eastward, but it is still recognizable as a surface movement in the Sicilian channel and even off the Levant coast. A small amount of water also enters the Mediterranean from the Black Sea as a surface current through the Bosporus, the Sea of Marmara, and the Dardanelles.

In summer, the Mediterranean surface water becomes more saline through the intense evaporation, and, correspondingly, its density increases. It therefore sinks, and the excess of this denser bottom water emerges into the Atlantic Ocean over the shallow sill of the Strait of Gibraltar as a westward subsurface current below the inward current. The inflowing water extends from the surface down to 230 or 260 feet (70 or 80 m). The Mediterranean has been metaphorically described as breathing—i.e., inhaling surface water from the Atlantic and exhaling deep water in a countercurrent below.

Surface circulation of the Mediterranean consists basically of a separate counterclockwise movement of the water in each of the two basins. Because of the complexity of the northern coastline and of the numerous islands, many small eddies and other local currents form essential parts of the general circulation. Tides, although significant in range only in the Gulf of Gabes and in the northern Adriatic, add to the complications of the currents in narrow channels such as the Strait of Messina.

Historically, large seasonal variations in the Nile's discharge influenced the hydrology, productivity, and fisheries of the southeastern part of the Mediterranean. The Nile's inflow reduced the salinity of the coastal waters, which increased both their stratification and productivity. Construction of the Aswan High Dam (1970), however, stopped the seasonal fluctuation of the discharge of the Nile water into the Mediterranean. Salty water enters the Mediterranean from the Red Sea via the Suez Canal.

Temperature and Water Chemistry

The parallel of 40° N latitude runs through the middle of the western basin, whereas the corresponding latitude of the eastern basin is 34° N; this explains the higher surface temperature of the latter. The highest temperature of the Mediterranean is in the Gulf of Sidra, off the coast of Libya, where the mean temperature in August is about 88° F. (31° C.). This is followed by the Gulf of Iskenderun, with a mean temperature of about 86° F. (30° C.). The lowest surface temperatures are found in the extreme north of the Adriatic, where the mean temperature in February falls to 41° F. (5° C.) in the Gulf of Trieste. Ice occasionally forms there in the depth of winter. In the deep zone the temperature range is small—approximately 55.2° F. (12.9° C.) at 3,000 feet (900 m) and 55.6° F. (13.1° C.) at 8,200 feet (2,500 m)—and temperatures remain constant throughout the year.

The salinity of the Mediterranean is uniformly high throughout the basin. Surface waters average about 38 parts per thousand except in the extreme western parts, and the salinity can approach 40 parts per thousand in the eastern Mediterranean during the summer. Deepwater salinity is 38.4 parts per thousand or slightly less. As in all other seas and oceans, chlorides constitute more than half of the total ions present in the Mediterranean water, and the proportions of all the principal salts in the water are constant.

Levels of dissolved oxygen vary with the origin of the different water masses. The surface layer down to 700 feet (210 m) shows a high oxygen level throughout the Mediterranean. The intermediate layer formed by the sinking of the surface layer in the eastern basin has a high oxygen level where it is freshly formed in this basin, but, as it moves westward, it loses some of its oxygen content, the lowest values occurring in the Algerian Basin. The transition layer between the intermediate and the deep water has the lowest level of dissolved oxygen.

2. Marine Outfall

A marine outfall (discharge) is a pipeline, tunnel, or channel that discharges municipal or industrial wastewater, storm-water, combined sewer overflows, cooling water, or brine effluents from water desalination plants to the sea. Usually, this is sub-surface discharge (submarine outfall). In the case of municipal wastewater, effluent is often being discharged after having undergone no or only primary treatment, with the intention of using the assimilative capacity of the sea for further treatment. Submarine outfalls are common throughout the world and probably number in the thousands. The light intensity and salinity in natural seawater disinfects the wastewater to ocean outfall system significantly. More than 200 outfalls alone have been listed in a single international database maintained by the Institute for Hydromechanics at Karlsruhe University for the International Association of Hydraulic Engineering and Research (IAHR)/International Water Association (IWA) Committee on Marine Outfall System Discharge and Intake.

Outfall from desalination plants is used herein as an example of discharge. It should not be construed as limiting to the described methods. Methods for monitoring marine water-body sustainability are equally applied to monitoring the sustainability around outfall/discharge from discharge of streams, discharge of rivers, discharge from dams, discharge of water purification plants, discharge of water desalination plants, discharge of power plants, discharge of oil refineries, cement plants, leather tanneries, pharmaceuticals, chemical plants, agricultural runoffs, municipal sewage dumping, and discharge from floods/storm-water into the water-body. The site of discharge may be a site of discharge from desalination plants.

The following is a description of brine discharge into the Red Sea and is an example of different regions in the water-body forming around the discharge site.

a. Discharge from Desalination Plants

Brine discharged from desalination plants is always denser than the ambient seawater with respect to higher salt loads, but due to elevated temperatures, it displays a reduced density, almost equal to that of open sea or seawater intake, and consequently has negative buoyancy. So, the dissipation of effluent depends largely on the bathymetry of the discharge site, prevailing tides, currents, waves and wind intensities in the Outfall Zone. The brine discharged from desalination plants, being denser than the receiving seawater, rapidly sinks in the Outfall Zone, attaining rapid dilution in an area immediately after the discharge point. But if the adjacent sea is shallow like Arabian Gulf, the brine-plume up-wells to the surface due to elevated temperatures and spreads over depending on the prevailing currents and wind. The tides in diurnal rhythm move the brine to-and-fro in the Discharge Zone, but when low tide cycle occurs, the discharge plume covers an extended area of the sea and hence the temperature and salinity tend to return to ambient conditions. This area of the sea is considered as a 'Natural Recovery Zone'. The extent of tidal ebb during each cycle determines the limit of brine dispersion and consequently the dissipation of temperature and salinity [21].

The most important aspect of brine disposal is its ultimate sinking in the receiving water. Dilution is the best option to restore the brine to normal salinity of the ambient sea but the extent of Mixing and Dilution Zone could be defined only after careful study of the Receiving Zone with respect to waves, currents and the ecological carrying capacity of the site. More importance is given on brine sinking in the context of buoyancy effects of the warm and concentrated brine discharged into the sea. The discharged brine is thermally buoyant and also characterized by higher conductivity and density. When the brine falls into cooler and less-denser natural seawater, it undergoes rapid mixing and diffusion. After initial sinking, the brine rises up and due to buoyancy effects tends to spread over the sea giving distinct coloration to the plume, which also enables visual tracking of the brine. After spreading over a distance, the brine sinks again and moves along the sea floor. The temperature and conductivity records indicate the behavior of this buoyant plume during different seasons [21].

A deeper and open sea, like the Red Sea, adjacent to the brine discharge site serves better for rapid dilution and dissipation of the elevated parameters. Rapid mixing and dilution are vital for safe brine disposal in the sea. The expected advantage of mixing, dilution and dispersion has been cited by many authors as site dependent [140, 148, 101, 21]. Brine disposal results in sinking of concentrated brine in the sea. Once it descends to the bottom the potential rate of mixing minimizes.

C. Methods for Monitoring Marine Water-Body Sustainability

The methods for monitoring marine water sustainability typically include establishing monitoring sites at a plurality of designated distances from the site of discharge, at a plurality of designated depths at the monitoring sites, and obtaining samples from the water-body at the monitoring sites. The samples are typically obtained over time, and provide a spatio-temporal sampling of marine water-body sustainability at a site of discharge into a water-body. The sites and samples taken from the sites are typically processed for evaluating physico-chemical composition, oceanographic features, marine organism content, species diversity, and microbial strains and diversity.

The methods are particularly important for monitoring marine water-body sustainability in water-bodies undergoing natural seasonal fluctuations in biodiversity. The natural seasonal fluctuations in biodiversity may be due to water currents unique to the water-body, animal migration, and/or biological life cycles of the marine organisms.

1. Monitoring Sites

Typically, the monitoring sites, also referred to as sampling stations, are positioned at a plurality of designated distances from the site of discharge. The designated distances may be between about 45 m and 55 m offshore (Mixing Zone work station); between about 95 m and 105 m offshore (Recovery Zone work station); and between about 1,250 and 1,750 m offshore from the closest seashore (control work station). Typically, the monitoring sites are also positioned at a plurality of designated depths. The designated depths may be one or more of depths between about 0 m and about 5 m, between about 5 m and about 10 m, between about 25 m and about 30 m, and the seabed.

The monitoring sites may be a Mixing Zone work station, Recovery Zone work station, control work station.

The monitoring sites may be positioned closer or further apart than the distances specified above. The monitoring site positions may be governed by the nature of discharge, the volume of discharge, and the geography of the region for the discharge. It is estimated that the monitoring sites may be positioned as close as between about 50 m and about 100 m apart and as far as up to 1,000 m apart.

2. Sample Collection

The method includes obtaining baseline and test samples at designated frequencies through a period of a month, three months, six months, nine months, and a year.

a. Baseline Samples

The method typically includes obtaining samples at the monitoring sites prior to any discharge. This establishes the baseline samples for monitoring. The data from these samples provide "Pre-operation Assessment" of the site in case of new plants.

In another aspect, the method may include obtaining samples at the monitoring sites for the first time after discharge in case of existing plants already in operation. This typically establishes the baseline samples for monitoring any anticipated change in future after prolonged continuous operation of the plant. The data from these samples provide "Post-operation Assessment".

b. Test Samples

The method also includes obtaining test samples at the monitoring sites after obtaining the baseline samples.

The test samples and the baseline samples are typically processed in the manner with the same methodology to detect the same variables or parameters.

c. Collection Frequency

The baseline samples and the test samples may be obtained at of a month, three months, six months, nine months, and a year. Typically, the frequency of data collection depends on the measured variables. The frequency of sample collection and/or online monitoring may be daily for subjecting the samples to physico-chemical analyses. The frequency of sample collection may be every three months as well as annually for biodiversity studies.

d. Sample Types

The discharge into the water-body may be discharge of streams, discharge of rivers, discharge from dams, agricultural runoffs, storm/flood waters, discharge of water purification plants, discharge of water desalination plants, discharge of power plants, and discharge of various industries, including petrochemical plants and oil refineries, into the water-body. The site of discharge may be a site of discharge from desalination plants.

The samples may be seawater, biomass from the seawater, and underwater photographs and identification/characterization of the site biodiversity/microbial strains.

Probes positioned at the monitoring sites may be used to collect physico-chemical data (instead of samples) from the site on the continuous or as needed basis.

3. Sample Analyses

The samples are typically processed to measure temperature, salinity, density, total hardness, total suspended solids (TSS), turbidity, hydrogen ion concentration (pH), electrical conductivity, dissolved oxygen (DO) total dissolved solids (TDS), heavy metals, residual $Cl_2$, disinfection byproducts (DBPs), petroleum hydrocarbons (PHCs), persistent organic pollutants (POPs), polychlorinated biphenyls (PCBs), and other chemical compositions for physical and chemical monitoring.

Typically, the monitoring sites are physically surveyed and marine habitats are enumerated and accounted for marine observational surveys. The samples may be processed for assessing plankton health, for nutrient analysis for biochemical and organic monitoring, for adenosine-5'-triphosphate (ATP) analysis, heterotrophic plate count (HPC) analysis, microbial cell counts, and algal cell counts for microbial monitoring. The samples may be processed using 16S ribosomal RNA gene pyro-sequencing for phylogenetic analysis.

The samples may be processed for physical and chemical monitoring; marine observational surveys; biological monitoring; biochemical and organic monitoring; microbial monitoring; and phylogenetic analysis.

The samples may provide data on microbial strains, biodiversity of the species, taxon distribution of the DNA samples, temporal survey of seawater microbial community, microbial communities comparison at different sampling stations, and/or relative abundance of the bacterial populations.

4. Data Collection

The data from the analyzed samples is collected and compared. Data may be sorted to present variables of the test sample and that of the baseline sample obtained at the same monitoring site, at the same depth. Data may be sorted to present variables of the test sample at a working station and of the test sample at the control site (CS) obtained at the same sample collection period.

The sorted data may be analyzed to compare the data from the control site to the data from the working station for the different sample collection periods. Additionally, the sorted data may be analyzed to compare the data from the baseline samples to the data from the test samples obtained at the same monitoring site, at the same depth.

5. Sustainability Indicators

The method uses biodiversity as a reliable quantitative tool to evaluate the environmental impacts of anthropogenic activities, particularly coastal brine discharge, on marine ecosystem. This provides spatio-temporal evaluation of marine water-body sustainability at a site of discharge into a water-body. The spatio-temporal evaluation evaluates 1) actual immediate impacts on primary production and 2) overall impacts on biotic resources of discharge into marine water-body, thereby providing short-term acute and long-term cumulative impacts on living resources.

Typically, the methods identify the marine water-body at a site of discharge as sustainable when data from the test samples correspond to between about 90% and 100% of the data from the baseline samples, establishing zero or minimal impact of the discharge.

Typically, the methods identify the marine water-body at a site of discharge as moderately sustainable when data from the test samples correspond to between about 80% and about 90% of the data from the baseline samples, establishing some or moderate impact of the discharge.

Typically, the methods identify the marine water-body at a site of discharge as marginally or partially sustainable when data from the test samples correspond to between about 70% and about 80% of the data from the baseline samples, establishing partial or noticeable impact of the discharge.

Typically, the methods identify the marine water-body at a site of discharge as not sustainable when data from the test samples correspond to below about 70% of the data from the baseline samples, establishing alarming impact of the discharge.

In the context of momentous development of desalination industry, especially in the Middle East region, it was for the first time that Marafiq researchers proactively took the initiative to assess the actual impacts of the concentrated brine disposal on the Physico-chemical quality of the near-shore live seawater resource and intensively examined all possible effects on the marine ecosystems. In addition to conventional analytical studies, several interdisciplinary regimes were also incorporated, such as biological, biochemical, microbiological, sophisticated phylogenetic investigations, etc., to discern the overall impacts of the brine discharge on biological diversity in the adjacent marine environment.

Biologically, the behavior of immediate brine Discharge Zone was studied with respect to deviations in productivity, composition of planktonic population, density and frequency of incidence compared to ambient sea conditions. Similarly, the rates of replenishment and restoration of the population were investigated in the Recovery Zone. Moreover, active microbial cells, the bacterial and phytoplankton cell counts, bacterial cells classification, identification of active bacterial population, characterization of microbial diversity and taxonomic affiliation, diversity-index calculation, major phyla distribution and corresponding class distribution, etc., were conducted. Additionally, temporal survey of seawater microbial community was performed.

Some oceanographic aspects of the brine disposal, such as mixing, dilution, dispersion, unstable stratification at coastal discharge, adjoining Recovery Zone, negative buoyancy due to comparatively higher temperature, large-scale mingling of brine with receiving seawater, areas of restricted water exchange, natural evaporation loss, etc., were also investigated in the light of Regulatory requirements. The beneficial role played by environment-friendly practices at various desalination facilities, such as cascaded outfall channel, diffuser systems, etc., were also evaluated. Modeling and Simulation techniques using various software were applied and validated with the real-time data.

Based on all these comprehensive and repeated studies, a systematic procedure was devised to assess the sustainability of the receiving water-body Studies have highlighted the importance of deeper discharge basins for brine disposal. Some investigators have proposed a conceptual submarine or submerged outfall design to international desalination community for consideration in new projects to prevent or at least minimize the damage to coastal marine environment. It is summarized as follows:

Coastal discharge outfalls at the surface should be avoided, as much as possible, and replaced by submerged outfalls sufficiently deep into the sea, but locating submerged outfalls in favorable oceanographic site, which dissipates the heat and salinity loads quickly, is also important.

Some studies suggest that the depth of submerged outfall should extend to a water depth of 30 meters or a distance of 1 nautical mile, as defined in some Coastal Environment Protection Guidelines, whereas others recommend that brine being denser than ambient seawater, the submerged outfall structure should terminate at least 2 meters above the seabed for better dilution. But technically, "Froude Number" should be considered to decide the optimum depth of submerged discharge point.

For better dispersal and dilution of the discharge plume, diffuser system may be installed at the points of submerged outfall termination.

The dilution process can be quantified using "Froude Number" of the brine discharge jet. Ciocanea, et al., (2013) [130] have recommended an optimum range of the "Froude Number' to be between 20 and 25.

Some investigators propose minimum length of the submerged outfalls to be 300 meters from the coastline for a healthier coast for human activities, but technically 'Froude Number' should dictate the optimum length of the pipe.

Important oceanographic characteristics, such as water exchange, bathymetry, currents and undercurrents, stretches of tidal cycles, etc., must also be considered before site selection.

Sufficient distance should be maintained from specific locations of declared and proposed marine natural reserves and underwater habitats.

A marine outfall is said to be the best designed where maximum and faster dilution can occur without or minimum disturbances to marine environment and sediments movement.

Results of mathematical dispersion model must be utilized to assess the impact of brine discharges on the marine environment.

Background survey of the site selected for marine outfall pipeline/channel is required for approval purpose and also for evaluating the synergetic impacts of the brine discharges and their compliment of residual chemicals on the marine environment incurred each year since the brine discharge had first started.

Periodical environmental monitoring, be it on half-yearly/annual basis, is proposed for better implementation of Coastal Marine Environment Standards. Positioning of monitoring stations for the measurements of water quality should not be based only on geographical positions, but also on in-situ temperature, salinity, visual examination, etc.

Additional advantages of the disclosed method will be set forth in part in the description which follows, and in part will be understood from the description, or may be learned by practice of the disclosed method. The advantages of the disclosed method will be realized and attained by means of the elements and combinations particularly pointed out in the appended claims. It is to be understood that both the foregoing general description and the following detailed description are exemplary and explanatory only and are not restrictive of the invention as claimed.

D. Kits

The methods described above as well as materials useful to perform the methods can be packaged together in any suitable combination as a kit useful for performing, or aiding in the performance of, the disclosed method. It is useful if the kit components in a given kit are designed and adapted for use together in the disclosed method. For example, disclosed are kits with one or more assay components for sampling the waters and/or testing the samples of water. The kits may include instructions for use.

The disclosed compositions and methods can be further understood through the following numbered paragraphs.

1. A method for monitoring marine water-body sustainability at a site of discharge, the method comprising
   establishing monitoring sites at
      a plurality of designated distances from the site of discharge,
      a plurality of designated depths from the site of discharge, and obtaining samples from the water-body at the monitoring sites.

2. The method of paragraph 1, wherein the site of discharge into the water-body is selected from the group of sites consisting of discharge from streams, rivers, dams, water purification plants, water desalination plants power plants, oil refineries, cement plants, leather tanneries, pharmaceutical plants, chemical plants, agricultural runoffs, municipal sewage dumping, and from floods or storm-water into the water-body.

3. The method of paragraph 1 or 2, wherein the monitoring sites comprise mixing zone work station, recovery zone work station, control work station.

4. The method of any one of paragraphs 1-3, wherein the plurality of designated distances from the site of discharge comprises distances at:
   between about 45 m and 55 m offshore (mixing zone work station);
   between about 95 m and 105 m offshore and about 225 and 275 m distant from mixing zone work station (recovery zone work station); and
   between about 1,250 and 1,750 m offshore from the closest seashore (control work station).

5. The method of any one of paragraphs 1-4, wherein a plurality of designated depths at the monitoring sites comprises at least three depths:
   between about 0 m and about 5 m,
   between about 5 m and about 10 m,
   between about 25 m and about 30 m, and
   optionally, seabed.

6. The method of any one of paragraphs 1-5, wherein the samples are water samples and are obtained daily.

7. The method of any one of paragraphs 1-6, wherein the samples are water samples and marine biomass and are obtained once every three months.

8. The method of any one of paragraphs 1-7, wherein the samples are water samples and marine biomass and are obtained annually.

9. The method of any one of paragraphs 1-8, wherein the samples are processed for any one or more of physical and chemical monitoring; marine observational surveys; biological monitoring; biochemical and organic monitoring; microbial monitoring; and phylogenetic analysis.

10. The method of any one paragraphs 1-9, wherein the site of discharge is a site for discharge of water desalination plants.

11. The method of any one paragraphs 1-10, wherein the site of intake is a site for intake of water desalination plants.

12. The method of any one of paragraphs 1-11, wherein obtaining samples at the monitoring sites prior to any discharge or intake establishes the baseline samples for monitoring.

13. The method of any one of paragraphs 1-11, wherein obtaining samples at the monitoring sites for the first time after any discharge or intake establishes the baseline samples for monitoring.

14. The method of any one of paragraphs 1-13, wherein obtaining samples at the monitoring established test samples for monitoring.

15. The method of any one of paragraphs 1-14, wherein the baseline samples and the test samples are obtained at the monitoring sites daily, every three months, and/or annually.

16. The method of any one paragraphs 1-15, wherein the samples are processed to measure temperature, electrical conductivity, pH, salinity, TSS, TDS, DO, density, turbidity, total hardness, and chemical composition for physical and chemical monitoring.

17. The method of any one paragraphs 1-16, wherein the monitoring sites are physically surveyed and marine habitats are enumerated and accounted for marine observational surveys.

18. The method of any one paragraphs 1-17, wherein the samples are processed for assessing plankton health biological monitoring.

19. The method of any one paragraphs 1-18, wherein the samples are processed for nutrient analysis for biochemical and organic monitoring.

20. The method of any one paragraphs 1-19, wherein the samples are processed for adenosine-5'-triphosphate (ATP) analysis, heterotrophic plate count (HPC) analysis, microbial cell counts, and algal cell counts for microbial monitoring.

21. The method of any one paragraphs 1-20, wherein the samples are processed using 16S ribosomal RNA gene pyro-sequencing for phylogenetic analysis.

22. The method of any one of paragraphs 1-21, wherein the marine water-body is sustainable when data from the test samples correspond to between about 90% and 100% of the data from the baseline samples, establishing zero or minimal impact of the discharge and/or intake.

23. The method of any one of paragraphs 1-21, wherein the marine water-body is moderately sustainable when data from the test samples correspond to between about 80% and about 90% of the data from the baseline samples, establishing moderate impact of the discharge and/or intake.

24. The method of any one of paragraphs 1-21, wherein the marine water-body is marginally or partially sustainable when data from the test samples correspond to between about 70% and about 80% of the data from the baseline samples, establishing partial or noticeable impact of the discharge and/or intake.

25. The method of any one of paragraphs 1-21, wherein the marine water-body is not sustainable when data from the test samples correspond to below about 70% of the data from the baseline samples, establishing alarming impact of the discharge and/or intake.

EXAMPLES

Example 1. Physico-Chemical Effects of Brine Discharges

Physico-chemical effects of the brine discharge, viz., elevation in temperature, salinity, turbidity, TSS, heavy metals, DBPs, Petroleum Hydrocarbons (PHCs), Persistent Organic Pollutants (POPs), Polychlorinated Biphenyls (PCBs), etc., are desired to be studied because conforming to environmental standards that would protect the species and ecosystems also necessitate exigent attention. Particular care is required to the accumulation of PHCs, POPs, PCBs and heavy metals in animal tissues and their bio-geo-chemical cycling in ecosystems. Physical oceanographic studies covering aspects, such as currents, waves, tides, etc., are also needed for locating the intake and discharge bays from environmentally sustainable angle.

Figure 2:
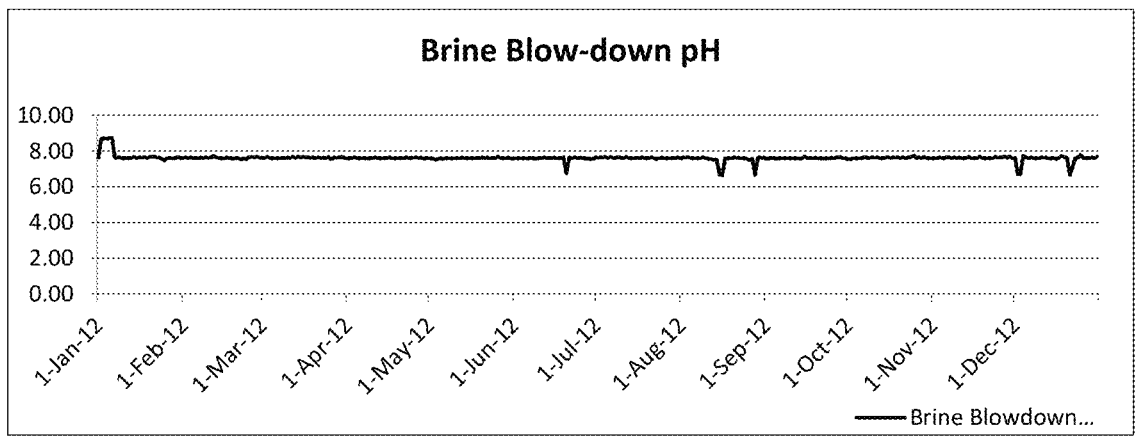
FIG. 2 is a graph showing brine blow-down pH over time (Prior Art).
Figure 3:
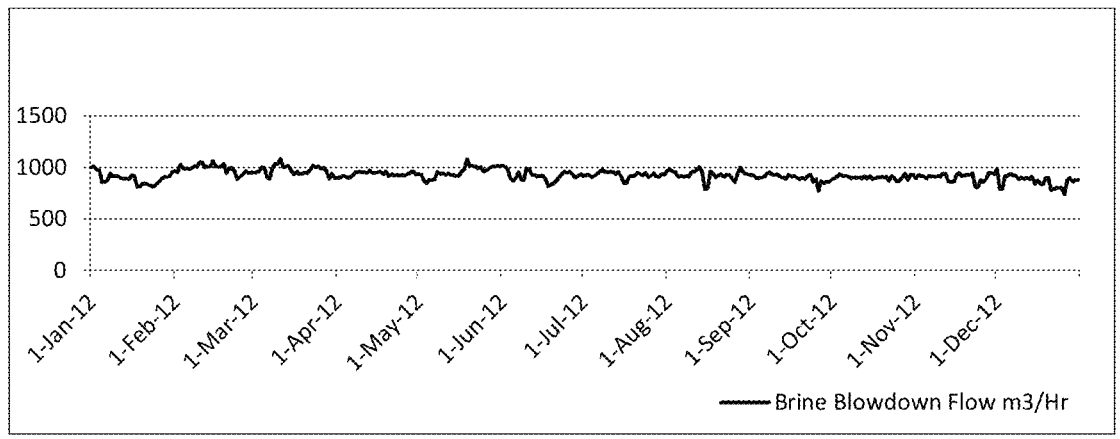
FIG. 3 is a graph showing brine blow-down flow ($m^3$/hr) over time (Prior Art).

Marafiq produces an average of 923.89 m$^3$/hr of brine discharge on annual basis (FIG. 3). In order to assess the prime effects of brine discharge from Marafiq-Y on marine environment and degree of compliance with environmental regulations, it was decided to analyze other important parameters in addition to routine monitoring of the characteristics of process effluents, viz., Temp., pH, Flow, TDS (FIGS. 1-4), Copper (Cu) Content, Residual Chlorine, etc., which remain quasi identical. While the scope of this environmental analysis was very limited, the water samples were collected in triplicate on three consecutive days (i.e., 19-21 Nov. 2012) from three locations around outfall (0, viz., within 5 meters (0+5), within 5-10 meters (0+10), within 25-30 meters (0+30). The analysis covered following aspects:

The physico-chemical impacts of the brine discharge on marine environment, such as changes in temp., salinity, density, stratification, TSS, turbidity, discoloration due to residual FeCl$_3$, etc.;

Impact of brine disposal on feed-water quality; and

Transport and ultimate fate of discharged brine.

The most widely applied desalination technique on a regional scale is Multistage Flash (MSF) desalination followed by Reverse Osmosis (RO), although other processes, such as Multi-Effect Distillation (MED) and Thermal Vapor Compression (TVC), are also applied and gradually increasing in number in the Gulf Cooperation Council (GCC) countries. It is understood that the brine discharge from these desalination plants is a highly altered fluid from physical, chemical and biological points of view compared to the feed seawater.

Apart from feed-water quality, the process applied also influences the brine characteristics. Morin (1994) [184] has provided a description of typical brine discharge from different types of feed. For a feed quality of 300 mg/l concentration, the brine stream will have a concentration of 1200-1500 mg/l. Similarly, while treating seawater, the concentration of brine stream would be approximately 60,000 mg/l or twice the concentration of the natural seawater. But since the industry always aims at a higher recovery rate, the brine produced has proportionate concentration of salts and other residues.

The brine discharge from desalination industry is generally characterized by a complex of multi component pollutants, such as high salinity, elevated temperature, residues or reaction products of a variety of chemicals used to control scaling, biofouling, foaming, cleaning, Oxygen scavenging and leached corrosion products/heavy metals. RO plants also produce brine discharge but without temperature elevation, though having much more solid wastes than the thermal plants and residues or reaction products of a variety of chemicals used in the process, such as disinfectants/biocides, propriety antiscalants, coagulants, polyelectrolyte flocculation aid, oxidant scavenger, membrane cleaning/preservation agents, etc. The effects of these chemicals deserve special attention on long-term basis. These water-born pollutants lead to affect the physico-chemical quality of the source water. Representative brine characteristic from two SWRO plants operating on Arabian Gulf coast are presented by Dawoud and Mulla, (2012) [133].

Despite phenomenal growth of desalination industry worldwide, data on the physcio-chemical effects of the brine discharge in the adjacent marine environment are very limited [143, 144, 116, 202, 190, 112, 160, 149]. Lattermann (2011) [171] also pronounces that marine pollution by desalination plants has been monitored and results published in only a few short-term, localized studies.

Results

1 Temperature Elevations and Depletion of Dissolved Oxygen (DO)

This is one of the most obvious effects observed at almost all brine discharge locations having thermal desalination facilities. In GCC countries, the average ambient seawater temperature during summer season remains about 35° C., whereas the discharge from power and desalination plants usually has a temperature level above the ambient conditions by about 7-8° C. Data is available for comparison from desalination plants in the Gulf of Aqaba (the Red Sea), where temperature elevation was reported to be 7-12° C. higher than feed-water [143]. The impact of Sitara desalination plant (Bahrain) indicated a temperature elevation of 10-15° C. above ambient [116]. The UAE coastal water was reported to be impacted with temperature elevation of 5-6° C. [202]. The surface water temperature in the outfall bays of some plants on the Arabian Gulf ranged between 7.2-10.6° C. higher than ambient seawater although rapid mixing was observed immediately after the discharge. The brine discharge mixed with power station cooling water at Ashkelon site in Israel, which is disposed at the shore line and disperses mostly at the surface [135], was reported to cause an elevation up to 7.8° C. at the outfall compared to the ambient temperatures, but at Palmachim site, the brine marine outfall was found slightly warmer (only around 0.5° C.) than the surrounding [163].

The concentration of Dissolved Oxygen (DO) depends upon seawater temperature in the vicinity of desalination plants, concentration of $O_2$ in the brine discharge and mixing of the discharge with ambient seawater. With increase in temperature and salinity, $O_2$ becomes less soluble in seawater. Moreover, the effluent water contains almost no $O_2$ due to the addition of Sodium Sulfite ($Na_2SO_3$) in addition to mechanical deaeration in thermal processes, which is intended to inhibit the corrosion of Plant components. Similarly, the injection of Sodium Bisulfite (SBS) in membrane processes to neutralize $Cl_2$ also reduces $O_2$ level in the brine reject. So, as a consequence of elevated temperature and addition of $O_2$ scavengers, the DO concentration severely decreases at the discharge sites of desalination plant.

The average brine blow-down temperature at the outfall of Marafiq-Y on annual basis during the year 2012 was 35.53° C. (FIG. 1), which caused an average temperature elevation near the shore of Marafiq-Y outfall site ranging between 3.2-4.3° C. throughout the year. This elevated temperature after mixing with the receiving water reached to range between 0.90-1.12° C. This drastic change in the degree of temperature elevation near Marafiq-Y shore compared to other desalination sites is attributed to the special design of a wide, cascaded and protruded outfall, quick mixing of effluent with ambient seawater and depth of the water receiving environment.

The DO level at the outfall Marafiq-Y site was determined in the random environmental analysis and found quite normal [Table-1].

Though a temporary stratified water column was found due to density differences between the discharge and the receiving waters, but no thermocline was noticed. The elevation in temperature of the receiving marine environment and the point where surface water temperature returns to ambient conditions varied from season to season, but the trend of recovery brought about by mixing, dilution and diffusion caused by wind, waves, tides and incursion of water masses was found highly robust.

2 Salinity and Density Elevations

The brine discharge from desalination plants always has a higher salinity than the ambient seawater. Generally, the ambient seawater salinity in Arabian Gulf is about 45 ppm and desalination plants increase this level in the vicinity on average basis by about 5-10 ppm above the ambient conditions. Conductivity records showed a progressive drop from the discharge point to outlying sites returning to ambient values at a relatively short distance. The discharge from Sitara desalination plant was found to cause a salinity elevation of 11 parts per thousand (ppt) in the surrounding Bahrain Sea [116].

An independent source of investigators had reported a very slight elevation in surface water conductivity compared to ambient seawater, viz., by 4.3-6.5 µS/cm, at a distance of about 1.5 km from some desalination facilities on the Arabian Gulf coast, whereas the bottom water at same location showed a comparatively lower elevation of 3.2-6.4 µS/cm in the receiving marine zone. It is contrary to a general concept that the brine being denser in salt concentration must elevate the salinity in bottom water. This unstable stratification at the coastal Discharge Zone could be attributed to higher natural evaporation combined with shallow receiving shore, negative buoyancy due to comparatively higher temperature and large-scale mingling of the brine with receiving seawater in outfall discharge and adjoining Recovery Zones.

A UAE plant was found to cause an elevation by 0.92 ppt of salinity on Abu Dhabi coast [202]. In a site where the concentration of seawater was 45 $g/m^3$ and the brine discharge concentration was 67.5 $g/m^3$, indicated a concentration ratio of 1.5 [158]. Raveendran (1995) [190] reported a steady buildup of seawater total dissolved solids (TDS) in Abu Dhabi region from 42,270 ppm in 1980 to 45,529 ppm in 1986, 50,000 ppm in 1991 and 54,414 ppm in 1995 due to brine disposal from desalination plants in the region.

The mixed brine-cooling water discharge at Ashkelon site was reported to cause a salinity elevation by up to 1.84 at the outfall compared to the ambient values and positively buoyant, dispersing at the surface. Usually, RO plant rejects have higher density than thermal plant discharges due to comparatively increased salinity. Hence, discharges from thermal plants tend to spread or float over the surface. The seawater density difference between upper and lower layers at Ashkelon site were also reported to be affected between 1.31-1.86 Sigma-T units. But Palmachim marine outfall site was found much more saline than the surrounding by up to 6 salinity units. This effect was confined to the bottom 1 m and dispersed to more than 600 m from the sub-surface outfall encompassing an area of 0.4 $km^2$ and the density difference between the upper and the lower layers had reached to 5.03 Sigma-T units [163]. In another study on Ashkelon desalination site, Safrai, I. and Zask, A. [199], reported that outfield compliance monitoring results showed that 1% salinity above ambient seawater had spread over kilometers despite the dilution effect of the power plant cooling water.

But Lattermann, (2010, 2011) [170, 171] disputes any salinity elevation due to brine discharge from desalination plants in the Arabian Gulf. The desalination plants in the Gulf account for an annual water loss of about 0.05% of the whole water-body compared to the natural evaporation loss of about 5.7%, and attribute it to be the primary cause of the Gulf's higher natural salinity. Since the natural evaporation rate is considerably higher than water extraction through desalination plants and moreover the Gulf water is exchanged every 3-5 years [204] increased salinity resulting from desalination plants does not seem a likely scenario, at least not for open Gulf seawater. Shallow areas and areas of restricted water exchange, however might be affected by concentrate discharges caused by impaired mixing with open seawater.

3 Temperature and Salinity Dissipations

Logically, the impacts of higher salinity of the brine reject from desalination plants can be mitigated by pre-dilution. Similarly, the impacts of temperature may be avoided by ensuring heat dissipation from the reject stream to atmosphere before discharging it to the water-body. But it is not feasible for large capacity plants.

The brine discharged from desalination plants is always denser than the ambient seawater with respect to higher salt loads, but due to elevated temperatures it displays a reduced density, almost equal to that of seawater intake, and consequently has negative buoyancy. So, the dissipation of effluent depends largely on the bathymetry of the discharge site, prevailing tides, currents, waves and wind intensities in the Outfall Zone. The brine discharged from the plants, being denser than the receiving seawater, rapidly sinks in the Outfall Zone, attaining rapid dilution in an area immediately after the discharge point. But if the adjacent sea is shallow, like the Arabian Gulf, the brine-plume up-wells to the surface due to elevated temperatures and spreads over depending on the prevailing currents and wind. The tides in diurnal rhythm move the brine to-and-fro in the Discharge Zone, but when low tide cycle occurs, the discharge plume covers an extended area of the sea and hence the temperature and salinity tend to return to ambient conditions. This area of the sea is considered as a "Natural Recovery Zone (NRZ)". The extent of tidal ebb during each cycle determines the limit of brine dispersion and consequently the dissipation of temperature and salinity.

A deeper and open sea, like the Red Sea, adjacent to a discharge site serves better for rapid dilution and dissipation of these elevated parameters. Hence, near Marafiq-Y discharge site the parameters monitored at 0+5 m, 0+10 m and 0+30 m levels at the NRZ in a random environmental survey (i.e., during 19-21 Nov. 2012) were found almost similar to ambient seawater conditions [Table 1]

TABLE 1

Environmental Analyses Results from WS1 and WS2 (Average of January, April, July, and October, 2016)

| Constituents | Units | Allowable Effluent Levels | 3-Days Average | | |
|---|---|---|---|---|---|
| | | | 0 + 5 m | 0 + 10 m | 0 + 30 m |
| Physio-Chemical Pollutants | | | | | |
| Floatables | Visual | None | ND | ND | ND |
| pH | — | 6-9 | 7.1 | 7.6 | 8.1 |
| TSS | mg/l | Max. 15 | <5 | <5 | <5 |
| DO | mg/l | Min. 70% Saturation | 7.2 | 7.5 | 7.6 |
| Turbidity | NTU | Max. 75 | <1 | <1 | <1 |
| BOD | mg/l | 25 | 4 | 4 | 4 |
| COD | mg/l | 150 | 12 | 10 | 9 |
| Total Kjeldahlnitrogen (TKN) | mg/l | 5 | 3.5 | 2.5 | 1.2 |
| Total Chlorinated Hydrocarbons | mg/l | 0.1 | <50 µg/l | <50 µg/l | <50 µg/l |
| Oil and Grease | mg/l | 8 (should not exceed 15 mg/l in any individual discharge) | <10 | <10 | <10 |
| Phenols | mg/l | 0.1 | <50 µg/l | <50 µg/l | <50 µg/l |
| Non-Organic Pollutants | | | | | |
| Ammonia as N | mg/l | 1 | 0.125 | 0.080 | 0.050 |
| As | mg/l | 0.1 | <0.004 | <0.004 | <0.004 |
| Cd | mg/l | 0.02 | <0.0002 | <0.0002 | <0.0002 |
| Res. $Cl_2$ | mg/l | 0.2 | <0.1 | <0.1 | <0.1 |
| Cr | mg/l | 0.1 | <0.003 | <0.003 | <0.003 |
| Cu | mg/l | 0.2 | <0.002 | <0.002 | <0.002 |
| CN | mg/l | 0.05 | <0.002 | <0.002 | <0.002 |
| Pb | mg/l | 0.1 | <0.003 | <0.003 | <0.003 |
| Hg | mg/l | 0.001 | <0.001 | <0.001 | <0.001 |
| Ni | mg/l | 0.2 | <0.0004 | <0.0004 | <0.0004 |
| Total Phosphorous | mg/l | 1.0 | <0.025 | <0.016 | <0.018 |
| Zn | mg/l | 1.0 | <0.004 | <0.004 | <0.004 |
| Fe | mg/l | 1.0 | 0.026 | 0.025 | 0.012 |

TABLE 1-continued

Environmental Analyses Results from WS1 and WS2 (Average of January, April, July, and October, 2016)

| Constituents | Units | Allowable Effluent Levels | 3-Days Average | | |
|---|---|---|---|---|---|
| | | | 0 + 5 m | 0 + 10 m | 0 + 30 m |
| Biological Pollutants | | | | | |
| Total coliform | MPN/ 100 ml | 1000 | ND | ND | ND |
| Mixing Zone | | | | | |
| Temp. | ° K | ≤1° K above receiving water | 32.5° C. | 31° C. | 29.5° C. |

Note:
All above parameters were within the permissible limits

Safrai Iris and Zask Alon applied CAMERI-3D Numerical Model in-situ to Ashkelon RO based desalination plant (VID) to assess salinity dispersion from surface brine discharge. Several events were simulated including the aggressive most scenarios when there is no cooling water from power plant and no wind or wave prevailed. The discharge flow was kept 21,000 m³/hr, salinity 73.5 g/l and salt discharge rate 429 kg/sec.

4 Brine Transport Patterns and Sinking

The most important aspect of brine disposal is its ultimate sinking in the receiving water. Dilution is the best option to restore the brine to normal salinity of the ambient sea but the extent of Mixing and Dilution Zone could be defined only after careful study of the Receiving Zone with respect to waves, currents and the ecological carrying capacity of the site. More importance has been given on brine sinking in the context of buoyancy effects of the warm and concentrated brine discharged into the sea. The discharged brine is thermally buoyant and also characterized by higher conductivity and density. When the brine falls into cooler and less denser natural seawater, it undergoes rapid mixing and diffusion. After initial sinking the brine rises up and due to buoyancy effects, tends to spread over the sea giving distinct coloration to the plume, which also enables visual tracking of the brine. After spreading over a distance, the brine sinks again and moves along the sea floor. The temperature and conductivity records indicate the behavior of this buoyant plume during different seasons.

Fernandez-Torquemada, et al., (2009) [141] monitored the brine effluent emanating from several SWRO desalination plants in the western Mediterranean Sea and estimated the area of influence of the hyper-saline plume. The behavior or the expanse of this plume was found to vary significantly according to discharge characteristics, plant production capacity and change in seasons. The total dilution of the brine from a smaller desalination plant (Javea) took place in a shorter distance of <300 meters, whereas the brine discharge from a larger desalination plant(Alicante and San Pedro) spread along the bottom to several kilometers from the discharge point. The most elevated salinity values and the highest brine plume distribution in case of Javea plant were reported at the seabed during summer, but the area influenced by increasing salinity was smaller during winter season. The formation of thermocline was observed in the vicinity of outfall from Alicante plant at a depth of 12-15 m during summer season and the brine remained in the middle of the water column.

The bathymetric features of outfall areas of desalination sites on Arabian Gulf coast show that the region is shallow with a depth ranging from only 2-5 m and this shallowness restricts the capacity of the outfall area and does not allow rapid mixing and dilution. In the absence of a vertical space, the discharge plume is forced to spread over a large area of the sea but the surface and bottom waters do not show any stable trend of stratification. But a deeper coastal discharge, as in the case of the Red Sea, facilitates rapid mixing and dilution both.

5 Release of Antiscalant Additives

Scale formation inside condenser tubes is a major constraint experienced in thermal distillation process which impairs the flow and reduces heat transfer efficiency. Similarly, scaling of RO membranes also results in retarding plant efficiency. Antiscalant additives have proved to mitigate scaling problem and enhance the efficiency in both thermal and membrane processes. Although there is no plausible information available on the precise reaction mechanism of antiscalants, e.g., formation of complexes of Calcium/Magnesium ions with water soluble polymers or on the products of hydrolysis [149], but reactive and chelating methods have been proposed to be two well-known methods used to control scale build-up [115]. The best reactive agent is acid, but now it is in very limited use. The chelating agents are generally classified into two groups, the low and the high temperature additives, depending on their thermal stability at various temperature ranges and respective use. Chemically, the most widely used scale inhibitors are water soluble phosphonate based or synthetic polymers, like polyacrylic acid, polymaleic acid or polycarboxylates, i.e., homopolymers and copolymers of maleic or acrylic acids [Ruland, et al., (1995)]. The plants in UAE, Kuwait and other GCC countries generally use polymaleic group of antiscalants [202, 158]. These antiscalants are generally non-toxic and approved for applications in drinking water industries by international bodies.

The effective dose level of antiscalant is site specific, based on seawater TDS, turbidity and operating top brine temperature (TBT); the higher these parameters are, the higher would be the dose required. SWCC plants are reported to use different antiscalant additives with varying dose rates depending mainly on operating TBTs, as low as 0.8 ppm at 90° C. up to 2.5 ppm at 115° C. Although the dose level of antiscalants is low, but the overall monthly consumption of large capacity plants amounts to be very huge.

Unfortunately, nothing is known about the environmental fate and the effects of antiscalant discharges from desalination plants [171]. However, it is expected that due to low degradability, longer residence and dispersal might occur until this waterborne pollutant is eventually flushed out during the anticipated turn over time, which in case of the Arabian Gulf is about 3-5 years and about 6 years in case of the Red Sea.

6 Release of Antifoam Additives

The excretion and biogenic products of phytoplankton and algae contribute to foaming in seawater. Antifoam additives are basically arcylated polyglycols, fatty acids and esters of fatty acid, which act at the water-vapor interface influencing surface tension, thus preventing foam formation. The raw seawater quality dictates the dosing rate of the antifoam additives, which are non-toxic and approved for application in drinking water industry by international bodies. A typical dose rate of 0.1 ppm is generally maintained at various desalination sites, but frequent over-dosage has also been reported [149].

Similarly, nothing is known about discharge loads of antifoaming agents from desalination plants, their environmental fate and potential impact on the marine environment. But, it is anticipated that this waterborne pollutant, which is although poorly degradable, may have no adverse effect on marine environment and might be flushed out of the Arabian Gulf and the Red Sea within their respective estimated turn over times.

7 Release of Acids, Corrosion Inhibitors and Other Cleaning Agents

Acid cleaning is a very common technique used for the removal of alkaline scales, which foul the surface of heat exchanger tubes or clog the demister pads over a period of operation of thermal distillers. Depending on plant capacity, about 5000-7000 m$^3$ of acidified warm seawater (pH=2.0, 60° C.) containing acid corrosion inhibitor, such as Benzo-triazole derivatives, is circulated through the condenser tubes of a distiller. Some thermal desalination plants use mild organic acid (e.g., Sulfamic) instead of strong mineral acids, such as Hydrochloric (HCl) and Sulfuric ($H_2SO_4$) acids for cleaning. Strong alkaline solutions (pH=11-12) are used for the removal of silt deposits and biofilms from RO membranes and acidified solutions (pH 2-3) for the removal of metal oxides and alkaline scales. Strong detergents, chelating agents, oxidants, disinfectants and biocides, are also used to improve the cleaning process of RO membranes. These cleaning solutions are discharged in the neighboring sea.

It was estimated that about 5000 m$^3$ of acid with a pH of 2.0 used in Abu Dhabi plant would reach the sea requiring 4-5 times dilution in the receiving marine environment, which is naturally a slow and time consuming process [202]. Al-Tayaran and Madany (1992) [116] did not notice any discernible pH variation in the near shore sea adjacent to the Sitara power and desalination plant (Bahrain). Some environment conscious desalination plants have the practice to neutralize the discharge of acid cleaning operation before dumping into the sea. The sea being an ecosystem of enormous buffering capacity accommodates and minimizes the impact of acid discharge on the environment. It is anticipated that un-neutralized acid/alkali reaching to the sea will affect the chemistry (particularly, the alkalinity) of seawater at the discharge site; however nothing is known about the environmental fate and potential impact of acid corrosion inhibitor discharges on the marine environment.

Marafiq-Y circulates warm solution of ethylene di-amine tetra acetate (EDTA) for tube cleaning instead of acid operation. This cleaning operation is not frequent, but practiced when required, viz., once in few years. EDTA is a chelating agent but no information is available about its impact on marine environment.

The annual pH records of the brine blow-down on average basis was found 7.59 during the year 2012 (FIG. 2). During random environmental analyses also, the pH was found above neutral values (Table 1).

8 Release of the Residues of Oxygen Scavengers

As discussed above, $Na_2SO_3$ is commonly used in thermal distillers for removing the traces of DO left behind after mechanical deaeration of the seawater make-up in order to prevent/control corrosion of the construction material. Similarly, SBS is dosed in RO plants to quench residual $Cl_2$ in feed water. Since these chemicals immediately react with $O_2$ and $Cl_2$ when exposed, they do not reach to the sea as such. Although $Na_2SO_3$(SBS) is dosed in seawater at a level of only few ppm, but sulfate level in the discharges might increase if uncontrollably overdosed.

The $Na_2SO_3$ dosing at Marafiq-Y is very well controlled; hence the available data show that its level at the discharge site is nearly similar to the ambient seawater.

9 Release of Heavy Metals

It is known that heavy metal ions are discharged with the brine as corrosion products. The use of a variety of construction materials and the existence of diverse types of environments in an operational desalination plant lead to the deterioration of materials [173]. Localized corrosion in the form of pitting and crevices, mechanically induced erosion-corrosion in the form of impingement and cavitation and biologically induced corrosion are quite common phenomena in desalination plants. Copper-Nickel (90/10 or 70/30) and Aluminum-Bronze alloys are commonly used base materials in the heat exchanger/condenser tubes of desalination plants and heat exchangers and flash chambers are the most corrosion prone areas in the industry. RO concentrate usually does not contain Cu, but Iron (Fe), Chromium (Cr), Nickel (Ni) and Molybdenum (Mo). These non-degradable heavy metal ions discharged with brine get adsorbed to the suspended particles making them heavier to settle down in the sediments, which serve as a "sink" for the metals risking long-term accumulation of these substances in these locations.

Lattermann, (2011) [171] states that monitoring data for Cu contamination in water, sediments and organisms attributed to desalination activity in the Gulf are also sparsely available, but the Regional Organization for the Protection of the Marine Environment (ROPME), State of the Marine Environment Report (2003), stated that Cu and Ni levels are "relatively higher near the outfalls of desalination and power plants". Dawoud and Mulla, (2012) [133] expected the Cu concentration in reject stream to be in the range of 15-100 µg/l. But the presence of Cu does not necessarily mean that it would adversely affect the environment. Elshorbagy and Elhakeem, (2008) [137] found it difficult to distinguish between natural Cu levels and anthropogenic effects, e.g., caused by industrial outfalls or oil pollution. The natural concentrations of Cu from an oceanic background ranges between 0.1-100 µg/1 in estuaries.

Dawoud and Mulla, (2012) [133] mentioned that the Cu levels in the Arabian Gulf were reported to be in the range of <1 µg/l (in case of Qatar) and 25 µg/1 (in case of Kuwait). The accumulated concentration of Cu, Magnesium (Mg), Ni, Zinc (Zn) and Cadmium (Cd) were detected in the range of 0.1-20 ppm in the sediments of north-western coast of the Arabian Gulf [119]. In some studies, Fe contents were also found high in the order of 200 ppm. Al-Yakoob, et al., (1994) [117] reported that metal ion concentrations of Arsenic (As), Cd, Cr, Ni, Zn, Fe, Cu, Cyanide (CN), Lead (Pb) and Mercury (Hg) remained well within the range in the Arabian Gulf. The concentration of these elements in the brine blow-down of MSF units was reported very low in Kuwait [158]. The elevation in the concentration of heavy metals was also reported from UAE desalination plant discharges, but without providing any numerical value [202].

Lattermann, (2011) [171] further reported that eight heavy metals were recently measured in sub-tidal sediments near two power-desalination plants (capacity: about 90,000 m$^3$/d) in the Gulf of Oman.

Slightly elevated levels of Cu, and to a lesser extent of Zinc (Zn), were found at varying distances with some high values close to the outfalls. Maximum Cu levels in sediments were 13-16 mg/kg, which is below action trigger values established in other parts of the world. The sediments could, therefore, be considered slightly contaminated [102]. Considering this visible impact of two smaller capacity plants, the fate of larger production facilities of up to 1.6 Mm$^3$/d at a single site in the Arabian Gulf can be very well assessed.

Figure 4:
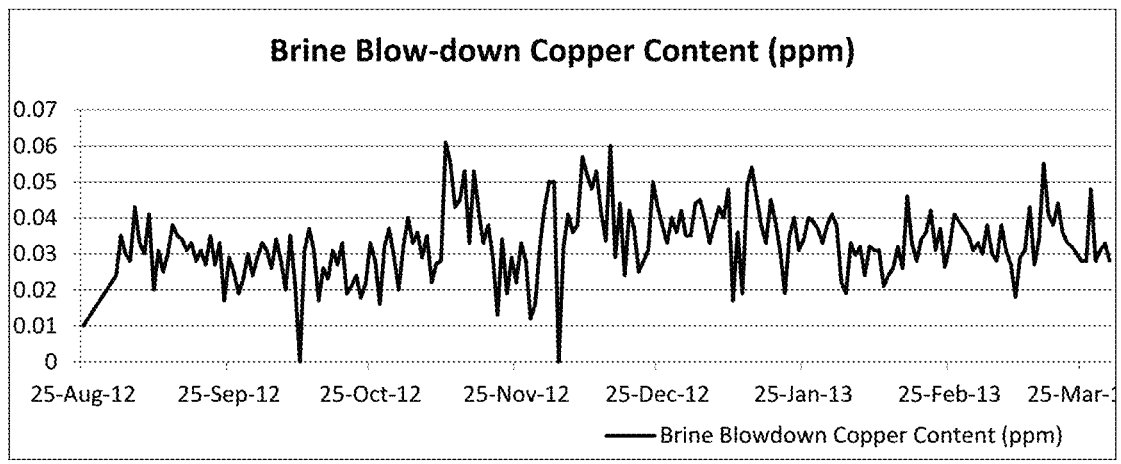
FIG. 4 is a graph showing copper content in brine blow-down (ppm) over time (Prior Art).
Figure 5:
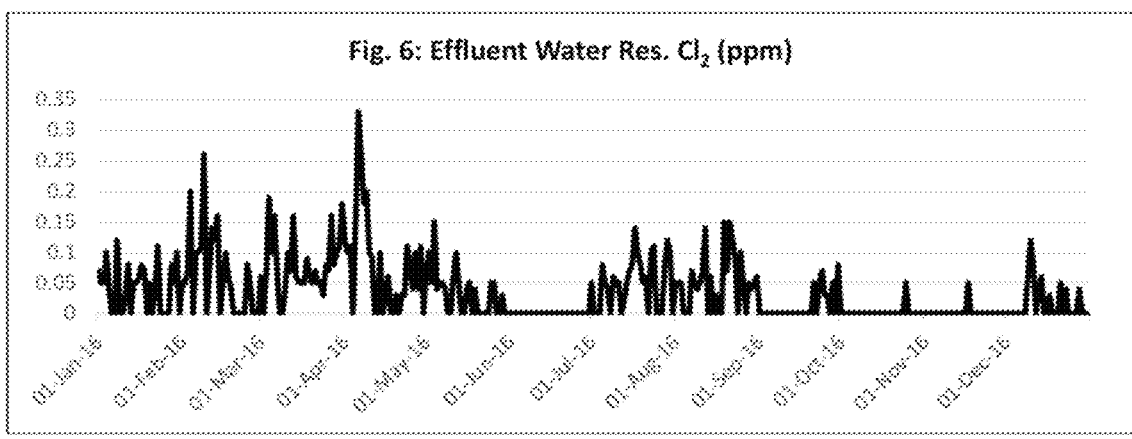
FIG. 5 is a graph showing effluent water residual chlorine (Res. $Cl_2$, ppm) over time (Prior Art).
Figure 6:
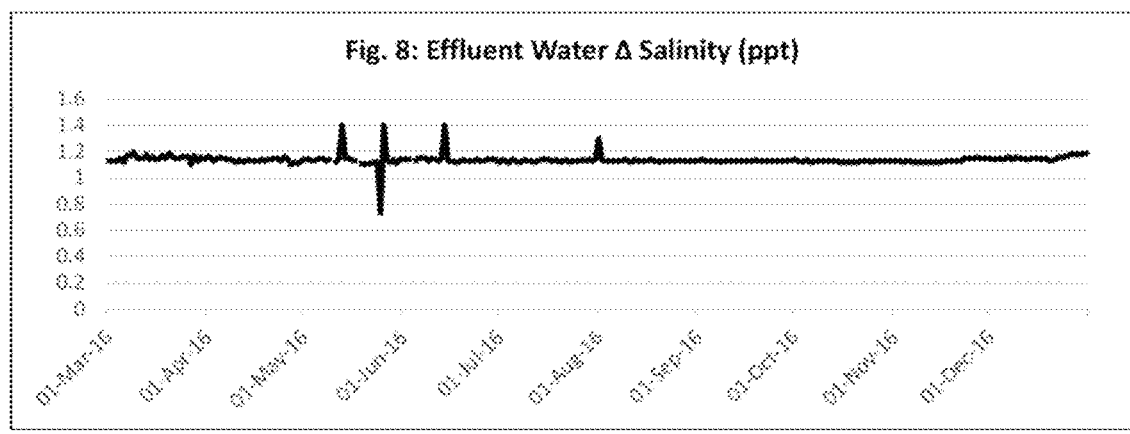
FIG. 6 is a graph showing effluent water change (Δ) in salinity (ppt) over time (Prior Art).

The concentration of Cu in the brine blow-down was routinely monitored by Marafiq-Y on daily basis (FIG. 4). The average of Cu contents detected in the brine blow-down during 8 months was 0.033 mg/l. Other heavy metal concentrations in the Outfall Zone and control area at Marafiq-Y were also determined during a random environmental analyses conducted. The results of these metals showed that the ambient values were slightly lower than the levels in the brine blow-down [Table 1], and the elevations detected were much lower than the allowable limits stipulated by the Saudi Arabian Meteorology and Environmental Protection Administration (MEPA) and the Royal Commission Environmental Regulatory Guidelines.

10 Release of Biocides

Growth of bivalve shells, mussels and barnacles have been experienced sometimes to clog the condenser tubes in Heat Rejection Section of thermal desalination plants. In order to control this biological growth, one of the most economical and commonly used biocide for over decades, i.e., Chlorine ($Cl_2$) gas or its various forms, such as Sodium hypochlorite (NaOCl) or Calcium hypochlorite (Ca(OCl)$_2$) is injected continuously or intermittently at the intake point maintaining an optimum residual $Cl_2$ level of 0.2-0.5 ppm, though Chloramines, Ozone ($O_3$) and Sulfate ($CuSO_4$) are also used in some rare cases.

$Cl_2$ added at the intake on daily basis is estimated to amount to huge quantities. Its rate of consumption at Umm Al-Nar desalination plant (Abu Dhabi) was about 135 m$^3$ per month [202]. Its dosage at the intake of Sitara-I desalination site (Bahrain) was 2 ppm in order to maintain a residual $Cl_2$ level of 0.2 ppm at the outfall. A 30 minutes shock-chlorination was applied at a dose rate of 6 ppm on daily basis at Sitara-II plant [149]. The sum of available free and combined $Cl_2$ residuals were-reported to be present in desalination plant reject streams in the order of 200-500 µg/l [133], which is approximately 10-25% of the dosing concentration. A residual $Cl_2$ of less than 0.5 mg/l was found at the outlet of the Doha West Power Station and 0.05 mg/l at a distance of about 1 km from the outfall [158, 109]. The dose level reported in SWCC Plants varied from 0.04-5.0 ppm and usually a residual $Cl_2$ level of 0.2-0.5 ppm was maintained in the feed water [205]. The residual $Cl_2$ level in brine blow-down of Jeddah, Shoaiba Ph-I and II, Yanbu and Al-Birk sites were reported nil, but its level at Al-Khobar site was found 0.2 ppb. At Mixing Zones, the residual $Cl_2$ level was found below the detection limits at Al-Khobar, Al-Khafji, Jeddah and Al-Birk sites, but 0.05 ppm at Al-Assir site [205].

The residual $Cl_2$ level at Marafiq-Y discharge site was carefully monitored and always found well below the allowable limits set by Saudi Arabian MEPA. During a random environmental analyses also, its level was <0.1 ppm [Table 1].

Following the discharge, a decline by up to 90% in the sum of available free and combined $Cl_2$ residuals' level is expected [201], which will yield an estimated level of 20-50 µg/l in the brine discharge.

11 Release of Disinfection By-Products (DBPs)

The suspected carcinogenic effect of Disinfection By-products (DBPs), such as Tri-halo-methanes (THMs) and Halo-acetic acids (HAAs), etc., have globally created environmental and public health concerns. The formation of DBPs depends on factors like $Cl_2$ dosage, contact time, temperature, pH, concentration of Br ion, humic compounds, etc. [177, 185]. The study carried out by Mayan Kutty, et al., (1990, 1991b) and Mayan Kutty and Al-Jarrah (1991) [176, 178, 175] on the Red Sea and Arabian Gulf coasts of Saudi Arabia brought out valuable information on organic pollutants in the seas adjacent to desalination plants. These investigators reported that total organic carbon (TOC) content in the Red Sea water at Jeddah coast was significantly higher than that of Arabian Gulf seawater at Al-Jubail, Al-Khafji and Al-Khobar sites.

According to Latif, et al., (1989) [167], approximately 11% of THMs initially present in the chlorinated make-up seawater appeared in the product water and the rest were rejected through vent gases and brine blow-down. Abu Qdais, (1999) [103] highlighted ubiquitous nature of halogenated volatile liquid hydrocarbons (HVLHCs) in the vicinity of intake and outfall of desalination plants in Kuwait. Similarly, Ali and Riley (1986) [113] reported 90 ppb of THMs in the immediate vicinity of the point of discharge and less than 1 ppb within few kilometers of a plant in Kuwait. Lattermann, (2011) [171] also reported that residual $Cl_2$ and chlorination by-products—such as THMs, chlorophenols and chlorobenzenes—were detected in desalination plant discharge sites.

However, nothing is known about the extent of environmental impacts of these loads. Moreover, since the level of residual $Cl_2$ in the brine discharge is below detection limits in most of the cases, the reaction between the oxidants/disinfectants and the precursors producing DBPs is expected to be highly unnoticeable.

Marafiq-Y brine discharge sample was also analyzed for the levels of total chlorinated hydrocarbons (DBPs) in a random environment analyses and found <50 µg/l, which is much below the set control limits (Table 1).

12 Release of Coagulants and Coagulant Aids

Usually, RO feed water is pre-treated with various coagulants, such as Ferric or Aluminum Chlorides, to remove silt and suspended particulates. Some organic formulations of higher molecular weights, known as coagulant aids, are also used as supplementary method to enhance coagulation. During dual media filters (DMF) backwash, the flocs containing these coagulants and/or coagulant aids are discharged to the sea. This discharge is so huge at some sites that reddish plume was reported by some investigators. Although no immediate toxic effect of these chemicals has been reported, but increased turbidity in the discharge is obvious which may affect some microorganisms.

13 Intake Water Contamination by Brine Discharges

Intake structures at most of the desalination sites are located subsurface and slightly offshore at depths ranging from 5-15 m, and outfalls at the intertidal levels as surface, being the most common and least expensive brine disposal method. The Red Sea coast being deeper than the Arabian Gulf, the intake structures of SWCC's major desalination plants at Jeddah, Shuaibah and Yanbu are located in open sea at depths of 12, 10 and 15 meters, respectively, whereas the feed water is drawn for Al-Assir site from a depth of 4-5 m. Al-Tayaran and Madany, (1992) [116] mentioned contamination of the feed seawater from Discharge Zone with reference to thermal and high salt contents at Sitara desalination plant (Bahrain). The intake area was found impacted apparently due to spreading of the effluent-mixed seawater. Al-Tayaran and Madany, (1992) [116] computed that the Mixing Zone of the receiving water needed to be extended to 160 m from the outlet point.

The intake structure at Marafiq-Y is an open channel 2.2 km long, 120 m wide, 9-10 m deep, having a flow capacity of 832,000 $m^3/hr$ at a velocity of 0.3 m/s. However, the outfall is quite distant from the intake mouth and chances of intake feed contamination with the brine discharge is highly remote.

The environmental awareness into desalination community warrants redesigning of a robust environmental-hydraulic outfall system taking into interdisciplinary considerations of current discharge practices, environmental issues, discharge modeling and technical viability of safe brine disposal.

Example 2. Impact of Long Term Concentrated Brine Disposal on the Ecosystems of Nearshore Marine Environment—a Case Study Materials and Methods This Procedure covers both scenarios, viz., (i) "Pre-operation Assessment" of the site before starting the construction of a desalination plant, and (ii) "Post-operation Assessment" of the site. It gives a better and comparative narrative of the nature of short-term and long-term impacts caused. It is recommended that checklists are prepared for "Impact Assessment", assessment exercises are carried out on yearly basis, and an "Assessment Register" is maintained by each desalination plant for comparison over times, planning remedial actions in case of severe deviations, and also to determine the cumulative or overall impact during the total life-cycle of the plant operation. It is also recommended that "Assessment Register" is periodically audited by any Regulatory body.

It is utmost vital for desalination plants with overlapping latitudinal ranges, shared oceanographic characteristics and biogeographic significances to record features, such as water exchange, local bathymetry, oceanic circulations, currents and undercurrents, stretches of tidal cycles, etc., of the shared water-bodies.

Experimental Design

1 Work Stations Assignment and Sampling Strategy

Three Sampling Stations are required to be identified, viz., Mixing Zone Work Station (about 50 m offshore, away from immediate Brine Outfall), Recovery Zone Work Station (about 100 m offshore but about 150-250 m distant from Mixing Zone, depending on the site ensuring efficient faster diffusion, dissipation, mixing, dilution and dispersion of the Mixing Zone conditions to normal) and Ambient Zone or Control Work Station for reference purpose (about 1.5 km offshore from the closet seashore in open sea). Since the Mixing Zone is a shifting entity, from season to season and tidal cycles, each plant requires a well-identified Mixing Zone where the brine mixes rapidly and returns to ambient levels, particularly with respect to aquatic life.

Replicate samples should be collected from 5 m (0+5 m), within 5-10 m (0+10 m), within 25-30 m (0+30 m), and the seabed, where possible. The water quality parameters likely to prevail near shore, which are generally anticipated to affect the biodiversity, disrupt the distribution of marine production and food chains, and influence the ecosystem resulting in some biological changes at microscopic level, particularly on the microscopic species floating freely in seawater column, should be thoroughly investigated, the protocols of which are described in this Procedure.

2 Analytical Schemes

This scheme of Analyses is divided into three parts:
(i) Initial Baseline Data collection for reference purpose in future. It is equally applicable for existing operational plants as well as upcoming desalination plants, which are still in site-selection or planning or design phases.
(ii) Routine 24 hours, 7 days a week, online monitoring of important quality-affecting parameters of the effluent, such as temperature, pH, flow, copper concentration, dissolved oxygen (DO) and residual $Cl_2$.
(iii) Annual Exercise to compare the recent-most data with the Initial Baseline Data to assess the degree of deviation or deterioration from the original condition. The Annual Exercise should consist of various types of analyses, such as, (i) Physical and Chemical monitoring, (ii) Marine Observational Survey, (iii) Biological monitoring, (iv) Biochemical and organic monitoring, (v) Microbial monitoring, and (vi) Phylogenetic monitoring.

Data Collection

1 Physical and Chemical Monitoring

In addition to round-the-clock online monitoring of brine reject/effluent quality, following physical and chemical parameters are determined using Auto-Sampler-Composite samples:

Temperature, electrical conductivity, pH, salinity, TSS, TDS, DO, density, turbidity, total hardness, Total Kjeldahl-nitrogen (TKN), biological oxygen demand (BOD), chemical oxygen demand (COD), phenols, total organic carbon (TOC), dissolved organic carbon (DOC), particulate organic carbon (POC), PHCs (e.g., oil and grease), POPs, PCBs, total chlorinated hydrocarbons, DBPs, e.g., trihalo-methanes (THMs), halo-acetic acids (HAAs), chlorophenols, chlorobenzenes, halogenated volatile liquid hydrocarbons (HVLHCs), ammonia, Ca, Mg, Na, $HCO_3$, $SO_4$, Cl, $SiO_2$, residual $Cl_2$, heavy metals (e.g., Fe, Cu, Cr, Ni, Mo, Co, Mn, Zn, Pb, As, Cd, CN, Hg), residue or reaction/degradation products of a variety of chemicals used in the process likely to reach the sea, viz., antiscalant additives (e.g., phosphonate based or synthetic polymers, like polyacrylic acid, polymaleic acid or polycarboxylates, i.e., homopolymers and copolymers of maleic or acrylic acids), antifoam additives (e.g., arcylated polyglycols, fatty-acids and their esters), corrosion inhibitors (e.g., benzotriazole derivatives), membrane cleaning/preservation agents, cleaning agents (e.g., sulfamic acid, chelating agents, e.g., ethylene diamine tetra acetate or EDTA), oxidant scavengers, disinfectants/biocides, polyelectrolyte flocculants, coagulants (e.g., ferric or aluminum chlorides), higher molecular coagulant aids, etc.

2 Marine Observational Surveys

Simultaneously with each Sampling Cycle, the main ocean stressors risking mass extinction of marine habitats, e.g., mangroves and seagrass meadows, and the stocks and populations of marine species, like reef-forming corals, should be physically surveyed, enumerated and accounted. These ocean stressors may be high carbon absorption rate by oceans, mass coral bleaching that kills the tropical coral reefs, explosions of the invasive species including harmful algal blooms, changes in the behavior, fate and toxicity of heavy metals with acidification reducing the limiting effects of iron availability on primary production, increased temperature and acidification that may increase the susceptibility of corals to bleaching and acting synergistically to impact the reproduction and development of other marine invertebrates, increased uptake of plastics by fauna, increased bioavailability of pollutants through adsorption onto the surface of micro plastic particles, etc.

This monitoring protocol should include Marine Observational Survey, which relates to offshore subsea monitoring adjacent to nearby site activities using professional divers, and includes observational approach to aquatic life monitoring and marine data collection for invertebrates, coral disease, bleaching, trash and other impacts, count of thriving fishes of any of a number of genera with their sizes, rare marine life, etc. The Marine Data Collection scheme includes comparative "Substrate Analyses" for hard coral, soft coral, recently killed coral, rubble, sponge, rock, nutrient indicator algae, silt, etc., and basically consist-of following review items:

"Weather Conditions": Changes at the time of sampling in wind speed, wind direction, sky condition (cloudy/clear), air temperature at the surface, water temperatures at the surface and depths, underwater visibility, seawater clarity (clear/turbid), plankton rich water or normal, waves and currents (turbulent/steady).

"State of Coral Reef": Coral species, e.g., milipora, acropora, porites, leather coral, etc., location of pinnacles (near/far from reef slope), any reef with clownfish and sea anemone colony, any noticeable exhaustion, any healthy coral recruitment or dead coral area behind (specially on the reef margin and outer reef slope), degree of coral beaching and coral deaths, any extinction of species, status of algae growth and sedimentation covering the reef crest, changes in the siltation of reef, any distress of the close relative of coral and jellyfish (i.e., anemones) and their recovery with normal pigmentation.

"Fish Population": Fish life in shallow/deep waters with abundance of fish population, comparison of fish diversity and density between different Marine Surveys, presence of large fish and invertebrates, any observation of tending eggs, any healthy coral colonies, nurseries and associated coral fish thriving in the exposed area, species of fish populations on the top of reef table. Underwater photographs should be shot and recorded.

3 Biological Monitoring

Plankton is used as indicators to assess the health of the marine ecosystems. In biological analyses, brine impacts on plankton, which occupy a pre-eminent position in marine food chain and represent a peculiar assemblage of organisms, are assessed. For zooplankton, numeric representation of phyla for the richness of incidence, appearance or absence or sudden increase or complete depletion or adverse reduction of certain community members, accounting the percentile increase or loss in total population of zooplankton (e.g., *annelida, appendicularia, arthropoda, chordata*, protozoa, fish eggs), shift in population during various seasons, density counts of benthic habitat colonizers and environmentally sensitive microorganisms in protozoan, larval, juveniles, planktonic and adult stages, abundance offish eggs and fish larvae, active associates of certain community in biofouling assemblage, hours or days taken to produce replacement generations, etc., are vital for the study.

Similarly, the assessment of phytoplankton, which contributes to about 95% of the marine primary production, for the composition of taxonomic classes, degree of incidence, passively floating planktons, any limitation or drop in the density due to specific characteristics of the brine, any particular zone experiencing depletion of certain genera, loss of major planktonic groups (diatoms, dinoflagellates and blue-green algae), numerical abundance during certain period due to planktonic blooms, most favorable season for the incidence of several species of phytoplankton, site richness in nutrients, areas where fast recovery is observed, brine impact on overall composition of species, reasonable period to produce replacement generations, etc., are of enormous sustainability importance.

4 Biochemical and Organic Monitoring

Hydrographic and atmospheric forces result in some constraints on biogeochemistry of aquatic ecosystems that unveil the patterns of nutrient availability and recycling, and ecosystem metabolism. Understanding ecosystem metabolism and related changes in plankton communities with respect to upper layer dynamics is important as nutrient analyses because stratification and mesoscale eddies control nutrient availability and regenerated nutrient utilization, which is rapidly recycled Nitrogen (N). Strong stratifications may expose plankton community to severe 'N' and Phosphorus (P) shortages. This nutrients deficiency may result in the abundance of heterotrophic dinoflagellates, microzooplankton, and diazotrophs, but noticeable drop in the numbers of phytoplankton and meso-zooplankton. Whereas, mesoscale eddies increase the nutrient availability causing in the abundance of autotrophs (diatoms, prasinophytes) and supporting zooplankton and their larvae. Remote Sensing and in situ profiling (ScanFish) may be used for data collection of sea anomalies and changing water qualities.

As a part of biochemical analyses, it is vital to determine brine impact on the production of chlorophyll because the economy of any aquatic biotope is dominated by chlorophyll pigments and the chlorophyll bearing plants, both in surface and bottom waters, sustain the multiplicity of food webs, make the seas a major source of food and vital sink for atmospheric $CO_2$. Any drop or impediment or loss or depletion in the production of chlorophyll, the region where the production is restricted and the area where it regains and replenishes the production level of the ambient sea, any vigorous increase in the production, etc., should be noticed to evaluate how biologically productive is the area surrounding the brine discharge. Similarly, accumulation of the traces of heavy metals, DBPs, PHCs, POPs, PCBs, DBPs in the digested aquatic animal tissues, and dead and live corals, and their biogeochemical cycling in ecosystems are analyzed and assessed to quantify the actual brine impact on marine life.

The organic analyses include the determination of Total/Dissolved Organic Carbon (TOC/DOC), assimilable organic carbon (AOC), DOC fractions' characterization for biopolymers (MW>20,000 Da, hydrophilic polysaccharides and proteins, biogenic organic matters), humics (MW 800-1,000 Da, hydrophobic), Building Blocks (MW 350-600 Da, breakdown product of humic substances), Low Molecular Weight Acids (MW<350 Da, negatively charged aliphatic and LMW organic acids, biogenic organic matter) and Low Molecular Weight Neutrals (MW<350 Da, weakly or uncharged, hydrophilic, ampiphilic alcohols, aldehydes, ketones, amino acids, amino-sugars, biogenic organic matters), deoxyribonucleic acid, lipids, polyhydroxyaromatics, polyhydroxybutyrate, with their relative proportions, hydrophobic aromatics and hydrophilic matters with lesser aromaticity, humic-like substances, CHN-Elemental Analysis to indicate the abundance of nitrogenous contents and aromaticity of the organic matters and for distinction between fulvic and humic acids.

5 Microbial Monitoring

Active biomass is determined by adenosine-5'-triphosphate (ATP) and heterotrophic plate count (HPC) analyses. The ATP is used to estimate the abundance of living/active biomass for total and cellular ATP, whereas HPC is aimed to calculate microbial colonies as number of colony forming units per milliliter (CFU/ml). The microbial cell counts per unit volume for algal (phytoplankton) and bacterial communities' quantification are carried out by Flow Cytometric (FMC) analysis. To stop any microbial activity after sampling, samples are fixed by adding glutaraldehyde solution to a final concentration of 2% and stored under −20° C. for phytoplankton and total bacterial cell counts by FMC.

For algal cell counts, chlorophyll in cells is excited with blue laser (488 nm wave length) and orange and red fluorescence emissions are measured for differentiation. The stained seawater is excited with blue laser and green fluorescence is collected for bacterial cells quantification and classification as low nucleic acid (LNA) and high nucleic acid (HNA) content cells. LNA and HNA cell counts and phytoplankton cell counts are recorded and compared. The HNA represents actively growing cells.

6 Phylogenetic Analysis

Identification of Microbial Strains

Analysis to characterize microbial diversity and taxonomic affiliation are carried out by next generation 16S ribosomal RNA gene pyro-sequencing. Seawater is filtered through 0.2 μm polycarbonate filter and then the filter is subjected to pre-lysis and nucleic acid extraction. Pyro-sequencing of total genomic DNA is carried out in Genome Sequencer for sequencing bacterial 16S rDNA with variable region targets using the primer and the reverse primer. A large number of sequences per sample of the pre-processed sequence dataset are crosschecked for bacterial diversity with high quality 16S sequences database and analyzed by Paleontological Statistics software. The overall phyla distribution in the samples shows different communities with corresponding percentiles of the total sequences and varying class distribution and abundance. Clustering of sequences dataset with regards to percentile similarity (usually 97%) reveals the grouping of specific operational taxonomic units (OTUs). Bray Curtis Algorithm in Dendrogram and Multidimensional Scaling (MDS) are used to analyze beta-diversity of the sequence dataset considering the abundance and distribution of the OTUs. The MDS of same dataset corroborates the clustering results.

The phyla distribution of sequence datasets, major phyla distribution, corresponding class distribution of the phylum, relative sequence representativeness of major phylotypes and diversity index (Shannon H) are calculated for each sample. The differences between microbial community structure, density and diversity in different Sampling Stations based on phylogenetic affiliation of different OTUs after clustering of the sequence datasets are noted.

Pyro-Sequencing Data Analysis

The data of pyro-sequencing of 16S rRNA gene of the DNA extracted from seawater samples is analyzed. Ribosomal Database Project Classifier (RDPC) is used for taxonomical assignments of 16S rRNA gene sequence sets at 95% confidence level after clustering. Hierarchical assignment files are downloaded from RDPC to assign relative abundance of the sequences at respective genus and the variance in average relative abundance in different Sampling Stations compared to the Reference Point are recorded. The unclassified groups are collated for Principal Component Analysis (PCA) and Bray-Curtis Similarity Analysis (BCSA). Both PCA and BCSA are conducted with square root transformation.

Taxon Distribution of the DNA Samples

The taxon distribution of DNA samples is looked for dominant phyla, then phylum representing the genus affiliated to a sp. by a certain percentile of the sequences, members of a class affiliated to the genus, the genera belonging to a class of certain family, etc., are determined with respective representations. The species are usually more adapted where nutrient competition rules the survival. The phylogenetic affiliation of different OTUs after clustering the sequence datasets indicates the bacterial community in all Station samples, marine sediments and reef coral holobiont with representative concentration profiles.

Temporal Survey of Seawater Microbial Community

Besides ATP and DOC parameters, temporal survey of seawater microbial community is performed. The genera considerably abundant phylotype among certain phyla, the distribution and relative abundance of major phyla at different Sampling Stations are accounted. Also any change in the distribution of major phylotypes in the microbial community composition between the samples is noted.

Microbial Communities Comparison at Different Sampling Stations

The microbial communities sharing some or no similarity with those present in other Sampling Stations are compared in terms of relative abundance.

Relative Abundance of the Bacterial Populations

From total microbial community, the percentile of the relative abundance of predominant phylum in all Sampling Stations and also those which are lesser abundant are calculated. The bacterial population present in the samples may include various unclassified groups and genera.

The monitoring data is used to substantiate if there is any noticeable impact of the brine disposal on the marine aquatic microorganisms.

Data Interpretation, Targets and Criteria/Indicators of Deviation Severity Assignment The values obtained in each set of the above annual monitoring exercise are compared with the baseline data. In case of plants already in operation, the first exercise may be considered as the baseline.

The data is interpreted as follows:
(i) If the annual exercise data is in agreement with the Baseline data by 100-90%, there is zero impact of the brine discharge;
(ii) If the annual data varies by 90-80%, there is very acute or minimal, but nonthreatening impact;
(iii) If the annual data differs by 80-70%, there is moderate degree of impact and warrants planning long-term remedial actions;
(iv) If the annual data disagrees by below 70%, the impact is alarming and needs immediate or short-term Recovery Plans depending on the severity of the deviations; and
(v) If the annual data indicates compliance in most of the sets but deviates in one particular set, that particular set is looked into carefully as per above-mentioned criteria and fixed.

Materials and Methods

The coastal discharges are believed posing serious risks to biological diversity of several marine ecosystems in the world. About 70-90% of the living world still remains unknown to man [La Reiviere (1992)], it is difficult to understand the importance of biodiversity to the functioning of marine ecosystem and their processes. In the context of growing desalination activity, there is a prodigious need for a scientific program to understand the marine biodiversity and its ecological significance so that the environmental impacts of releasing warm and concentrated brine into the coastal waters bordering the region could be properly understood and managed at the species and ecosystem levels. The environmental impact on the aquatic ecosystems needs to be quantified, particularly based on the response of ecosystems, populations, communities and species. The potential to alter the species and community structure of organism living in the water column and on the sea floor needs to be examined besides conventional water quality measurements. The biodiversity has to be used as a reliable quantitative tool to evaluate the environmental impact of anthropogenic activities. Published ecological characterization of the marine sites where effluents from desalination plants are discharged is almost not available.

Marafiq-Y1 produces an average of about 950 m$^3$/hr (minimum 736.66, maximum 1,082.375) of brine discharge on annual basis (FIG. 3). In order to assess the prime effects of the brine discharge from Marafiq-Y1 on marine environment and degree of compliance with environmental regulations, the study mainly covered following aspects:

- The Physico-Chemical impacts of the brine discharge on marine environment, such as changes in temperature, salinity, density, total suspended solids (TSS), turbidity, hydrogen ion concentration (pH), total dissolved solids (TDS), heavy metals, residual $Cl_2$, disinfection byproducts (DBPs), petroleum hydrocarbons (PHCs), persistent organic pollutants (POPs), polychlorinated biphenyls (PCBs), etc.
- Mapping oceanographic features, like currents, waves, tides, stratification, brine transport patterns, buoyancy, discoloration due to residual pretreatment chemicals, ultimate fate of the brine discharge, etc., to evaluate if the location of Discharge Bays are environmentally sustainable.
- Conducting observational survey of marine organisms, to document their incidence and density at all Sampling Stations for environmental impact assessment on the aquatic ecosystems, particularly based on the response of ecosystems, populations, communities and species.
- Studying the potential of brine to alter species and community structure of organisms living in the water column and on the sea floor, besides conventional water quality measurements.
- Identification of microbial strains, characterization of microbial diversity and taxonomic affiliation of the sequences.
- Using biodiversity as a reliable quantitative tool to evaluate the environmental impacts of anthropogenic activities, particularly coastal brine discharge, on marine ecosystem.
- Investigating actual immediate impacts of brine discharge on primary production, chlorophyll production, phytoplankton and zooplankton, overall impacts on the biotic resources, short-term acute and long-term cumulative impacts on living resources, viz., bacteria, plankton, benthos, seagrass ecosystems, and assessment of PHCs, POPs, PCBs and heavy metals for accumulation in aquatic animal tissues and their biogeochemical cycling in the ecosystems.

Since conforming to environmental standards that would protect the species and ecosystems necessitates exigent attention of every desalination facility to focus on the Physico-Chemical impacts of the brine discharge, detailed analyses on quarterly basis from WS1 and WS2 around Outfall Channel of Marafiq-Y1 for elevation in Temperature, Salinity, Turbidity, TSS, heavy metals, Disinfection By-Products (DBPs), Petroleum Hydrocarbons (PHCs), Persistent Organic Pollutants (POPs), Polychlorinated Biphenyls (PCBs), etc., were included in the scope of study. The sampling depths selected will be discussed afterwards. Also the impacts of brine discharge on living resources, such as bacteria, plankton, benthos, and seagrass ecosystems in WS1 and WS2, assessment of PHCs, POPs, PCBs and heavy metals accumulation in aquatic animal tissues and their Bio-geo-chemical cycling in the ecosystems were in the extended scope of the study.

A series of monitoring exercises were undertaken on quarterly basis, including Marine Observational Survey, Lab analyses of replicate samples collected from raw seawater (CS) and designated Working Stations from the Outfall area (WS1 and WS2) for a number a Biological and Physico-Chemical parameters. The Marine Surveys related to the offshore monitoring adjacent to nearby site activities using professional divers and included observational approach to aquatic life monitoring.

Sampling Points' Selection

Figure 8A:
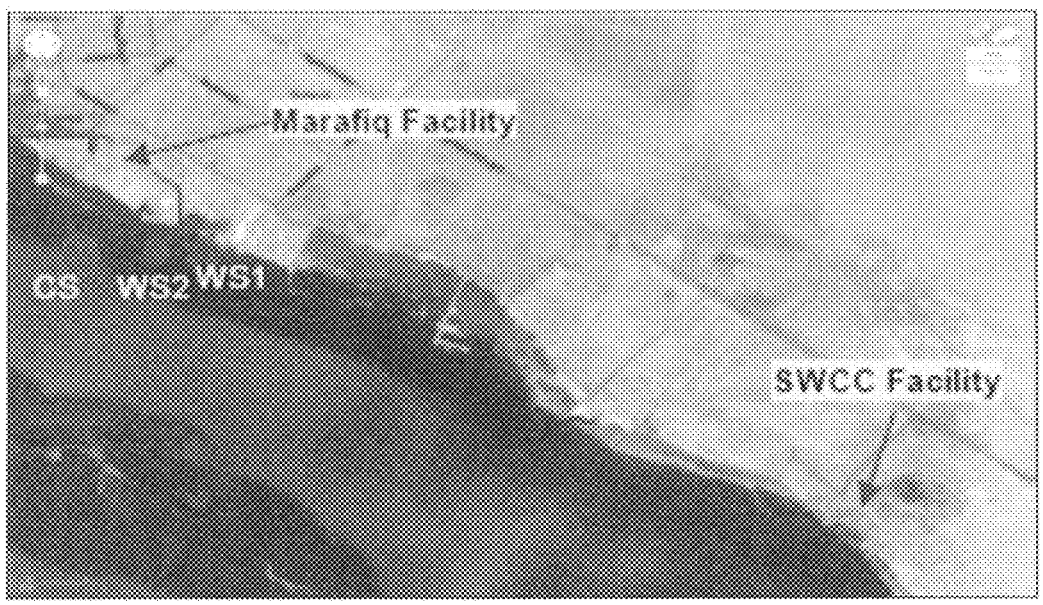
FIG. 8A is a map showing the location of Marafiq facility and monitoring sites CS, WS2, and WS1 (Prior Art).
Figure 8B:
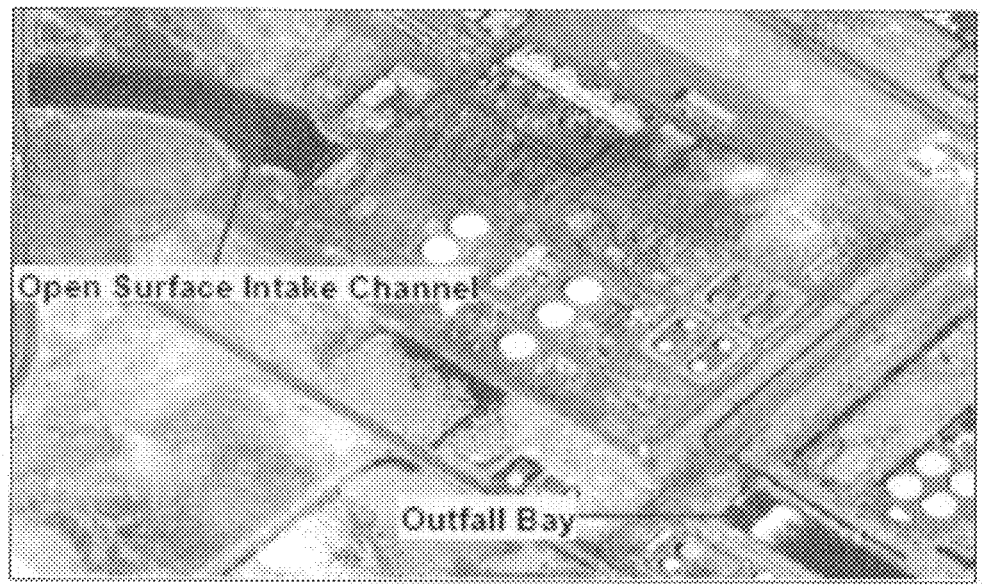
FIG. 8B is a detailed view of Marafiq Yandu facility showing the open surface intake channel and the outfall bay (Prior Art).

The Control Site (CS) or the Point of reference and the Working Stations (WS1 and WS2) were selected nearer to the offshore of Marafiq-Y1 Power and Desalination complex (FIGS. 8A and 8B). The WS1 and WS2 were selected at the Recovery Zone beside the Outfall Bay and WS3 in the Intake Channel. WS1 was located 50 m offshore, WS2 100 m offshore, WS1 being 250 m apart south to SW2 and the CS 1.5 Km northwest to WS2 and also 1.5 Km from the closest seashore. Marafiq-Y1 has distantly apart Intake-Bay and the Outfall Channel, completely in opposite directions, to avoid mixing of the brine discharge with the Intake Water.

Sampling Depths' Selection

Samples were regularly collected within 5 m (0+5 m), 5-10 m (0+10 m), 25-30 m (0+30 m) depths at CS, WS1, WS2 and WS3 for determination of Physico-chemical and biochemical parameters along with numeration and identification of microbial community.

Sampling and Analytical Methods

Seawater and brine water quality and composition were characterized using direct analytical techniques. Samples were collected in triplicate and analyzed, except phylogenetic analysis. Samples were fixed by adding glutaraldehyde solution to a final concentration of 2% and stored under −20° C. for phytoplankton and total bacterial cell counts by Flow Cytometric (FCM), but for the determination of cells counts and estimation of Heterotrophic Pate Count (HPC), samples were analyzed immediately without adding any preservative/fixing agent. All water samples containing residual chlorine were de-chlorinated by adding aqueous Sodium Bisulfite (SBS).

1 Microbial Analyses 1.1 Adenosine-5'-Triphosphate (ATP) Analysis

The ATP, the energy-carrying molecule present in microbial cells, rapidly degrades following the death of cells. The quantification of ATP contents was used to estimate the abundance of living/active biomass. For the measurement of total and cellular ATP or active biomass in samples, ATP analysis was carried out using Celsis ATP Analyzer following the method proposed by Chen and Leung and the ATP concentration was determined using standard calibration curve. Hamilton and Holm-Hanson, etc., have also suggested procedures for cellular ATP [58].

1.2 Heterotrophic Plate Count (HPC)

The seawater sample with culturable cells concentration was spread in triplicate on marine agar 2216 medium (Difco, Becton Dickinson, USA) plates using sterile and disposable spreader for platting. Plates with spread samples were incubated at 28° C. for 5-7 days and microbial colonies were calculated as number of colony forming units per milliliter (CFU/ml) [59].

1.3 Microbial Cell Counts

Microbial cell count per unit volume for algal and bacterial communities' quantification was done by Flow Cytometric (FMC) analysis using FACSVerse Flow Cytometer (Becton Dickinson, Belgium). For algal cell counts, chlorophylls in cells were excited with blue laser (488 nm wavelength) and to differentiate Cyanobacteria from Pico and Nano-eukaryotes, measured orange and red fluorescence emission. For bacterial cell count, incubated seawater stained with SYBR® Green-I solution for 10 minutes in dark at room temperature. Excited the cells with blue laser and collected green fluorescence for quantification. Low Nucleic Acid (LNA) and High Nucleic Acid (HNA) bacteria were determined as suggested by Servais, et al., [60].

2 Phylogenetic Analysis

Microbial diversity analysis of was accomplished by pyro-sequencing of the 16S Ribosomal RNA Gene. Filtered seawater samples through 0.2 µm polycarbonate filter for DNA extraction and phylogenetic analyses. The filter was then subjected to pre-lysis and nucleic acid extraction as per prescribed procedures [61].

2.1 16S RNA Gene Pyro-Sequencing

Carried out pyro-sequencing of total genomic DNA extracted from seawater in Roche-454 FLX Genome Sequencer using standard protocols [62, 63] and accordingly sequenced bacterial 16S rDNA with V2-V3 variable region targets using Primer 27F (5'-AGAGTTT-GATCMTGGCTCAG-3') (SEQ ID NO:1) and Reverse Primer 519R 5' GTNTTACNGCGGCKGCTG (SEQ ID NO:2). Also pre-processed sequence dataset in order to reduce noise and sequencing artifacts including searching for chimeras and clustering as per stated protocol [63].

More than 3000 sequences per sample of the sequence dataset were crosschecked for bacterial diversity with high quality 16S sequences database of the NCBI and analyzed by Paleontological Statistics Software (PAST) [64, 65]. Bray Curtis Algorithm in Dendrogram and Multi-dimension Scaling (MDS) were used for the analysis of beta-diversity of the sequence dataset considering the abundance and distribution of Operational Taxonomic Units (OTU).

3 Organic Analyses 3.1 Total/Dissolved Organic Carbon (TOC/DOC)

For TOC analysis, samples were acidified for the removal of inorganic carbon but for DOC analysis, samples were filtered also using 0.7 µm filters beside acidification. TOC/DOC were determined by High Temp. Catalytic Oxidation (HTCO) of non-purgeable organic carbon using TOC-VCPH Analyzer, Shimadzu (Japan).

3.2 DOC Fractions' Characterization

Further characterization of DOC fractions in biopolymers (MW>20,000 Da, hydrophilic polysaccharides and proteins, biogenic organic matters), humics (MW 800-1,000 Da, hydrophobic) building blocks (MW 350-600 Da, breakdown product of humic substances), Low Molecular Weight Acids (LMWA, MW<350 Da, negatively charged aliphatic and LMW organic acids, biogenic organic matter) and Low Molecular Weight Neutrals (LMWN, MW<350 Da, weakly or uncharged, hydrophilic, ampiphilic alcohols, aldehydes, ketones, amino acids, biogenic organic matters) was done using Liquid Chromatography Organic Carbon Detection (LC-OCD), Germany [66, 67]

3.3 Hydrophobic Aromatics and Hydrophilic Matters' Determination with Lesser Aromaticity UV254 Absorbance was determined for the estimation of humic contents in the water samples using UV-2550 Spectrometer, Shimadzu (Japan). The hydrophobic aromatic and hydrophilic matters with lesser aromaticity were determined by Specific UV Absorbance (SUVA), which is calculated in percentage of UV254 absorbance to the values of DOC.

3.4 Humic-Like Substances' Extraction

Dissolved humic-like substances were extracted from 100 liters of marine samples using the comprehensive XAD-8/XAD-4 resins following standard extraction protocols [68].

4 Supporting Spectroscopic/Microscopic Analytical Techniques 4.1 CHN-Elemental Analysis Flash 2000-Thermo Scientific CHN/O Analyzer was used following the US-EPA 440.0 analytical method [69]. C/N, H/C and O/C atomic ratios indicated the abundance of nitrogenous contents and aromaticity of the organic matters present. O/C ratio was used for distinction between fulvic and humic acids because $O_2$ content is comparatively higher in the case of fulvic acids [70].

4.2 Pyrolysis/Gas Chromatography-Mass Spectrometry (Pyro/GC-MS)

Pyro/GC-MS was used for the comparative analysis of organic composition. The relative biopolymer proportion was calculated by dividing the total peak area of the pyro-chromatogram by its signature pyro-fragment peaks.

After flash pyrolysis using Pyroprobe 5000 (CDS Analytical, Inc., USA) at 650° C. the generated fragments were transferred to Gas Chromatograph Mass Spectrometer (GC-MS) system (Agilent, USA). During pyrolysis, signature fragments were formed for each class of biopolymer class, such as amino-sugars, deoxyribonucleic acid, lipids, polyhydroxyaromatics, proteins, polyhydroxybutyrate and polysaccharides, and their relative proportions were calculated based on the % area of the peaks [71-73].

4.3 Confocal Laser Scanning Microscopic (CLSM) Analysis

Imaging was carried out using LSM-710 Laser Scanning Confocal Microscope (Zeiss, Germany) using ZEN-2009 software. The staining protocol [74, 75] used included SYBR® Green-I to stain cells, SYPRO Orange for proteins, Concanavalin-A for polysaccharides, all having incubation time of 30 min. The difference in fluorescence intensities of the probes were used to distinguish between SYBR-Green and Concanavalin-A.

4.4 Fourier Transform Infrared (FT-IR) Spectroscopy

Attenuated Total Reflection (ATR) on a Spectrum 100 FT-IR (Perkin Elmer, USA) was used for IR analysis. IR bands were selected for fatty acids, humic-like substances, proteins, polysaccharides and nucleic acids as adopted by various investigators [76-81].

4.5 Solid State 13C-Nuclear Magnetic Resonance (NMR) Spectroscopy

NMR spectroscopic analysis was conducted using a 400 MHz SS NMR AVANCE-III Spectrometer with Bruker Topspin 2.1 software for spectral analysis. Spectrums obtained were integrated into five different areas based on the types of resonating carbons for spectral interpretations [83-85].

Results

1 Physico-Chemical Analyses

The need to understand the Physico-Chemical significance with respect to potential impacts of the brine disposal on the near-shore marine environment and environmental compliance were well considered by Marafiq-Y1 by continuous monitoring of the effluent quality using Auto-Sampler-Composite Samples for pH, Residual Chlorine ($Cl_2$), Copper (Cu) Content, $\Delta$ Salinity, Temp., Flow, Total Dissolved Solids (TDS), etc., which remained quasi identical. The average results on annual basis remained: For pH 8.027 (Min: 7.76, Max: 8.42), for Residual $Cl_2$ 0.0372 ppm (Min: 0, Max: 0.33), for Cu Content 25.552 ppb (Min: 6, Max: 34), for $\Delta$ Salinity 1.138 ppt (Min: 0.73, Max: 1.4) and for Temp. 35.53° C. (Min: 26.67, Max: 43.037), as represented in FIGS. 1-6.

Apart from above-mentioned continuous monitoring of Physico-Chemical quality of the brine discharge, detailed analyses were conducted at depths within 5 m (0+5), within 5-10 m (0+10), within 25-30 m (0+30) during 2012 [21] and during 2016. Samples were collected in triplicate on quarterly basis from WS1 and WS2 around Outfall Channel of Marafiq-Y1. The samples were collected from the depths as stated above and analyzed for elevation in Temp., Salinity, Turbidity, TSS, heavy metals, DBPs, PHCs, POPs, PCBs, etc. The results for 2016 are presented in Table 2.

Particular care was taken to assess the accumulation of DBPs, PHCs, POPs, PCBs and heavy metals in aquatic animal tissues and their Bio-geo-chemical cycling in ecosystems, but all results were absent or below detection limits.

TABLE 2

Physico-Chemical qualities of the brine discharge, detailed analyses were conducted in 2016.

| Constituents | Units | Allowable Effluent Levels | Average 0 + 5 m | Average 0 + 10 m | Average 0 + 30 m |
|---|---|---|---|---|---|
| Physio-Chemical Pollutants | | | | | |
| Floatables | Visual | None | ND | ND | ND |
| pH | — | 6-9 | 7.1 | 7.5 | 8.18 |
| TSS | mg/l | Max. 15 | <5 | <5 | <5 |
| DO | mg/l | Min. 70% Saturation | 7.3 | 7.4 | 7.55 |
| Turbidity | NTU | Max. 75 | <1 | <1 | <1 |
| BOD | mg/l | 25 | 5 | 4 | 4 |
| COD | mg/l | 150 | 11 | 11 | 10 |
| Total Kjeldahlnitrogen (TKN) | mg/l | 5 | 3.5 | 2.5 | 1.2 |
| Total Chlorinated Hydrocarbons | mg/l | 0.1 | <50 µg/l | <50 µg/l | <50 µg/l |
| Oil and Grease | mg/l | 8 (should not exceed 15 mg/l in any individual discharge) | <10 | <10 | <10 |
| Phenols | mg/l | 0.1 | <50 µg/l | <50 µg/l | <50 µg/l |
| Non-Organic Pollutants | | | | | |
| Ammonia as N | mg/l | 1 | 0.125 | 0.089 | 0.055 |
| As | mg/l | 0.1 | <0.004 | <0.004 | <0.004 |
| Cd | mg/l | 0.02 | <0.0002 | <0.0002 | <0.0002 |
| Res. $Cl_2$ | mg/l | 0.2 | <0.1 | <0.1 | <0.1 |
| Cr | mg/l | 0.1 | <0.003 | <0.003 | <0.003 |
| Cu | mg/l | 0.2 | <0.002 | <0.002 | <0.002 |
| CN | mg/l | 0.05 | <0.002 | <0.002 | <0.002 |
| Pb | mg/l | 0.1 | <0.003 | <0.003 | <0.003 |
| Hg | mg/l | 0.001 | <0.001 | <0.001 | <0.001 |
| Ni | mg/l | 0.2 | <0.0004 | <0.0004 | <0.0004 |
| Total Phosphorous | mg/l | 1 | <0.020 | <0.016 | <0.018 |
| Zn | mg/l | 1 | <0.004 | <0.004 | <0.004 |
| Fe | mg/l | 1 | 0.028 | 0.026 | 0.015 |
| Biological Pollutants | | | | | |
| Total coliform | MPN/100 ml | 1000 | ND | ND | ND |
| Mixing Zone | | | | | |
| Temp. | ° K | ≤1° K above receiving water | 32.7° C. | 31.1° C. | 29.6° C. |

Note:
All above parameters are within the permissible limits.

2 Substrate Analyses

CS, WS1 and WS2 were subjected to Substrate Analyses on quarterly basis for Segments 1~4 (0-20 m, 25-45 m, 50-70 m, 75-95 m, respectively) for Hard Coral, Soft Coral, Recently Killed Coral, Rubble, Sponge, Rock, Nutrient Indicator Algae, Silt, etc. Table 3 represents the detail of the Substrate Analyses for different observation dates.

Similarly, the detailed Reef Examinations were conducted on quarterly basis for above-stated Segments 1-4. The results of Reef Examination Summary are presented in Tables 4A-4C for different observation dates.

TABLE 3

Data from Substrate Analyses on quarterly basis for Segments 1-4.

| 10:00 Hrs | | | | 14:00 Hrs | | | | 16:00 Hrs | | | |
|---|---|---|---|---|---|---|---|---|---|---|---|

(A) Representative Substrate Data for the Year 2016 (5-9 Jan. 2016)

Segment-1 (0-20 m)

| 0 | RC | 10 | RC | 0 | RC | 10 | RKC | 0 | RB | 10 | SD |
|---|---|---|---|---|---|---|---|---|---|---|---|
| 0.5 | RC | 10.5 | RC | 0.5 | SD | 10.5 | SD | 0.5 | RB | 10.5 | SD |
| 1 | RC | 11 | RC | 1 | SD | 11 | RB | 1 | SD | 11 | SD |
| 1.5 | HC | 11.5 | RC | 1.5 | SD | 11.5 | RC | 1.5 | RB | 11.5 | SD |
| 2 | RC | 12 | RB | 2 | SD | 12 | RC | 2 | RB | 12 | SD |
| 2.5 | RC | 12.5 | RC | 2.5 | SD | 12.5 | RB | 2.5 | RB | 12.5 | SD |
| 3 | RC | 13 | RC | 3 | SD | 13 | RB | 3 | SD | 13 | RB |
| 3.5 | RC | 13.5 | RC | 3.5 | SD | 13.5 | RC | 3.5 | SD | 13.5 | SD |
| 4 | RC | 14 | RC | 4 | SD | 14 | RKC | 4 | RB | 14 | SD |
| 4.5 | RC | 14.5 | RC | 4.5 | SD | 14.5 | RKC | 4.5 | SD | 14.5 | SD |
| 5 | RC | 15 | RC | 5 | RC | 15 | RKC | 5 | SD | 15 | RC |
| 5.5 | RC | 15.5 | RC | 5.5 | RC | 15.5 | RKC | 5.5 | RB | 15.5 | SD |
| 6 | RC | 16 | RC | 6 | RC | 16 | RC | 6 | SD | 16 | SD |
| 6.5 | HC | 16.5 | RC | 6.5 | RC | 16.5 | SD | 6.5 | SD | 16.5 | SD |
| 7 | RB | 17 | RC | 7 | RC | 17 | RB | 7 | SD | 17 | SD |
| 7.5 | HC | 17.5 | HC | 7.5 | RC | 17.5 | RB | 7.5 | SD | 17.5 | SD |
| 8 | HC | 18 | RC | 8 | SD | 18 | RB | 8 | SD | 18 | SD |
| 8.5 | RC | 18.5 | RC | 8.5 | SD | 18.5 | RB | 8.5 | SD | 18.5 | RC |
| 9 | RC | 19 | RC | 9 | RC | 19 | RB | 9 | SD | 19 | RC |
| 9.5 | RC | 19.5 | RC | 9.5 | RC | 19.5 | RB | 9.5 | SD | 19.5 | RC |

Segment-2 (25-45 m)

| 25 | RC | 35 | RB | 25 | SD | 35 | RB | 25 | SD | 35 | SD |
|---|---|---|---|---|---|---|---|---|---|---|---|
| 25.5 | HC | 35.5 | RB | 25.5 | SD | 35.5 | RC | 25.5 | SD | 35.5 | SD |
| 26 | HC | 36 | RC | 26 | RB | 36 | RB | 26 | SD | 36 | RC |
| 26.5 | RC | 36.5 | RC | 26.5 | RC | 36.5 | RB | 26.5 | SD | 36.5 | RC |
| 27 | RC | 37 | RC | 27 | SD | 37 | RC | 27 | SD | 37 | RC |
| 27.5 | RC | 37.5 | RC | 27.5 | SD | 37.5 | RC | 27.5 | SD | 37.5 | SD |
| 28 | RC | 38 | RC | 28 | RC | 38 | RC | 28 | SD | 38 | SD |
| 28.5 | RC | 38.5 | RC | 28.5 | RC | 38.5 | RC | 28.5 | SD | 38.5 | SD |
| 29 | HC | 39 | RKC | 29 | RC | 39 | RB | 29 | SD | 39 | SD |
| 29.5 | RC | 39.5 | RC | 29.5 | RC | 39.5 | HC | 29.5 | SD | 39.5 | SD |
| 30 | RC | 40 | HC | 30 | RC | 40 | RB | 30 | RB | 40 | SD |
| 30.5 | RC | 40.5 | RC | 30.5 | RC | 40.5 | RB | 30.5 | SD | 40.5 | SD |
| 31 | RC | 41 | HC | 31 | SD | 41 | RB | 31 | RB | 41 | SD |
| 31.5 | RC | 41.5 | HC | 31.5 | RC | 41.5 | HC | 31.5 | RB | 41.5 | SD |
| 32 | HC | 42 | RC | 32 | RKC | 42 | RB | 32 | SD | 42 | RC |
| 32.5 | RC | 42.5 | RC | 32.5 | RC | 42.5 | RC | 32.5 | RB | 42.5 | RB |
| 33 | HC | 43 | RC | 33 | RC | 43 | RC | 33 | RB | 43 | RB |
| 33.5 | RC | 43.5 | RC | 33.5 | RC | 43.5 | RC | 33.5 | RB | 43.5 | RB |
| 34 | RC | 44 | RC | 34 | RC | 44 | RC | 34 | RB | 44 | RC |
| 34.5 | RB | 44.5 | RC | 34.5 | SD | 44.5 | SD | 34.5 | SD | 44.5 | RC |

Segment-3 (50-70 m)

| 50 | RC | 60 | HC | 50 | RC | 60 | HC | 50 | RC | 60 | RB |
|---|---|---|---|---|---|---|---|---|---|---|---|
| 50.5 | RC | 60.5 | RC | 50.5 | RC | 60.5 | SD | 50.5 | RC | 60.5 | RB |
| 51 | HC | 61 | RC | 51 | RC | 61 | SD | 51 | SD | 61 | SD |
| 51.5 | RC | 61.5 | HC | 51.5 | HC | 61.5 | SD | 51.5 | SD | 61.5 | SD |
| 52 | RC | 62 | RB | 52 | RC | 62 | SD | 52 | SD | 62 | RB |
| 52.5 | RC | 62.5 | RC | 52.5 | RC | 62.5 | SD | 52.5 | SD | 62.5 | RB |
| 53 | RC | 63 | RC | 53 | RC | 63 | SD | 53 | SD | 63 | RB |
| 53.5 | RC | 63.5 | HC | 53.5 | RC | 63.5 | RB | 53.5 | SD | 63.5 | RC |
| 54 | RC | 64 | RC | 54 | RC | 64 | RB | 54 | SD | 64 | RC |
| 54.5 | RC | 64.5 | RB | 54.5 | RC | 64.5 | SD | 54.5 | SD | 64.5 | RC |
| 55 | RC | 65 | RB | 55 | RB | 65 | SD | 55 | SD | 65 | RC |
| 55.5 | RB | 65.5 | RC | 55.5 | RB | 65.5 | SD | 55.5 | SD | 65.5 | RB |
| 56 | RC | 66 | RC | 56 | RB | 66 | RC | 56 | SD | 66 | RB |
| 10.5 | RKC | 20.5 | RKC | 56.5 | RC | 66.5 | RC | 56.5 | RC | 66.5 | RB |
| 57 | RC | 67 | RC | 57 | RC | 67 | SD | 57 | RC | 67 | RC |
| 57.5 | RC | 67.5 | RC | 57.5 | RC | 67.5 | RC | 57.5 | RC | 67.5 | RC |
| 58 | RB | 68 | RC | 58 | RB | 68 | SD | 58 | SD | 68 | RC |
| 58.5 | RB | 68.5 | RC | 58.5 | RC | 68.5 | SD | 58.5 | SD | 68.5 | RC |
| 59 | RC | 69 | RC | 59 | RC | 69 | SD | 59 | SD | 69 | RB |
| 59.5 | RC | 69.5 | RC | 59.5 | RC | 69.5 | SD | 59.5 | RC | 69.5 | RC |

TABLE 3-continued

Data from Substrate Analyses on quarterly basis for Segments 1-4.

| 10:00 Hrs | | | | 14:00 Hrs | | | | 16:00 Hrs | | | |
|---|---|---|---|---|---|---|---|---|---|---|---|
| Segment-4 (75-95 m) | | | | | | | | | | | |
| 75 | RB | 85 | RC | 75 | RB | 85 | RC | 75 | RC | 85 | RB |
| 75.5 | RC | 85.5 | RC | 75.5 | RB | 85.5 | RC | 75.5 | RC | 85.5 | RB |
| 76 | RC | 86 | RC | 76 | RB | 86 | RB | 76 | RC | 86 | RB |
| 76.5 | RC | 86.5 | HC | 76.5 | RB | 86.5 | RC | 76.5 | RB | 86.5 | SD |
| 77 | RC | 87 | HC | 77 | RC | 87 | SD | 77 | RB | 87 | SD |
| 77.5 | RC | 87.5 | RC | 11.5 | RKC | 87.5 | SD | 77.5 | RC | 87.5 | SD |
| 78 | RC | 88 | RC | 78 | RB | 88 | RC | 78 | HC | 88 | RKC |
| 78.5 | RC | 88.5 | RC | 78.5 | RB | 88.5 | RC | 78.5 | RC | 88.5 | SD |
| 79 | RB | 23 | RKC | 79 | RB | 89 | SD | 79 | RC | 89 | SD |
| 79.5 | RB | 23.5 | RKC | 79.5 | RB | 89.5 | SD | 79.5 | RC | 89.5 | RB |
| 80 | RC | 90 | RC | 80 | RC | 90 | SD | 80 | RC | 90 | RB |
| 80.5 | RC | 24.5 | RKC | 80.5 | RC | 90.5 | SD | 80.5 | RB | 90.5 | SD |
| 81 | RB | 91 | RC | 81 | RB | 91 | SD | 81 | RB | 91 | SD |
| 81.5 | RC | 91.5 | HC | 81.5 | RC | 91.5 | SD | 81.5 | RB | 91.5 | RB |
| 16 | RKC | 92 | SC | 82 | RC | 92 | SD | 82 | RB | 92 | RB |
| 16.5 | RKC | 92.5 | HC | 82.5 | RB | 92.5 | SD | 82.5 | RB | 92.5 | RB |
| 17 | RKC | 93 | RC | 83 | RB | 93 | RB | 83 | RB | 93 | RB |
| 83.5 | RC | 93.5 | RC | 83.5 | RC | 93.5 | RB | 83.5 | RB | 93.5 | RB |
| 84 | RC | 94 | RC | 84 | RC | 94 | RB | 84 | RB | 94 | RB |
| 84.5 | RC | 94.5 | RC | 84.5 | RC | 94.5 | RB | 84.5 | RB | 94.5 | RB |
| (B) Representative Substrate Data for the Year 2017 (2-6 Apr. 2017) | | | | | | | | | | | |
| Segment-1 (0-20 m) | | | | | | | | | | | |
| 0 | SD | 10 | SD | 0 | RC | 10 | SD | 0 | SD | 10 | SD |
| 0.5 | HC | 10.5 | SD | 0.5 | RB | 10.5 | HC | 0.5 | SD | 10.5 | SD |
| 1 | HC | 11 | SD | 1 | SD | 11 | RC | 1 | HC | 11 | SD |
| 1.5 | SD | 11.5 | SD | 1.5 | RC | 11.5 | RC | 1.5 | SD | 11.5 | SD |
| 2 | SD | 12 | SD | 2 | SD | 12 | RC | 2 | SD | 12 | SD |
| 2.5 | SD | 12.5 | SD | 2.5 | SD | 12.5 | RC | 2.5 | SD | 12.5 | SD |
| 3 | SD | 13 | SD | 3 | SD | 13 | RC | 3 | SD | 13 | SD |
| 3.5 | RB | 13.5 | RB | 3.5 | SP | 13.5 | RC | 3.5 | RB | 13.5 | RB |
| 4 | SD | 14 | RB | 4 | RC | 14 | RB | 4 | SD | 14 | RB |
| 4.5 | RB | 14.5 | RC | 4.5 | RB | 14.5 | RB | 4.5 | RB | 14.5 | RC |
| 5 | RB | 15 | RB | 5 | RC | 15 | RC | 5 | RB | 15 | RB |
| 5.5 | RB | 15.5 | SD | 5.5 | SD | 15.5 | RC | 5.5 | RB | 15.5 | SD |
| 6 | SD | 16 | SD | 6 | SD | 16 | RC | 6 | SD | 16 | SD |
| 6.5 | SD | 16.5 | RC | 6.5 | RC | 16.5 | RC | 6.5 | SD | 16.5 | RC |
| 7 | RKC | 17 | SD | 7 | RC | 17 | RC | 7 | SD | 17 | SD |
| 7.5 | SD | 17.5 | SD | 7.5 | SD | 17.5 | RC | 7.5 | SD | 17.5 | SD |
| 8 | SD | 18 | SD | 8 | SD | 18 | RC | 8 | SD | 18 | SD |
| 8.5 | SD | 18.5 | SD | 8.5 | SD | 18.5 | RC | 8.5 | SD | 18.5 | SD |
| 9 | SD | 19 | SD | 9 | SD | 19 | RC | 9 | SD | 19 | SD |
| 9.5 | RKC | 19.5 | SD | 9.5 | RB | 19.5 | RB | 9.5 | SD | 19.5 | SD |
| Segment-2 (25-45 m) | | | | | | | | | | | |
| 25 | SD | 35 | HC | 25 | RB | 35 | RC | 25 | SD | 35 | HC |
| 25.5 | RB | 35.5 | RB | 25.5 | RB | 35.5 | RC | 25.5 | RB | 35.5 | RB |
| 26 | RB | 36 | RC | 26 | RC | 36 | RC | 26 | RB | 36 | RC |
| 26.5 | RB | 36.5 | RB | 26.5 | RC | 36.5 | RB | 26.5 | RB | 36.5 | RB |
| 27 | RC | 37 | RC | 27 | RC | 37 | RB | 27 | RC | 37 | RC |
| 27.5 | RB | 37.5 | RC | 27.5 | RC | 37.5 | RC | 27.5 | RB | 37.5 | RC |
| 28 | RB | 38 | RC | 28 | RC | 38 | HC | 28 | RB | 38 | RC |
| 28.5 | SD | 38.5 | RB | 28.5 | RC | 38.5 | RC | 28.5 | SD | 38.5 | RB |
| 29 | SD | 39 | RB | 29 | RC | 39 | RB | 29 | SD | 39 | RB |
| 29.5 | SD | 39.5 | RB | 29.5 | RB | 39.5 | RB | 29.5 | SD | 39.5 | RB |
| 30 | SD | 40 | SD | 30 | RB | 40 | RB | 30 | SD | 40 | SD |
| 30.5 | RC | 40.5 | SD | 30.5 | RC | 40.5 | RC | 30.5 | RC | 40.5 | SD |
| 31 | RC | 41 | RB | 31 | RC | 41 | RC | 31 | RC | 41 | RB |
| 31.5 | RB | 41.5 | SD | 31.5 | RC | 41.5 | SD | 31.5 | RB | 41.5 | SD |
| 32 | SD | 42 | SP | 32 | RC | 42 | RB | 32 | SD | 42 | SP |
| 32.5 | SD | 42.5 | SD | 32.5 | RB | 42.5 | SD | 32.5 | SD | 42.5 | SD |
| 33 | SD | 43 | SD | 33 | RC | 43 | SD | 33 | SD | 43 | SD |
| 33.5 | RC | 43.5 | SD | 33.5 | RC | 43.5 | RB | 33.5 | RC | 43.5 | SD |
| 34 | RB | 44 | SD | 34 | RC | 44 | SD | 34 | RB | 44 | SD |
| 34.5 | RKC | 44.5 | SD | 34.5 | RB | 44.5 | SD | 34.5 | RC | 44.5 | SD |
| Segment-3 (50-70 m) | | | | | | | | | | | |
| 50 | SD | 60 | SD | 50 | RC | 60 | SD | 50 | SD | 60 | SD |
| 50.5 | RC | 60.5 | RC | 50.5 | RC | 60.5 | SD | 50.5 | RC | 60.5 | RC |
| 51 | RC | 61 | RC | 51 | RB | 61 | RB | 51 | RC | 61 | RC |
| 51.5 | RC | 61.5 | SD | 51.5 | RB | 61.5 | RC | 51.5 | RC | 61.5 | SD |
| 52 | RC | 62 | SD | 52 | RB | 62 | RB | 52 | RC | 62 | SD |
| 52.5 | RC | 62.5 | RC | 52.5 | RB | 62.5 | RB | 52.5 | RC | 62.5 | RC |
| 53 | SD | 63 | RC | 53 | RB | 63 | RB | 53 | SD | 63 | RC |

TABLE 3-continued

Data from Substrate Analyses on quarterly basis for Segments 1-4.

| 10:00 Hrs | | | 14:00 Hrs | | | 16:00 Hrs | | |
|---|---|---|---|---|---|---|---|---|
| 53.5 | SD | 63.5 | RC | 53.5 | RC | 63.5 | RB | 53.5 | SD | 63.5 | RC |
| 54 | SD | 64 | RB | 54 | RC | 64 | RC | 54 | SD | 64 | RB |
| 54.5 | RC | 64.5 | SD | 54.5 | RB | 64.5 | RB | 54.5 | RC | 64.5 | SD |
| 55 | SD | 65 | RB | 55 | RC | 65 | RB | 55 | SD | 65 | RB |
| 55.5 | SD | 65.5 | RB | 55.5 | RC | 65.5 | RB | 55.5 | SD | 65.5 | RB |
| 56 | SD | 66 | RC | 56 | RC | 66 | RB | 56 | SD | 66 | RC |
| 10.5 | SD | 20.5 | RC | 56.5 | RB | 66.5 | RC | 56.5 | SD | 66.5 | RC |
| 57 | RB | 67 | RC | 57 | RC | 67 | RB | 57 | RB | 67 | RC |
| 57.5 | RB | 67.5 | RC | 57.5 | RC | 67.5 | RB | 57.5 | RB | 67.5 | RC |
| 58 | RB | 68 | SD | 58 | RC | 68 | RC | 58 | RB | 68 | SD |
| 58.5 | RB | 68.5 | SD | 58.5 | SD | 68.5 | RB | 58.5 | RB | 68.5 | SD |
| 59 | RB | 69 | SD | 59 | SD | 69 | RB | 59 | SD | 69 | SD |
| 59.5 | SD | 69.5 | SD | 59.5 | SD | 69.5 | RB | 59.5 | RB | 69.5 | SD |

Segment-4 (75-95 m)

| 75 | RB | 85 | RB | 75 | SD | 85 | RC | 75 | RB | 85 | RB |
|---|---|---|---|---|---|---|---|---|---|---|---|
| 75.5 | RB | 85.5 | RB | 75.5 | SD | 85.5 | SD | 75.5 | RB | 85.5 | RB |
| 76 | RB | 86 | SD | 76 | SD | 86 | SD | 76 | RB | 86 | SD |
| 76.5 | RB | 86.5 | SD | 76.5 | SD | 86.5 | RB | 76.5 | RB | 86.5 | SD |
| 77 | RC | 87 | SD | 77 | SD | 87 | RB | 77 | RC | 87 | SD |
| 77.5 | RC | 87.5 | RB | 11.5 | RB | 87.5 | RB | 77.5 | RC | 87.5 | RB |
| 78 | RC | 88 | RB | 78 | SD | 88 | RC | 78 | RC | 88 | RB |
| 78.5 | RC | 88.5 | RB | 78.5 | RC | 88.5 | RB | 78.5 | RC | 88.5 | RB |
| 79 | RC | 23 | RC | 79 | RB | 89 | RB | 79 | RC | 89 | RC |
| 79.5 | RB | 23.5 | SD | 79.5 | RB | 89.5 | RB | 79.5 | RB | 89.5 | SD |
| 80 | RKC | 90 | SD | 80 | RB | 90 | RC | 80 | RB | 90 | SD |
| 80.5 | RC | 24.5 | SD | 80.5 | RB | 90.5 | RB | 80.5 | RC | 90.5 | SD |
| 81 | RB | 91 | RC | 81 | RB | 91 | RC | 81 | RB | 91 | RC |
| 81.5 | RB | 91.5 | RC | 81.5 | RB | 91.5 | SD | 81.5 | RB | 91.5 | SP |
| 16 | SD | 92 | SD | 82 | RB | 92 | RC | 82 | SD | 92 | SD |
| 16.5 | SD | 92.5 | SD | 82.5 | RB | 92.5 | RC | 82.5 | SD | 92.5 | SD |
| 17 | RC | 93 | RB | 83 | RC | 93 | SD | 83 | RC | 93 | SD |
| 83.5 | SD | 93.5 | SD | 83.5 | RB | 93.5 | SD | 83.5 | SD | 93.5 | RB |
| 84 | SD | 94 | RB | 84 | RB | 94 | RC | 84 | SD | 94 | SD |
| 84.5 | SD | 94.5 | RB | 84.5 | RC | 94.5 | RC | 84.5 | SD | 94.5 | RB |

(C) Representative Substrate Data for the Year 2018 (1-5 Jul. 2018)

Segment-1 (0-20 m)

| 0 | HC | 10 | RC | 0 | RC | 10 | SD | 0 | SD | 10 | SD |
|---|---|---|---|---|---|---|---|---|---|---|---|
| 0.5 | RC | 10.5 | RC | 0.5 | RC | 10.5 | SD | 0.5 | SD | 10.5 | SD |
| 1 | RC | 11 | RC | 1 | RB | 11 | RB | 1 | SD | 11 | RB |
| 1.5 | HC | 11.5 | RC | 1.5 | SD | 11.5 | RC | 1.5 | RB | 11.5 | SD |
| 2 | RC | 12 | HC | 2 | SD | 12 | RC | 2 | RB | 12 | SD |
| 2.5 | RC | 12.5 | RC | 2.5 | RB | 12.5 | RC | 2.5 | SD | 12.5 | SD |
| 3 | SC, RC | 13 | RC | 3 | SD | 13 | RC | 3 | SD | 13 | SD |
| 3.5 | RC | 13.5 | RC | 3.5 | RC | 13.5 | RC | 3.5 | SD | 13.5 | SD |
| 4 | RC | 14 | RC | 4 | RC | 14 | RC | 4 | SD | 14 | SD |
| 4.5 | RC | 14.5 | RC | 4.5 | RC | 14.5 | SD, | 4.5 | RB | 14.5 | SD |
| 5 | RC | 15 | RC | 5 | RC | 15 | RC | 5 | RB | 15 | SD |
| 5.5 | RC | 15.5 | RC | 5.5 | RC | 15.5 | RB | 5.5 | RC | 15.5 | SD |
| 6 | RC | 16 | RC | 6 | RC | 16 | RC | 6 | RB | 16 | RB |
| 6.5 | RC | 16.5 | RC | 6.5 | SD | 16.5 | RC | 6.5 | RB | 16.5 | RC |
| 7 | RC | 17 | RC | 7 | RB | 17 | RC | 7 | RB | 17 | SD |
| 7.5 | RB | 17.5 | RC | 7.5 | RC | 17.5 | RC | 7.5 | SD | 17.5 | SD |
| 8 | RC | 18 | RC | 8 | RC | 18 | RB | 8 | SD | 18 | SD |
| 8.5 | RC | 18.5 | RC | 8.5 | HC | 18.5 | RB | 8.5 | RB | 18.5 | SD |
| 9 | SC | 19 | RC | 9 | HC | 19 | RB | 9 | SD | 19 | RB |
| 9.5 | RC | 19.5 | RC | 9.5 | SD | 19.5 | RB | 9.5 | SD | 19.5 | RB |

Segment-2 (25-45 m)

| 25 | RC | 35 | RB | 25 | RB | 35 | RC | 25 | RB | 35 | SD |
|---|---|---|---|---|---|---|---|---|---|---|---|
| 25.5 | RC | 35.5 | RB | 25.5 | SD | 35.5 | RC | 25.5 | RB | 35.5 | SD |
| 26 | RC | 36 | RB | 26 | RB | 36 | RC | 26 | RB | 36 | SD |
| 26.5 | RC | 36.5 | RC | 26.5 | RB | 36.5 | RC | 26.5 | RB | 36.5 | SD |
| 27 | RC | 37 | RC | 27 | RC | 37 | RC | 27 | RB | 37 | RC |
| 27.5 | RC | 37.5 | RC | 27.5 | RC | 37.5 | RC | 27.5 | SD | 37.5 | RC |
| 28 | RC | 38 | RC | 28 | RC | 38 | RC | 28 | RB | 38 | SD |
| 28.5 | RC | 38.5 | RC | 28.5 | SD | 38.5 | RC | 28.5 | SD | 38.5 | SD |
| 29 | RC | 39 | RC | 29 | RB | 39 | RC | 29 | RB | 39 | RC |
| 29.5 | RC | 39.5 | RC | 29.5 | RC | 39.5 | RB | 29.5 | SD | 39.5 | SD |
| 30 | RC | 40 | RC | 30 | RB | 40 | RB | 30 | SD | 40 | SD |
| 30.5 | RC | 40.5 | RC | 30.5 | SD | 40.5 | RC | 30.5 | RB | 40.5 | SD |
| 31 | RC | 41 | RC | 31 | RC | 41 | RC | 31 | RB | 41 | RC |
| 31.5 | RC | 41.5 | RC | 31.5 | RC | 41.5 | RC | 31.5 | SD | 41.5 | RB |
| 32 | RC | 42 | RC | 32 | RC | 42 | RB | 32 | SD | 42 | RB |
| 32.5 | RC | 42.5 | RC | 32.5 | RB | 42.5 | RB | 32.5 | RC | 42.5 | RC |

TABLE 3-continued

Data from Substrate Analyses on quarterly basis for Segments 1-4.

| 10:00 Hrs | | | 14:00 Hrs | | | 16:00 Hrs | | |
|---|---|---|---|---|---|---|---|---|
| 33 | RC | 43 | RC | 33 | RC | 43 | RB | 33 | SD | 43 | RC |
| 33.5 | RC | 43.5 | RC | 33.5 | RC | 43.5 | RC | 33.5 | SD | 43.5 | RB |
| 34 | RC | 44 | RC | 34 | RC | 44 | RC | 34 | SD | 44 | RB |
| 34.5 | HC | 44.5 | RC | 34.5 | SD | 44.5 | HC | 34.5 | SP | 44.5 | RB |

Segment-3 (50-70 m)

| 50 | RC | 60 | RC | 50 | RC | 60 | SD | 50 | RC | 60 | SD |
|---|---|---|---|---|---|---|---|---|---|---|---|
| 50.5 | RC | 60.5 | RC | 50.5 | RC | 60.5 | SD | 50.5 | RC | 60.5 | SD |
| 51 | RC | 61 | RC | 51 | HC | 61 | RC | 51 | SD | 61 | SD |
| 51.5 | RC | 61.5 | RC | 51.5 | RC | 61.5 | RC | 51.5 | SD | 61.5 | SD |
| 52 | RC | 62 | RC | 52 | RC | 62 | RC | 52 | SD | 62 | SD |
| 52.5 | RC | 62.5 | RC | 52.5 | RC | 62.5 | RB | 52.5 | SD | 62.5 | RC |
| 53 | RC | 63 | RC | 53 | RB | 63 | RB | 53 | SD | 63 | RC |
| 53.5 | RC | 63.5 | RC | 53.5 | RB | 63.5 | RB | 53.5 | SD | 63.5 | RB |
| 54 | RC | 64 | RC | 54 | RB | 64 | RB | 54 | RC | 64 | RB |
| 54.5 | RC | 64.5 | RC | 54.5 | RC | 64.5 | RB | 54.5 | SD | 64.5 | RB |
| 55 | RC | 65 | RC | 55 | RC | 65 | RC | 55 | SD | 65 | RB |
| 55.5 | RC | 65.5 | RC | 55.5 | RB | 65.5 | RC | 55.5 | SD | 65.5 | RB |
| 56 | RC | 66 | RC | 56 | RB | 66 | RC | 56 | RC | 66 | RC |
| 10.5 | RC | 20.5 | RC | 56.5 | HC | 66.5 | RC | 56.5 | RC | 66.5 | RC |
| 57 | RC | 67 | RC | 57 | RB | 67 | SD | 57 | RB | 67 | RB |
| 57.5 | RC | 67.5 | RC | 57.5 | RC | 67.5 | SD | 57.5 | RB | 67.5 | RB |
| 58 | RC | 68 | RC | 58 | RB | 68 | SD | 58 | RC | 68 | RB |
| 58.5 | RC | 68.5 | RC | 58.5 | RB | 68.5 | SD | 58.5 | RC | 68.5 | RC |
| 59 | RC | 69 | RC | 59 | SD | 69 | RC | 59 | SD | 69 | RC |
| 59.5 | RC | 69.5 | RC | 59.5 | SD | 69.5 | SD | 59.5 | RC | 69.5 | RC |

Segment-4 (75-95 m)

| 75 | RC | 85 | RC | 75 | RB | 85 | RC | 75 | RC | 85 | SD |
|---|---|---|---|---|---|---|---|---|---|---|---|
| 75.5 | HC | 85.5 | RC | 75.5 | RC | 85.5 | RC | 75.5 | RC | 85.5 | SD |
| 76 | RC | 86 | RC | 76 | RC | 86 | RC | 76 | RC | 86 | SD |
| 76.5 | RC | 86.5 | RC | 76.5 | RC | 86.5 | SD | 76.5 | RC | 86.5 | SB |
| 77 | RC | 87 | RC | 77 | RC | 87 | RC | 77 | RB | 87 | SB |
| 77.5 | RC | 87.5 | RC | 11.5 | RB | 87.5 | SD | 77.5 | RB | 87.5 | SB |
| 78 | RC | 88 | RC | 78 | RB | 88 | RC | 78 | RB | 88 | SB |
| 78.5 | RC | 88.5 | RC | 78.5 | RB | 88.5 | RC | 78.5 | RC | 88.5 | SB |
| 79 | RC | 23 | RC | 79 | RC | 89 | SD | 79 | RC | 89 | SD |
| 79.5 | RC | 23.5 | RC | 79.5 | SD | 89.5 | SC | 79.5 | RC | 89.5 | SD |
| 80 | RC | 90 | HC | 80 | SD | 90 | SD | 80 | RB | 90 | SD |
| 80.5 | RC | 24.5 | RC | 80.5 | RB | 90.5 | SD | 80.5 | RB | 90.5 | SD |
| 81 | RC | 91 | RC | 81 | RB | 91 | RC | 81 | RB | 91 | SD |
| 81.5 | RC | 91.5 | RC | 81.5 | RB | 91.5 | RC | 81.5 | RB | 91.5 | SD |
| 16 | RC | 92 | RC | 82 | RB | 92 | RC | 82 | RB | 92 | RB |
| 16.5 | RC | 92.5 | RC | 82.5 | RB | 92.5 | RC | 82.5 | RB | 92.5 | RC |
| 17 | RC | 93 | RC | 83 | RB | 93 | RC | 83 | RC | 93 | RC |
| 83.5 | RC | 93.5 | RC | 83.5 | RC | 93.5 | SD | 83.5 | RC | 93.5 | RC |
| 84 | RC | 94 | RC | 84 | RC | 94 | RC | 84 | RC | 94 | RC |
| 84.5 | RC | 94.5 | RC | 84.5 | RC | 94.5 | RC | 84.5 | RC | 94.5 | RC |

(D) Representative Substrate Data for the Year 2019 (2-6 Oct. 2019)

Segment-1 (0-20 m)

| 0 | HC | 10 | RC | 0 | RC | 10 | RC | 0 | RC | 10 | RB |
|---|---|---|---|---|---|---|---|---|---|---|---|
| 0.5 | RC | 10.5 | RC | 0.5 | RB | 10.5 | RC | 0.5 | SD | 10.5 | SD |
| 1 | RC | 11 | RC | 1 | RB | 11 | RC | 1 | RC | 11 | SD |
| 1.5 | RB | 11.5 | RC | 1.5 | RC | 11.5 | RC | 1.5 | SD | 11.5 | RC |
| 2 | RC | 12 | RC | 2 | RB | 12 | RC | 2 | SD | 12 | SD |
| 2.5 | HC | 12.5 | RC | 2.5 | RC | 12.5 | RC | 2.5 | SD | 12.5 | RC |
| 3 | RC | 13 | RB | 3 | RB | 13 | RC | 3 | SD | 13 | SD |
| 3.5 | RC | 13.5 | RC | 3.5 | HC | 13.5 | RB | 3.5 | SD | 13.5 | SD |
| 4 | RC | 14 | RC | 4 | RC | 14 | RB | 4 | RC | 14 | SD |
| 4.5 | RC | 14.5 | RC | 4.5 | SD | 14.5 | RC | 4.5 | RC | 14.5 | SD |
| 5 | RC | 15 | RB | 5 | SD | 15 | RB | 5 | RB | 15 | SD |
| 5.5 | RC | 15.5 | RC | 5.5 | SD | 15.5 | RB | 5.5 | RB | 15.5 | SD |
| 6 | RC | 16 | RC | 6 | SD | 16 | RB | 6 | SD | 16 | SD |
| 6.5 | RC | 16.5 | RC | 6.5 | SD | 16.5 | RC | 6.5 | RC | 16.5 | SD |
| 7 | HC | 17 | RC | 7 | RC | 17 | RC | 7 | RB | 17 | RB |
| 7.5 | RC | 17.5 | RC | 7.5 | RC | 17.5 | RB | 7.5 | SD | 17.5 | RC |
| 8 | RC | 18 | RC | 8 | RC | 18 | RC | 8 | RB | 18 | RB |
| 8.5 | HC | 18.5 | RC | 8.5 | RB | 18.5 | RB | 8.5 | SD | 18.5 | SD |
| 9 | HC | 19 | HC | 9 | SD | 19 | HC | 9 | SD | 19 | SD |
| 9.5 | RC | 19.5 | HC | 9.5 | RC | 19.5 | RC | 9.5 | RC | 19.5 | RC |

Segment-2 (25-45 m)

| 25 | SC | 35 | RC | 25 | RC | 35 | RB | 25 | RC | 35 | RC |
|---|---|---|---|---|---|---|---|---|---|---|---|
| 25.5 | RC | 35.5 | RC | 25.5 | RC | 35.5 | RB | 25.5 | RC | 35.5 | RB |
| 26 | RC | 36 | RC | 26 | RC | 36 | RB | 26 | RC | 36 | RB |

TABLE 3-continued

Data from Substrate Analyses on quarterly basis for Segments 1-4.

| 10:00 Hrs | | | 14:00 Hrs | | | 16:00 Hrs | | | |
|---|---|---|---|---|---|---|---|---|---|
| 26.5 | RC | 36.5 | RC | 26.5 | RB | 36.5 | RB | 26.5 | RB | 36.5 | RB |
| 27 | RC | 37 | RC | 27 | RB | 37 | HC | 27 | HC | 37 | SD |
| 27.5 | RC | 37.5 | RC | 27.5 | RB | 37.5 | RB | 27.5 | SC | 37.5 | SD |
| 28 | HC | 38 | RC | 28 | RB | 38 | HC | 28 | RC | 38 | SD |
| 28.5 | RC | 38.5 | RC | 28.5 | RB | 38.5 | RB | 28.5 | RC | 38.5 | SD |
| 29 | RC | 39 | RC | 29 | RB | 39 | RB | 29 | HC | 39 | SD |
| 29.5 | RC | 39.5 | RC | 29.5 | RC | 39.5 | RB | 29.5 | RC | 39.5 | SD |
| 30 | RC | 40 | RC | 30 | RB | 40 | RC | 30 | RC | 40 | SD |
| 30.5 | RC | 40.5 | RC | 30.5 | RB | 40.5 | HC | 30.5 | RB | 40.5 | SD |
| 31 | RC | 41 | RC | 31 | SD | 41 | SD | 31 | RC | 41 | SD |
| 31.5 | RC | 41.5 | RC | 31.5 | SD | 41.5 | RC | 31.5 | RC | 41.5 | SD |
| 32 | RC | 42 | RC | 32 | RC | 42 | RB | 32 | RB | 42 | SD |
| 32.5 | RC | 42.5 | RC | 32.5 | RB | 42.5 | RB | 32.5 | RB | 42.5 | SD |
| 33 | RB | 43 | RC | 33 | SD | 43 | SD | 33 | RC | 43 | SD |
| 33.5 | RC | 43.5 | RC | 33.5 | SD | 43.5 | RC | 33.5 | RC | 43.5 | SD |
| 34 | RC | 44 | RC | 34 | RB | 44 | RB | 34 | SD | 44 | SD |
| 34.5 | RC | 44.5 | RB | 34.5 | RB | 44.5 | RB | 34.5 | SD | 44.5 | SD |

Segment-3 (50-70 m)

| 50 | RC | 60 | RC | 50 | RC | 60 | HC | 50 | SD | 60 | SD |
|---|---|---|---|---|---|---|---|---|---|---|---|
| 50.5 | RC | 60.5 | RC | 50.5 | RC | 60.5 | RC | 50.5 | SD | 60.5 | SD |
| 51 | RC | 61 | HC | 51 | RC | 61 | RC | 51 | SD | 61 | SD |
| 51.5 | RC | 61.5 | RB | 51.5 | RB | 61.5 | RC | 51.5 | SD | 61.5 | RB |
| 52 | RC | 62 | RB | 52 | RB | 62 | RC | 52 | SD | 62 | RC |
| 52.5 | RC | 62.5 | RB | 52.5 | RC | 62.5 | RC | 52.5 | SD | 62.5 | RC |
| 53 | RC | 63 | RB | 53 | RB | 63 | RC | 53 | RB | 63 | SD |
| 53.5 | RC | 63.5 | RC | 53.5 | RB | 63.5 | SD | 53.5 | RB | 63.5 | SD |
| 54 | RC | 64 | RC | 54 | RB | 64 | RC | 54 | RB | 64 | RC |
| 54.5 | RC | 64.5 | RC | 54.5 | RB | 64.5 | RC | 54.5 | RC | 64.5 | SD |
| 55 | RC | 65 | RC | 55 | RB | 65 | RC | 55 | RC | 65 | SD |
| 55.5 | RC | 65.5 | RC | 55.5 | RB | 65.5 | RC | 55.5 | RC | 65.5 | SD |
| 56 | RC | 66 | RC | 56 | RC | 66 | RC | 56 | RC | 66 | SD |
| 10.5 | RC | 20.5 | RC | 56.5 | RB | 66.5 | SD | 56.5 | RB | 66.5 | SD |
| 57 | RB | 67 | HC | 57 | RB | 67 | SD | 57 | RB | 67 | SD |
| 57.5 | RB | 67.5 | HC | 57.5 | RC | 67.5 | SD | 57.5 | RB | 67.5 | SD |
| 58 | RB | 68 | RC | 58 | RC | 68 | RB | 58 | RB | 68 | SD |
| 58.5 | RB | 68.5 | RC | 58.5 | HC | 68.5 | SD | 58.5 | RB | 68.5 | SD |
| 59 | RC | 69 | RC | 59 | RC | 69 | RC | 59 | RB | 69 | SD |
| 59.5 | RC | 69.5 | HC | 59.5 | RC | 69.5 | RC | 59.5 | SD | 69.5 | RC |

Segment-4 (75-95 m)

| 75 | RC | 85 | RC | 75 | HC | 85 | RC | 75 | RB | 85 | SD |
|---|---|---|---|---|---|---|---|---|---|---|---|
| 75.5 | RC | 85.5 | RC | 75.5 | RC | 85.5 | RC | 75.5 | RB | 85.5 | RC |
| 76 | RC | 86 | RB | 76 | SD | 86 | RB | 76 | RB | 86 | SD |
| 76.5 | RC | 86.5 | RB | 76.5 | HC | 86.5 | SD | 76.5 | RB | 86.5 | SD |
| 77 | RC | 87 | RC | 77 | RC | 87 | RB | 77 | RB | 87 | SD |
| 77.5 | RC | 87.5 | RB | 11.5 | RC | 87.5 | RB | 77.5 | RB | 87.5 | SD |
| 78 | RC | 88 | RB | 78 | RB | 88 | RB | 78 | RB | 88 | SD |
| 78.5 | RC | 88.5 | RC | 78.5 | RB | 88.5 | RB | 78.5 | RB | 88.5 | SD |
| 79 | HC | 23 | HC | 79 | HC | 89 | RB | 79 | RB | 89 | SD |
| 79.5 | HC | 23.5 | RB | 79.5 | SD | 89.5 | RB | 79.5 | RB | 89.5 | SD |
| 80 | RC | 90 | RC | 80 | RC | 90 | RB | 80 | SD | 90 | SD |
| 80.5 | RC | 24.5 | RC | 80.5 | SD | 90.5 | RC | 80.5 | SD | 90.5 | SD |
| 81 | RC | 91 | RC | 81 | RC | 91 | SD | 81 | SD | 91 | RB |
| 81.5 | RC | 91.5 | RC | 81.5 | RB | 91.5 | SP | 81.5 | SD | 91.5 | SD |
| 16 | RC | 92 | RC | 82 | RC | 92 | SD | 82 | SD | 92 | SD |
| 16.5 | RC | 92.5 | RC | 82.5 | RC | 92.5 | SD | 82.5 | SD | 92.5 | SD |
| 17 | RC | 93 | RC | 83 | RB | 93 | RC | 83 | SD | 93 | SD |
| 83.5 | RC | 93.5 | RC | 83.5 | SD | 93.5 | RC | 83.5 | SD | 93.5 | SD |
| 84 | RC | 94 | RC | 84 | SD | 94 | RC | 84 | RC | 94 | SD |
| 84.5 | HC | 94.5 | RC | 84.5 | HC | 94.5 | SD | 84.5 | RB | 94.5 | RB |

HC = Hard Coral
SC = Soft Coral
RKC = Recently Killed Coral
RB = Rubble
SP = Sponge
SD = Sand
RC = Rock
OT = Other
SI = Silt
NIA = Nutrient Indicator Algae
Note:
The percentage of recorded RKC is a result of Bleaching.

TABLE 4A

Reef Examination Summary

| | 10:00 Hrs | | | | | | 14:00 Hrs | | | | | | 16:00 Hrs | | | | | |
|---|---|---|---|---|---|---|---|---|---|---|---|---|---|---|---|---|---|---|
| | S1 | S2 | S3 | S4 | Mean | SD | S1 | S2 | S3 | S4 | Mean | SD | S1 | S2 | S3 | S4 | Mean | SD |
| (A) Representative Reef Examination in Year 2016 (4 Jan. 2016) | | | | | | | | | | | | | | | | | | |
| HC | 5 | 8 | 4 | 4 | 5.25 | 1.89 | | 2 | 2 | 1 | 1.15 | | | | | 1 | 0.25 | 0.5 |
| SC | | | | 1 | 0.25 | 0.5 | | | | | | | | | | | | |
| RKC | | 1 | 2 | 6 | 2.25 | 2.63 | 5 | 1 | | 1 | 1.75 | 2.22 | | | | 1 | 0.25 | 0.5 |
| RC | 33 | 28 | 27 | 25 | 27.5 | 3.79 | 13 | 21 | 18 | 13 | 16.3 | 3.95 | 4 | 6 | 15 | 8 | 8.25 | 4.79 |
| RB | 2 | 3 | 7 | 4 | 4 | 2.16 | 9 | 9 | 6 | 16 | 10 | 4.24 | 8 | 10 | 9 | 23 | 12.5 | 7.05 |
| SD | | | | | | | 13 | 7 | 14 | 10 | 11 | 3.16 | 28 | 24 | 16 | 7 | 18.8 | 9.29 |
| Total | 40 | 40 | 40 | 40 | | | 40 | 40 | 40 | 40 | | | 40 | 40 | 40 | 40 | | |
| (B) Representative Reef Examination in Year 2017 (6 Apr. 2017) | | | | | | | | | | | | | | | | | | |
| HC | 2 | 1 | | | 0.75 | 0.96 | 1 | 1 | | | 0.5 | 0.58 | 2 | 1 | | | 0.75 | 0.96 |
| RKC | 2 | 1 | | 1 | 1 | 0.82 | | | | | | | | | | | | |
| SP | | 1 | | | 0.25 | 0.5 | 1 | | | | 0.25 | 0.5 | | 1 | | 1 | 0.5 | 0.58 |
| RC | 2 | 8 | 15 | 9 | 8.5 | 5.32 | 13 | 22 | 14 | 11 | 15 | 4.83 | 2 | 9 | 15 | 9 | 8.75 | 5.32 |
| RB | 7 | 13 | 8 | 15 | 10.8 | 3.86 | 11 | 12 | 21 | 18 | 15.5 | 4.8 | 7 | 13 | 8 | 15 | 10.8 | 3.86 |
| SD | 27 | 16 | 17 | 15 | 18.8 | 5.56 | 14 | 5 | 5 | 11 | 8.75 | 4.5 | 29 | 16 | 17 | 15 | 19.3 | 6.55 |
| Total | 40 | 40 | 40 | 40 | | | 40 | 40 | 40 | 40 | | | 40 | 40 | 40 | 40 | | |
| (C) Representative Reef Examination in Year 2018 (2 Jul. 2018) | | | | | | | | | | | | | | | | | | |
| HC | 3 | 1 | | 2 | 1.5 | 1.29 | 2 | 1 | 2 | | 1.25 | 0.96 | | | | | | |
| SC | 2 | | | | 0.5 | 1 | | | | 1 | 0.25 | 0.5 | | | | | | |
| SP | | | | | | | | | | | | | | | 1 | | 0.25 | 0.5 |
| RC | 34 | 36 | 40 | 38 | 37 | 2.58 | 21 | 25 | 14 | 20 | 20 | 4.55 | 2 | 7 | 14 | 15 | 9.5 | 6.14 |
| RB | 1 | 3 | | 1 | 1 | 1.41 | 9 | 9 | 13 | 10 | 10.3 | 1.89 | 13 | 14 | 10 | 15 | 13 | 2.16 |
| SD | | | | | | | 8 | 5 | 11 | 9 | 8.25 | 2.5 | 25 | 18 | 16 | 10 | 17.3 | 6.19 |
| Total | 40 | 40 | 40 | 40 | | | 40 | 40 | 40 | 40 | | | 40 | 40 | 40 | 40 | | |
| (D) Representative Reef Examination in Year 2019 (5 Oct. 2019) | | | | | | | | | | | | | | | | | | |
| HC | 7 | 1 | 4 | 4 | 4 | 2.45 | 2 | 3 | 2 | 4 | 2.75 | 0.96 | | 2 | | | 0.5 | 1 |
| SC | | 1 | | | 0.25 | 0.5 | | | | | | | | 1 | | | 0.25 | 0.5 |
| SP | | | | | | | | | 1 | | 0.25 | 0.5 | | | | | | |
| RC | 30 | 36 | 28 | 31 | 31.3 | 3.4 | 20 | 8 | 22 | 13 | 15.8 | 6.45 | 10 | 12 | 8 | 2 | 8 | 4.32 |
| RB | 3 | 2 | 8 | 5 | 4.5 | 2.65 | 12 | 23 | 11 | 12 | 14.5 | 5.69 | 7 | 7 | 10 | 13 | 9.25 | 2.87 |
| SD | | | | | | | 6 | 6 | 5 | 10 | 6.75 | 2.22 | 23 | 18 | 22 | 25 | 22 | 2.94 |
| Total | 40 | 40 | 40 | 40 | | | 40 | 40 | 40 | 40 | | | 40 | 40 | 40 | 40 | | |

HC = Hard Coral

SC = Soft Coral

RKC = Recently Killed Coral

RB = Rubble

SP = Sponge

SD = Sand

RC = Rock

OT = Other

SI = Silt

NIA = Nutrient Indicator Algae

Note:

Total must be 40 for each Segment.

3 Marine Data Collection

Table 5 represents Marine Data for Invertebrates, Coral Disease, Bleaching, trash and other impacts, fishes, count of Serranidae (Grouper) with size above 30 cm, rare marine life sighted, etc.

TABLE 5

| | Marine Data | | | | | | | | | | | |
|---|---|---|---|---|---|---|---|---|---|---|---|---|
| | Diving Time | | | | | | | | | | | |
| | 10:00 Hrs | | | | 14:00 Hrs | | | | 16:00 Hrs | | | |
| | Depth | | | | | | | | | | | |
| Species | 0-20 m | 25-45 m | 50-70 m | 75-95 m | 0-20 m | 25-45 m | 50-70 m | 75-95 m | 0-20 m | 25-45 m | 50-70 m | 75-95 m |
| (A) Representative Marine Data (2-6 Jan. 2016) | | | | | | | | | | | | |
| Invertebrates | | | | | | | | | | | | |
| *StenopusHispidus* (Banded Coral Shrimp) | | | | | | | | | | | | |
| *Diadema* Urchins &*Echinothrix* spp. | | | | | | | | | | | 1 | |
| *H. mammilatus* (Pencil Urchins) | | | | | | | | | | | | |
| *Tripneustes* spp. (Collector Urchins) | | | | | | | | | | | | |
| *Holothuridae* (Sea Cucumber) | | | | | | | | | | | | 1 |
| *Acanthasterplancii* (Crown of Thorns) | | | | | | | | | | | | |
| *Charoniatritonis* (Triton) | | | | | | | | | | | | |
| *Palinuridae* (Lobster) | | | | | | | | | | | | |
| *Lambis truncate sebae* (Seba Spider Conch) | | | | | | | | | | | | |
| *Tridacna* sp. (Giant Clam) <10 cm | | | | | | | | | | | | |
| 10-20 cm | 3 | 1 | 2 | 1 | | | | | | | | |
| 20-30 cm | | | | | | | | | | | | |
| 30-40 cm | | | | | | | | | | | | |
| 40-50 cm | | | | | | | | | | | | |
| >50 cm | | | | | | | | | | | | |
| Total No. of Giant Clams | | | | | | | | | | | | |
| Coral Disease/Bleaching/Trash/Other Impacts (0 = None, 1 = Low, 2 = Medium, 3 = High) | | | | | | | | | | | | |
| Coral Damage: Boat/Anchor | | | | | | | | | | | | |
| Coral Damage: Dynamite | | | | | | | | | | | | |
| Coral Damage: Other | | | | | | | | | | | | |
| Trash: Fish Nets | | | | | | | | | | | | |
| Trash: General | | | | | | | | | | | | |
| Bleaching: % of Coral Population | | | | | | | | | | | | |
| Bleaching: % of Colony | | | | | | | | | | | | |
| Coral Disease: % of Coral Affected | | | | | | | | | | | | |
| Rare Marine Life Sighted | | | | | | | | | | | | |
| Fishes | | | | | | | | | | | | |
| *Chaetodontidae* (Butterfly Fish) | 6 | 1 | 2 | 2 | | 2 | 4 | | 2 | | | |
| *Haemulidae* (Sweetlips) | | | | | | | | | | 1 | | 1 |
| *Plechtorhinchusgaterinus*(Blackspotted Sweetlips) | | | | | | | | | | | | |
| *Plectorhinchusschotaf*(Minstrel Sweetlips) | | | | | | | | | | | | |
| *Lutjanidae* (Snapper) | 1 | | | | | | 4 | | | | | 3 |
| *Acanthuridae* (Surgeon Fish) | | | | | | | | | | | | |
| *Nasounicornis* (Bluespine Surgeon Fish) | | | | | | | | | | | | |
| *Ctenochaetusstriatus* (Lined Bristletooth) | 7 | | | | 8 | 2 | | | | | | |
| *Zebrasomadesjardinii*(Sailfin Tang) | | | | | | | | | | | | |
| *Zebrasomaxanthurum*(Yellowtail Tang) | | | | | | | | | | | | |
| *Acanthurussohal*(SohalSugeonfish) | | | | | | | | | | | | |
| *Pomacentridae*(Damselfish) | | | | | | | | | | | | |
| *Abudefdufvaigiensis*(Sergeant Major) | | | 8 | | | | | | 2 | 12 | 8 | |
| *Chromisdimidiata* (Half & Half Chromis) | | | 7 | | | | | | 9 | | | 2 |
| *Amblyglyphidodonindicus* (Whitebelly Damselfish) | 2 | 7 | | | | | | | 80 | | | 15 |
| *Dascyllusaruanus*(Humbug Dascyllus) | | | | | 15 | | 48 | | | | | |
| *Chromisviridis*(BluegreenChromis) | 10 | | | | | | | | | | | |
| *StegastesNigricans*(Dusky Gregory) | | | | | | | | | 10 | | | |
| *Amphiprionbicintus*(Red Sea Anemonefish) | | | | | | | | | | | | |

TABLE 5-continued

Marine Data

| Species | Diving Time | | | | | | | | | | | |
|---|---|---|---|---|---|---|---|---|---|---|---|---|
| | 10:00 Hrs | | | | 14:00 Hrs | | | | 16:00 Hrs | | | |
| | Depth | | | | | | | | | | | |
| | 0-20 m | 25-45 m | 50-70 m | 75-95 m | 0-20 m | 25-45 m | 50-70 m | 75-95 m | 0-20 m | 25-45 m | 50-70 m | 75-95 m |
| *Pomacentrussulfureus* (Sulfur damsel) | | | | | | | | | 10 | 1 | | |
| *Amblyglyphidodonflavilatus*(Yellowside Damselfish) | 5 | 10 | 6 | 9 | | | | | 1 | 3 | | |
| *Scaridae*(Parrot Fish) | | 2 | 2 | | 4 | | | | | | | |
| Holocentridae(Squirrel Fish & Soldier Fish) | | 1 | | | | | | | | | | |
| *Sargacentronspiniferum* (Longjawed Squirrel Fish) | | | | | | | | | | | | |
| *Neoniphon samara* (Spotfin Squirrel Fish) | | | | | | | | | | | | |
| *Myripristismurdjan*(Blotchye Soldier Fish) | | | | | | | | | | | | |
| *Pomacanthidae* (Angel Fishes) | | | | | | | | | | | | |
| *Labridae* (Wrasses) | | | | | | | | | | | | |
| *Halichoereshortulanus*(Chequerboard Wrasse) | 1 | 1 | | | | | | 1 | 1 | 1 | | 2 |
| *Halichoeresiridis*(Rainbow Wrasses) | | | | | | | | | | | | |
| *Gomphosuscaerulus*(Indian Bird Wrasse) | | 1 | | | 1 | | | | | | | |
| *Thalassomarueppelii*(Klunzingers Wrasse) | | | | | | | | | | | | |
| *Thalassomalunare*(Crescent Wrasse) | | | | | | | | | | | | |
| *Cheilinuslunulatus*(Broomtail Wrasse) | | | | | | | | | | | | |
| *Cheilinus undulates* (Napoleeon Wrasse) | | | | | | | | | | | | |
| *Chelinusabudjubbe*(Abudjubbe Wrasse) | | | | | | | | | | | | |
| *Chelinusquinquecinctus*(Redbreasted Wrasse) | | | | | | | | | | | | |
| *Epibulusinsidiator*(Slingjaw Wrasse) | | | | | | | | | | | | |
| *Cirrhitidae*(Hawk Fish) | | 1 | | | | | | | | | | |
| *Apogonidae* (Cardinal Fish) | | | | | | | | | | | | |
| *Syngnathidae*(Pipe Fish) | | | | | | | | | | | | |
| *Balistidae*(Trigger Fish) | 1 | | | | | | | | | | | |
| *Blenniidae*(Blennies) | | | | | | | | | | | | |
| *Mullidae*(Goat Fish) | | | | | | | | | | | | |
| *Caesionidae*(Fusiliers) | | | | | | | | | 100 | | | |
| *Arothrondiadematus*(Masked Puffer) | | | | | | | | | | 1 | | |
| *Monotaxisgrandoculls*(Bigeye Emperor) | | | | | | | | | | | | |
| *Scolopsisghunam*(Arabian Spinecheek) | | | | | | | | | | | | |
| *Acanthopagrusbifaciatus*(Doublebar Bream) | | | | | | | | | | | | |
| *Cephalopholisargus*(Peacock Grouper) | | | | | | | | | | | | |
| *Cephalopholishemistiktos*(Halfspotted Hind) | | | | | | | | | | | | |
| *Aethalopercarogaa*(Redmouth Grouper) | | | | | | | | | | | | |
| Other Fishes | | | | | | | | | | | | |
| Great Barracuda | | | | | | | | | | | | |
| Count of *Serranidae* (Grouper) Sizes >30 cm | | | | | | | | | | | | |
| 30-40 cm | | | | | | | | | | | | |
| 40-50 cm | | | | | | | | | | | | |
| 50-60 cm | | | | | | | | | | | | |
| >60 cm | | | | | | | | | | | | |
| Total No. of Grouper | | | | | | | | | | | | |
| Rare Marine Life Sighted | | | | | | | | | | | | |
| (B) Representative Marine Data (3-7 Apr. 2017) | | | | | | | | | | | | |
| *StenopusHispidus* (Banded Coral Shrimp) | | | | | | | | | | | | |
| *Diadema* Urchins &*Echinothrix* spp. | | | 3 | 1 | | | | | | | | |
| *H. mammilatus* (Pencil Urchins) | | | | | | | | | | | | |
| *Tripneustes* spp. (Collector Urchins) | | | | | | | | | | | | |
| *Holothuridae* (Sea Cucumber) | | | | | | | | | | | | |

TABLE 5-continued

Marine Data

| Species | Diving Time | | | | | | | | | | | |
|---|---|---|---|---|---|---|---|---|---|---|---|---|
| | 10:00 Hrs | | | | 14:00 Hrs | | | | 16:00 Hrs | | | |
| | Depth | | | | | | | | | | | |
| | 0-20 m | 25-45 m | 50-70 m | 75-95 m | 0-20 m | 25-45 m | 50-70 m | 75-95 m | 0-20 m | 25-45 m | 50-70 m | 75-95 m |
| *Acanthasterplancii* (Crown of Thorns) | | | 1 | | | | | | | | | |
| *Charoniatritonis* (Triton) | | | | | | | | | | | | |
| *Palinuridae* (Lobster) | | | | | | | | | | | | |
| *Lambis truncate sebae*(Seba Spider Conch) | | | | | | | | | | | | |
| *Tridacna* sp. (Giant Clam) <10 cm | | | | | | | | | | | | |
| 10-20 cm | 2 | 1 | 1 | | | | | | | | | |
| 20-30 cm | | | | | | | | | | | | |
| 30-40 cm | | | | | | | | | | | | |
| 40-50 cm | | | | | | | | | | | | |
| >50 cm | | | | | | | | | | | | |
| Total No. of Giant Clams | | | | | | | | | | | | |
| Coral Disease/Bleaching/Trash/Other Impacts (0 = None, 1 = Low, 2 = Medium, 3 = High) | | | | | | | | | | | | |
| Coral Damage: Boat/Anchor | | | | | | | | | | | | |
| Coral Damage: Dynamite | | | | | | | | | | | | |
| Coral Damage: Other | | | | | | | | | | | | |
| Trash: Fish Nets | | | | | | | | | | | | |
| Trash: General | | | | | | | | | | | | |
| Bleaching: % of Coral Population | | | | | | | | | | | | |
| Bleaching: % of Colony | | | | | | | | | | | | |
| Coral Disease: % of Coral Affected | | | | | | | | | | | | |
| Rare Marine Life Sighted | | | | | | | | | | | | |
| Fishes | | | | | | | | | | | | |
| *Chaetodontidae* (Butterfly Fish) | 2 | 3 | | 5 | 2 | 1 | 7 | | 2 | 2 | | 1 |
| *Haemulidae* (Sweetlips) | | | | | | | | | | 1 | | |
| *Plechtorhinchusgaterinus*(Blackspotted Sweetlips) | | | | | | | | | | | | |
| *Plectorhinchusschotaf*(Minstrel Sweetlips) | | | | | | | | | | | | |
| *Lutjanidae* (Snapper) | 11 | | | 2 | | 8 | 15 | | | 4 | 32 | |
| *Acanthuridae* (Surgeon Fish) | | | | | | | | | | 2 | | |
| *Nasounicornis* (Bluespine Surgeon Fish) | | | | | | | | | | | | |
| *Ctenochaetusstriatus* (Lined Bristletooth) | 5 | 3 | | 4 | 12 | | 5 | 4 | 1 | | | 5 |
| *Zehrasomadesjardinii*(Sailfin Tang) | | | 2 | | | | | 1 | | | | |
| *Zebrasomaxanthurum*(Yellowtail Tang) | | | | | | | | | | | | |
| *Acanthurussohal* (SohalSugeonfish) | | | | | | | | | | | | |
| *Pomacentridae* (Damselfish) | | | | | | | | | | | | |
| *Abudefdufvaigiensis*(Sergeant Major) | 2 | 10 | 25 | 30 | | | 16 | | | 85 | | 10 |
| *Chromisdimidiata* (Half & Half Chromis) | 25 | | 10 | | | | | | | | | |
| *Amblyglyphidodonindicus* (Whitebelly Damselfish) | | 2 | | 4 | | 2 | | | 3 | 2 | | |
| *Dascyllusaruanus*(Humbug Dascyllus) | 8 | 5 | 8 | 7 | | | 47 | | 23 | | 55 | 41 |
| *Chromisviridis*(BluegreenChromis) | 110 | | | | | | 45 | | | | | |
| *StegastesNigricans*(Dusky Gregory) | | | | | | | | | | | | 15 |
| *Amphiprionbicintus*(Red Sea Anemonefish) | | | | | 4 | | | | 19 | 2 | | |
| *Pomacentrussulfureus* (Sulfur damsel) | 2 | 1 | 1 | 3 | | 2 | 1 | | 1 | | 1 | |
| *Amblyglyphidodonflavilatus*(Yellowside Damselfish) | | 1 | | | 10 | 3 | 2 | | | | | 5 |
| *Scaridae*(Parrot Fish) | 3 | 5 | 1 | 2 | 1 | | 1 | 1 | | | | |
| *Holocentridae*(Squirrel Fish & Soldier Fish) | | | | | | | | | | | | |
| *Sargacentronspiniferum*(Longjawed Squirrel Fish) | | 1 | | | | | | | | | | |
| *Neoniphon samara* (Spotfin Squirrel Fish) | | | | | | | 1 | | | | | |
| *Myripristismurdjan*(Blotchye Soldier Fish) | | 4 | | 1 | | | | | 1 | 2 | | |
| *Pomacanthidae*(Angel Fishes) | | | | | | | | | | | | |
| *Labridae* (Wrasses) | | | | | | | | | | | | |
| *Halichoereshortulanus*(Chequerboard Wrasse) | | 1 | | | | | 1 | | | | | |
| *Halichoeresiridis*(Rainbow Wrasses) | | 1 | | | | | | | | | | |
| *Gomphosuscaerulust*(Indian Bird Wrasse) | | 1 | | | | | 1 | | | | | |

TABLE 5-continued

Marine Data

| | Diving Time | | | | | | | | | | | |
|---|---|---|---|---|---|---|---|---|---|---|---|---|
| | 10:00 Hrs | | | | 14:00 Hrs | | | | 16:00 Hrs | | | |
| | Depth | | | | | | | | | | | |
| Species | 0-20 m | 25-45 m | 50-70 m | 75-95 m | 0-20 m | 25-45 m | 50-70 m | 75-95 m | 0-20 m | 25-45 m | 50-70 m | 75-95 m |
| *Thalassomarueppelii*(Klunzingers Wrasse) | 2 | | | 1 | | | 1 | | | | | |
| *Thalassomalunare*(Crescent Wrasse) | | 1 | 2 | | | | | | | 2 | | |
| *Cheilinuslunulatus*(Broomtail Wrasse) | | 1 | | | | | | | | | | |
| *Cheilinus undulates* (Napoleeon Wrasse) | | | | | | | | | | | | |
| *Chelinusabudjubbe*(Abudjubbe Wrasse) | | | | | | | | | | | | |
| *Chelinusquinquecinctus*(Redbreasted Wrasse) | | | | | | | | | | | | |
| *Epibulusinsidiator*(Slingjaw Wrasse) | | | | | | | | | | | | |
| *Cirrhitidae*(Hawk Fish) | | | | | | | | | | | | |
| *Apogonidae* (Cardinal Fish) | | | | | | | | | | | | |
| *Syngnathidae*(Pipe Fish) | | | | | | | | | | | | |
| *Balistidae*(Trigger Fish) | | | | | | | | | | | | |
| *Blenniidae*(Blennies) | | | | | | | | | | | | |
| *Mullidae*(Goat Fish) | | | 3 | | | | | | | | | |
| *Caesionidae*(Fusiliers) | 10 | | 30 | | | | | | | | | |
| *Arothrondiadematus*(Masked Puffer) | | 1 | | 1 | | | 75 | | | | | |
| *Monotaxisgrandoculls*(Bigeye Emperor) | | | | | | | | | | | | |
| *Scolopsisghunam*(Arabian Spinecheek) | | | | | | | | | | | | |
| *Acanthopagrusbifaciatus*(Doublebar Bream) | | | | | | | | | | | | |
| *Cephalopholisargus*(Peacock Grouper) | | | | | | | | | | | | |
| *Cephalopholishemistiktos*(Halfspotted Hind) | | | | | | | | | | | | |
| *Aethalopercarogaa*(Redmouth Grouper) | | | | | | | | | | | | |
| Other Fishes | | | | | | | 1 Moray Eel | | | | 5 Orange spotted Trevally's | |
| Great Barracuda | | | | | | | | | | | | |
| Count of *Serranidae*(Grouper) Sizes >30 cm | | | | | | | | | | | | |
| 30-40 cm | | | | | | | 1 | | | | | |
| 40-50 cm | | | | | | | | | | | | |
| 50-60 cm | | | | | | | | | | | | |
| >60 cm | | | | | | | | | | | | |
| Total No. of Grouper | | | | | | | 1 | | | | | |
| Rare Marine Life Sighted | | | | | | | | | | | | |
| (C) Representative Marine Data (4-8 Jul. 2018) | | | | | | | | | | | | |
| *StenopusHispidus* (Banded Coral Shrimp) | | | | | | | | | | | | |
| *Diadema* Urchins &*Echinothrix* spp. | | | | | | | | | | | | |
| *H. mammilatus* (Pencil Urchins) | | | | | | | | | | | | |
| *Tripneustes* spp. (Collector Urchins) | | | | | | | | | | | | |
| *Holothuridae* (Sea Cucumber) | | | | | | | 1 | | | | | |
| *Acanthasterplancii* (Crown of Thorns) | | | | | | | | | | | | |
| *Charoniatritonis* (Triton) | | | | | | | | | | | | |
| *Palinuridae* (Lobster) | | | | | | | | 1 | | | | |
| *Lambis truncate sebae* (Seba Spider Conch) | | | | | | | | | | | | |
| *Tridacna* sp. (Giant Clam) <10 cm | | | | | | | | | | | | |
| 10-20 cm | 1 | 1 | 1 | | | | | | 1 | 1 | 1 | |
| 20-30 cm | | | | | | | | | | | | |
| 30-40 cm | | | | | | | | | | | | |
| 40-50 cm | | | | | | | | | | | | |
| >50 cm | | | | | | | | | | | | |
| Total No. of Giant Clams | | | | | | | | | | | | |
| Coral Disease/Bleaching/Trash/Other Impacts (0 = None, 1 = Low, 2 = Medium, 3 = High) | | | | | | | | | | | | |
| Coral Damage: Boat/Anchor | | | | | | | | | | | | |
| Coral Damage: Dynamite | | | | | | | | | | | | |
| Coral Damage: Other | | | | | | | | | | | | |
| Trash: Fish Nets | | | | | | | | | | | | |
| Trash: General | | | | | | | | | | | | |

TABLE 5-continued

Marine Data

| Species | Diving Time 10:00 Hrs (Depth) | | | | 14:00 Hrs | | | | 16:00 Hrs | | | |
|---|---|---|---|---|---|---|---|---|---|---|---|---|
| | 0-20 m | 25-45 m | 50-70 m | 75-95 m | 0-20 m | 25-45 m | 50-70 m | 75-95 m | 0-20 m | 25-45 m | 50-70 m | 75-95 m |
| Bleaching: % of Coral Population | | | | | | | | | | | | |
| Bleaching: % of Colony | | | | | | | | | | | | |
| Coral Disease: % of Coral Affected | | | | | | | | | | | | |
| Rare Marine Life Sighted | | | | | | | | | | | | |
| Fishes | | | | | | | | | | | | |
| *Chaetodontidae* (Butterfly Fish) | 1 | | 1 | | 3 | 3 | | | | 6 | 2 | |
| *Haemulidae* (Sweetlips) | | 1 | | | | | | | | 8 | | |
| *Plechtorhinchusgaterinus*(Blackspotted Sweetlips) | | | | | | | | | | | | |
| *Plectorhinchusschotaf*(Minstrel Sweetlips) | | | | | | | | | | | | |
| *Lutjanidae* (Snapper) | 2 | 2 | | 6 | | | 17 | | | 8 | 27 | 7 |
| *Acanthuridae* (Surgeon Fish) | | | | | | | | | | | | |
| *Nasounicornis* (Bluespine Surgeon Fish) | | 1 | | | | | | | | | | |
| *Ctenochaetusstriatus* (Lined Bristletooth) | | | | | | 5 | | 5 | | 7 | 2 | |
| *Zebrasomadesjardinii*(Sailfin Tang) | | | | | | | | | | | | |
| *Zebrasomaxanthurum*(Yellowtail Tang) | | | | | | | | | | | | |
| *Acanthurussohal*(SohalSugeonfish) | 3 | | | | | 5 | | | | 4 | 7 | |
| *Pomacentridae*(Damselfish) | | | | | | | | | | | | |
| *Abudefdufvaigiensis* (Sergeant Major) | 15 | 27 | 3 | 29 | | | | | 12 | 45 | 7 | 15 |
| *Chromisdimidiata* (Half & Half Chromis) | 21 | | 5 | | | 7 | | | | | | |
| *Amblyglyphidodonindicus* (Whitebelly Damselfish) | | | | | | | | | | | | 5 |
| *Dascyllusaruanus*(Humbug Dascyllus) | | | | | | 11 | 15 | 5 | | 21 | | 55 |
| *Chromisviridis*(BluegreenChromis) | | | | | 30 | | 10 | | 7 | | | |
| *StegastesNigricans*(Dusky Gregory) | | | | | | | | | | | | |
| *Amphiprionbicintus*(Red Sea Anemonefish) | | | | | | | | | | | | |
| *Pomacentrussulfureus* (Sulfur damsel) | 4 | 2 | 3 | 1 | | 2 | | | | | | 2 |
| *Amblyglyphidodonflavilatus*(Yellowside Damselfish) | | | | | | | | | | | | |
| *Scaridae*(Parrot Fish) | | | | | | 1 | | | | 2 | | 2 |
| *Holocentridae*(Squirrel Fish & Soldier Fish) | | | | | | | | | | | | |
| *Sargacentronspiniferum* (Longjawed Squirrel Fish) | | | | | | | | | | | | |
| *Neoniphon samara* (Spotfin Squirrel Fish) | | | | | | | | | | | | |
| *Myripristismurdjan*(Blotchye Soldier Fish) | | 2 | | | | | | | | | | |
| *Pomacanthidae*(Angel Fishes) | 1 | 1 | | | | | | | | 1 | | |
| *Labridae*(Wrasses) | | | | | | | | | | | | |
| *Halichoereshortulanus*(Chequerboard Wrasse) | | 2 | | | 1 | 1 | | | | | | 2 |
| *Halichoeresiridis*(Rainbow Wrasses) | | | | | | | | | | | | |
| *Gomphosuscaerulus*(Indian Bird Wrasse) | | 1 | 2 | | | | 5 | | | | | |
| *Thalassomarueppelii*(Klunzingers Wrasse) | 4 | | 2 | | | | | | | | | |
| *Thalassomalunare*(Crescent Wrasse) | | | | | | | | | | | | |
| *Cheilinuslunulatus*(Broomtail Wrasse) | | | | | | | | | | | | |
| *Cheilinus undulates* (Napoleeon Wrasse) | | | | | | | | | | | 1 | |
| *Chelinusabudjubbe*(Abudjubbe Wrasse) | | | | | | | | | | | | |
| *Chelinusquinquecinctus*(Redbreasted Wrasse) | | | | | | | | | | | | |
| *Epibulusinsidiator*(Slingjaw Wrasse) | | | | | 1 | | | | | | | |
| *Cirrhitidae*(Hawk Fish) | | 1 | | 1 | | 1 | 3 | | | | | |
| *Apogonidae* (Cardinal Fish) | | | | | | | | | | | | |
| *Syngnathidae*(Pipe Fish) | | | | | | 1 | | 1 | | | | |
| *Balistidae*(Trigger Fish) | | | | | | | | | | | | |
| *Blenniidae*(Blennies) | | | | | | | | | | | | |
| *Mullidae*(Goat Fish) | | | | | | | | | | | | |
| *Caesionidae*(Fusiliers) | | | | | | | | | | | | |
| *Arothrondiadematus*(Masked Puffer) | | | | | | | | | | | | |

TABLE 5-continued

Marine Data

| | Diving Time | | | | | | | | | | | |
|---|---|---|---|---|---|---|---|---|---|---|---|---|
| | 10:00 Hrs | | | | 14:00 Hrs | | | | 16:00 Hrs | | | |
| | Depth | | | | | | | | | | | |
| Species | 0-20 m | 25-45 m | 50-70 m | 75-95 m | 0-20 m | 25-45 m | 50-70 m | 75-95 m | 0-20 m | 25-45 m | 50-70 m | 75-95 m |
| *Monotaxisgrandoculls*(Bigeye Emperor) | | | | | | 3 | | | | 4 | | |
| *Scolopsisghunam*(Arabian Spinecheek) | | | | | | | | | | | | |
| *Acanthopagrusbifaciatus*(Doublebar Bream) | | | | | | | | | | | | |
| *Cephalopholisargus*(Peacock Grouper) | | | | | | | | | | | | |
| *Cephalopholishemistiktos*(Halfspotted Hind) | | | | | | | | | | | | |
| *Aethalopercarogaa*(Redmouth Grouper) | | | | | | | | | | | | |
| Other Fishes | | | | | | | | | | | | |
| Great Barracuda | | | | | | | | | | | | |
| Count of *Serranidae*(Grouper) Size >30 cm | | | | | | | | | | | | |
| 30-40 cm | 1 | | | | 1 | | | | 1 | | | |
| 40-50 cm | | | | | | | | | | | | |
| 50-60 cm | | | | | | | | | | | | |
| >60 cm | | | | | | | | | | | | |
| Total No. of Grouper | 1 | | | | 1 | | | | 1 | | | |
| Rare Marine Life Sighted | | | | | | | | | | | | |
| (D) Representative Marine Data (2-6 Oct. 2019) | | | | | | | | | | | | |
| *StenopusHispidus* (Banded Coral Shrimp) | | | | | | | | | | | | |
| *Diadema* Urchins &*Echinothrix* spp. | | | | | | | | | | | | |
| *H. mammilatus* (Pencil Urchins) | | | | | | | | | | | | |
| *Tripneustes* spp. (Collector Urchins) | | | | | | | | | | | | |
| *Holothuridae* (Sea Cucumber) | | | | | | | | | | | | |
| *Acanthasterplancii* (Crown of Thorns) | | | | | | 1 | | 1 | | | | |
| *Charoniatritonis* (Triton) | | | | | | | | | | | | |
| *Palinuridae* (Lobster) | | | | | | | | | | | | |
| *Lambis truncate sebae* (Seba Spider Conch) | | | | | | | | | | | | |
| *Tridacna* sp. (Giant Clam) <10 cm | | | | | | | | | | | | |
| 10-20 cm | | | | | | | | | | | | |
| 20-30 cm | 4 | 2 | 2 | | | | | | | | | |
| 30-40 cm | | | | | | | | | | | | |
| 40-50 cm | | | | | | | | | | | | |
| >50 cm | | | | | | | | | | | | |
| Total No. of Giant Clams | | | | | | | | | | | | |
| Coral Disease/Bleaching/Trash/Other Impacts (0 = None, 1 = Low, 2 = Medium, 3 = High) | | | | | | | | | | | | |
| Coral Damage: Boat/Anchor | | | | | | | | | | | | |
| Coral Damage: Dynamite | | | | | | | | | | | | |
| Coral Damage: Other | | | | | | | | | | | | |
| Trash: Fish Nets | | | | | | | | | | | | |
| Trash: General | | | | | | | | | | | | |
| Bleaching: % of Coral Population | | | | | | | | | | | | |
| Bleaching: % of Colony | | | | | | | | | | | | |
| Coral Disease: % of Coral Affected | | | | | | | | | | | | |
| Rare Marine Life Sighted | | | | | | | | | | | | |
| Fishes | | | | | | | | | | | | |
| *Chaetodontidae* (Butterfly Fish) | 2 | 2 | 2 | 1 | 2 | | | 4 | 1 | 2 | | 1 |
| *Haemulidae* (Sweetlips) | | 1 | 1 | | | | | 1 | | 1 | 1 | |
| *Plechtorhinchusgaterinus*(Blackspotted Sweetlips) | | | | | | | | | | | | |
| *Plectorhinchusschotaf*(Minstrel Sweetlips) | | | | | | | | | | | | |
| *Lutjanidae* (Snapper) | 7 | 2 | 5 | 2 | 2 | | 5 | | | 5 | 14 | 5 |
| *Acanthuridae* (Surgeon Fish) | | | | | | | | | | | | |
| *Nasounicornis* (Bluespine Surgeon Fish) | | 1 | | | | | | 2 | | | | |
| *Ctenochaetusstriatus* (Lined Bristletooth) | 5 | 4 | | | 7 | | 5 | 7 | | | 2 | |
| *Zebrasomadesjardinii*(Sailfin Tang) | | | | | | | | | 1 | | | |
| *Zebrasomaxanthurum*(Yellowtail Tang) | | | | | | | | | 1 | | | |
| *Acanthurrassohal*(SohalSugeonfish) | 25 | 7 | | | 5 | | | | 2 | | | 5 |
| *Pomacentridae*(Damselfish) | | | | | | | | | | | | |

TABLE 5-continued

Marine Data

| | Diving Time ||||||||||||
| --- | --- | --- | --- | --- | --- | --- | --- | --- | --- | --- | --- | --- |
| | 10:00 Hrs |||| 14:00 Hrs |||| 16:00 Hrs ||||
| | Depth ||||||||||||
| Species | 0-20 m | 25-45 m | 50-70 m | 75-95 m | 0-20 m | 25-45 m | 50-70 m | 75-95 m | 0-20 m | 25-45 m | 50-70 m | 75-95 m |
| *Abudefdufvaigiensis*(Sergeant Major) | 25 | 11 | 25 | 15 | | 7 | | 20 | 35 | 25 | 25 | 45 |
| *Chromisdimidiata* (Half & Half Chromis) | 5 | 3 | 5 | 5 | | | | | | | | |
| *Amblyglyphidodonindicus* (Whitebelly Damselfish) | 3 | 4 | 4 | | 4 | | | 5 | | | | 5 |
| *Dascyllusaruanus*(Humbug Dascyllus) | | | | | 17 | 25 | 25 | 30 | | 22 | | 25 |
| *Chromisviridis*(BluegreenChromis) | 19 | | | | | 15 | 25 | | 5 | | 7 | |
| *StegastesNigricans*(Dusky Gregory) | | | | | | | | | | | | 5 |
| *Amphiprionbicintus*(Red Sea Anemonefish) | | | | | | | | | | | | |
| *Pomacentrussulfureus* (Sulfur damsel) | 7 | | | 5 | 3 | 2 | | | | | | 2 |
| *Amblyglyphidodonflavilatus*(Yellowside Damselfish) | | 2 | 3 | | | | | | | | | |
| *Scaridae*(Parrot Fish) | | | | | 2 | | 3 | | 2 | 1 | | |
| *Holocentridae*(Squirrel Fish & Soldier Fish) | | | | | | | | | | | | |
| *Sargacentronspiniferum* (Longjawed Squirrel Fish) | | | | 1 | | | | | | | | |
| *Neoniphon samara* (Spotfin Squirrel Fish) | 1 | 1 | | | | | | | | | | |
| *Myripristismurdjan*(Blotchye Soldier Fish) | | 2 | | | | | | | | | | |
| *Pomacanthidae*(Angel Fishes) | | | 1 | | 1 | | | | 1 | | | |
| *Labridae* (Wrasses) | | | | | | | | | | | | |
| *Halichoereshortulanus*(Chequerboard Wrasse) | | 2 | | | 1 | 1 | | 1 | 1 | | | |
| *Halichoeresiridis*(Rainbow Wrasses) | | | | | | 1 | | | | | | |
| *Gomphosuscaerulus*(Indian Bird Wrasse) | | 1 | 2 | | | | 2 | | 1 | | | 1 |
| *Thalassomarueppelii*(Klunzingers Wrasse) | 4 | | 2 | | | 1 | | | | | | |
| *Thalassomalunare*(Crescent Wrasse) | | | | | | | | 1 | 1 | | | |
| *Cheilinuslunulatus*(Broomtail Wrasse) | | | | | | | | | | | | |
| *Cheilinus undulates* (Napoleeon Wrasse) | | | | | 1 | | | | | | 1 | |
| *Chelinusabudjubbe*(Abudjubbe Wrasse) | | | | | | | | | | | | |
| *Chelinusquinquecinctus*(Redbreasted Wrasse) | | | 2 | | | 1 | | 2 | | 1 | | |
| *Epibulusinsidiator*(Slingjaw Wrasse) | | 1 | | 1 | | | | | | | | |
| *Cirrhitidae*(Hawk Fish) | | | | | | | 2 | | | | | |
| *Apogonidae* (Cardinal Fish) | | | | | | | | | | | | |
| *Syngnathidae*(Pipe Fish) | | | | | | | | | | | | |
| *Balistidae*(Trigger Fish) | | | | | | | | | | | | |
| *Blenniidae*(Blennies) | | | | | | | | | | | | |
| *Mullidae*(Goat Fish) | | | | | | | | | | | | |
| *Caesionidae*(Fusiliers) | 25 | | 30 | | | 12 | | | | | | |
| *Arothrondiadematus*(Masked Puffer) | | | | | | | | | | | | |
| *Monotaxisgrandoculls*(Bigeye Emperor) | | | | | 7 | 2 | 3 | | | 4 | | |
| *Scolopsisghunam*(Arabian Spinecheek) | | | | | | | | | 7 | | 1 | |
| *Acanthopagrusbifaciatus*(Doublebar Bream) | | | | | | | 3 | | | | | |
| *Cephalopholisargus*(Peacock Grouper) | | | | | | | 2 | 1 | | | 1 | |
| *Cephalopholishemistiktos*(Halfspotted Hind) | | | | | | | 2 | | | | | |
| *Aethalopercarogaa*(Redmouth Grouper) | | | | | | | | | 1 | | | |
| Other Fishes | | | | | | | | | | | | |
| Great Barracuda | | | | | | | | | | | | |
| Count of *Serranidae*(Grouper) Size >30 cm |||||||||||||

30-40 cm
40-50 cm
50-60 cm
>60 cm
Total No. of Grouper
Rare Marine Life Sighted

4 Marine Observational Survey (January 2016)
4.1 Control Site (10:00 Hrs)
Weather Conditions: Wind speed 7 Km/h, northeasterly, partly cloudy, air temperature 31° C., water temperature 28° C. at surface and the depth, visibility 8-10 m. State of Coral Reef Dense coverage of algae up on the Reef crest, some Coral death on the Reef margin and outer Reef slope, air temperature out on the Reef, at the surface and underwater were 28° C. Underwater visibility was 8-10 m.
4.2 Working Station-1 (11:00 Hrs)
Weather conditions: Slightly changed, wind speed 11 Km/h, northerly, air temperature 28° C., water temperature 28° C. both at surface and the depth, visibility 8-10 m.
Fish Population: More fish life was witnessed in shallower water in the periphery of the WS1, including Groupers (Serranidae), such as Peacock grouper (*Cephalopholis argus*), Halfspotted hind (*Cephalopholis hemistiktos*), Redmouth grouper (*Aethaloperca rogaa*) and from the family of Sweetlips (Haemulidae), Blackspotted sweetlips (*Plechtorhinchus gaterinus*) and Minstrel sweetlips (*Plectorhinchus schotaf*) with some species such as Schools of Orangespotted trevally (*Carangoides bajad*) and Bluefin trevally (*Caranx melampygus*) frequented this area looking for prey. There were a few additional healthy Coral colonies, nurseries and associated Coral fish thriving in this heavily exposed area.
4.3 Working Station-2 (12:10 Hrs)
Weather Conditions: Remained unchanged, slightly turbid water from Outfall flowing near the bottom in a steady stream reducing the visibility to 3-4 m, while above this layer or in the surrounding visibility was 8 m.
State of Coral Reef: The Reef with one huge impressive Clownfish and Sea Anemone colony has no further Coral recruitment and leaves a dead Coral area behind.
Fish Population: There was a plenty of fish life in this area with abundance of Indo-Pacific Sergeants (*Abudefduf vaigiensis*) tending the eggs.
5 Marine Observational Survey (April 2017)
5.1 Control Site (09:30 Hrs)
Weather Conditions: Wind speed 8 Km/h, northwesterly, weather clear and sunny, underwater visibility 25 m, air temperature 31° C. out on the Reef, seawater temperature 30° C. near surface and 28° C. at the depth.
State of Coral Reef There were few sightings of Coral death along the drop of Reef slope, including species Milipora, Acropora and Porites. However, the pinnacles located few meters away from the Reef slope were healthier.
Fish Population: Diversity and density of fish population were observed higher as compared to the previous survey.
5.2 Working Station-1 (12:00 Hrs)
Weather Conditions: Wind speed changed to 15 Km/h, northwesterly, underwater visibility 20-25 m, seawater temperature 30° C. near surface and 29° C. at the depth.
State of Coral Reef: The siltation of Reef was with no or minimal change compared to the previous survey.
Fish Population: Fish populations appeared more abundant and diverse in the surroundings compared to the earlier survey. Large Sergeant Majors populations, Crown of Thorn individuals and small healthy Coral colonies with fish thriving in the previously exposed area were sighted. Some waste material, like tins, paint buckets, metallic pipes/rebar, rubber tyres, nylon ropes and electrical wire/cables were observed on the seabed.
5.3 Working Station-2 (15:20 Hrs)
Weather Conditions: Wind northwesterly, underwater visibility reduced to 20 m due to slightly turbid and warmer water from the Outfall.

Fish Population: The fish populations observed on the top of Reef table included Sergeant majors, Blackspot Snappers and Sulan Ibrahim.
6 Marine Observational Survey (July, 2018)
6.1 Control Site (08:45 Hrs)
Weather Conditions: Site was calm, wind speed 5 Km/h, southeasterly, weather clear and sunny, underwater visibility 7 m, air temperature 34° C. out on the Reef, 30° C. near surface and 29° C. at the depth.
State of Coral Reef Some additional Coral deaths sighted along the drop of the Reef slope, which is attributed to a combined effect of very warm summer and exceptionally high temp for much longer periods than normal in Yanbu.
6.2 Working Station-1 (11:20 Hrs)
Weather Conditions: Wind changed to 7 Km/h, southerly, underwater visibility 8-12 m, plankton rich water, seawater temperature 30° C. at depth and near surface.
State of Coral Reef Few more Coral deaths observed in the lower parts of the Survey area due to the effect from anchor damage with overturned heads, less silt was noted, the adjacent Reefs to the west and east of Working Station-1 support live Coral in shallow areas.
Fish Population: Fish species Trevallys, Fusiliers, Humphead wrasse, Manta Rays and a Whale Shark were observed.
6.3 Working Station-2 (14:15 Hrs)
Weather Conditions: Wind speed 12 Km/h, southwesterly, underwater visibility 5-7 m.
State of Coral Reef Minor degree of Coral deaths was observed. The previous healthy community of Sea Anemones was seen exhausted with one Clownfish left.
Fish Population: Fish species Snappers, larger Parrotfish and few Sweetlips were observed.
7 Marine Observational Survey (October 2019)
7.1 Control Site (10:10 Hrs)
Weather Conditions: Wind speed 2 Km/h, northerly, sunshine with cloud formations, underwater visibility 8-12 m, air temperature 32° C. out on the Reef, 30° C. near the surface and 28° C. at the depth.
State of Coral Reef There were sightings of moderate Coral beaching and Coral death on many Corals, including Leather Coral and different species that were found affected to a certain extent in the previous Observational Diving Survey, such as Millepora, which has become extinct in the Control Site. Additional dead Coral was observed compared to earlier survey.
7.2 Working Station-1 (12:05 Hrs)
Weather Conditions: Wind changed to northwesterly, underwater visibility 15-20 m, seawater temperature 30° C. near the surface and 28° C. at the depth.
State of Coral Reef: The siltation of Reef was minimal as observed in the previous Marine Survey. However, more Algae were observed on the Coral colonies. The junk/waste materials observed in previous Survey might have moved away from the area by undercurrents.
Fish Population: The fish populations appeared more important in the surrounding areas as compared to the earlier Survey. Few Hawksbill turtle were sighted in addition to small healthy Coral colonies with associated Coral fish in heavily exposed area.
7.3 Working Station-2 (15:25 Hrs)
Weather Conditions: Wind northwesterly, underwater visibility 8-12 m, surface conditions similar to the Control Site, seawater temperature 30° C. underwater and 29° C. near the surface.

State of Coral Reef Algal growth and sedimentation on the Coral were observed. The Sea Anemones, which were noted distressed earlier, had recovered with normal pigmentation.

Fish Population: Absence of large fish and many invertebrates was noticeable in all Survey areas but none was sighted in the WS-2.

8 Biological Analyses 8.1 Overall Summary of Brine Impacts on Zooplankton (During 2016-2019)

The zooplankton occupies a pre-eminent position in the marine food chain and represents a peculiar assemblage of organisms. There is a well-established correlation between commercial fisheries and zooplankton abundance [131]. Any depletion of zooplankton adversely affects the commercial fish and shellfish resources in the sea. During January, representatives of only six phyla in the zooplankton were encountered but in July, this representation increased to ten phyla indicating a great shift in the population from one quarter of the year to another. The CS was found to be the richest for zooplankton incidence among the designated Working Stations (WSs). Tintinnida is considered to be highly environmentally sensitive, but occurred in great density in the protozoan community at all WSs. Coelenterata, which was absent in January, appeared during April-October. July witnessed the incidence of Jellyfish in the CS. Nematoda made their first appearance in April. Polychaeta largely represented in the larval stages, which are temporarily planktonic but in adult stage colonize the benthic habitat, occurred among biofouling communities. Cladocera, copepoda and cirripedia mainly occurred during April-July but only groups cladocera and copepoda occurred in October. The larvae of barnacles, cirripedia, which are considered to be a hardy biofouler in desalination plants, were absent in January in all WSs. The incidence of Copepoda in the Discharge bay and absence in CS indicated towards no impact of the brine discharge. Pteropod and Bivalve molluscs appeared in April-July, whereas Gastropod and Bivalve molluscs appeared during July-October. The members of the molluscan community in plankton were mostly in larval stages or juveniles, drifted by the currents and waves. Although larvae are active associates in any biofouling assemblage, but their lower density shrunk the biofouler characteristics. *Chordata* was represented by only Larvaceae (*Appendicularia*). In July, the community was composed of thaliaceae, fish eggs and larvae, which occurred in large numbers. The largest abundance of fish eggs was seen near WS-2 and Intake Bay. A slight loss of fish larvae was noted in the Outfall Bay.

8.2 Overall Summary of Brine Impacts on Phytoplankton (During 2016-2019)

Phytoplankton contributes to ~95% of the marine primary production. The production of zooplankton fish, shellfish, mammals, etc., depends on phytoplankton. Plankton is used as indicators to assess the health of marine ecosystems [146]. Phytoplankton sustainability is of enormous importance when considering a long and vast coast of the Red Sea. The phytoplankton detected in WS1 and WS2 were composed of three taxonomic classes, viz., Bacillariophyceae (Diatoms), Pyrrophyceae (Dinoflagellates) and Cyanophyceae (Blue green algae), whereas 94% of the phytoplankton in the Discharge Zone were Baccillariophyceae. Analytical data showed that the ecological conditions in the brine Discharge Zone, which is characterized by elevated temperature and conductivity, as a whole did not limit the phytoplankton incidence. Only a very limited drop was seen in the density at the immediate brine disposal site with rapid recovery at the adjacent WS1 and WS2. The mixing and dilution facilitated by cascaded brine channel into discharge bay and richness of Marafiq-Y1 site in nutrients could be attributed for a relatively faster recovery of the phytoplankton in the region. However, the numerical abundance of phytoplankton during July indicated the possibility of planktonic blooms during the period. July was the most favorable month for the incidence of several species of phytoplankton followed by April and then October. Irrespective of months, the Discharge Zone experienced depletion of certain genera in January. However, in terms of species, overall composition was not affected by the brine discharge.

8.3 Overall Summary of Brine Impacts on Chlorophyll Production (During 2016-2019)

The economy of any aquatic biotope is dominated by Chlorophyll pigments. The production of Chlorophyll bearing plants sustains the multiplicity of food webs through photosynthesis, makes the seas a major source of food and vital sink for atmospheric Carbon Dioxide ($CO_2$). The samples collected showed that the Chlorophyll production was impressive both in surface and bottom waters. The highest production was noticed in April and July and it was below detection limits during January. Although a slight drop in Chlorophyll production was noticed at WS1, but soon regained the production level of the ambient sea in the Recovery Zone. The water in the discharge bay showed that the Chlorophyll production had been active despite elevated temperature and conductivity. The Chlorophyll productivity was vigorous because of the rapid replenishment of dissolved $O_2$ that happens in the sea due to turbulent mixing. Brine disposal had not impeded marine primary production, except in a very limited area of the immediate brine discharge site. The relatively high Chlorophyll production noticed in the CS and open sea suggests that the sea is biologically very productive despite the brine discharge.

8.4 Overall Summary of Brine Impacts on Biotic Resources (During 2016-2019)

These results suggested a very clear understanding of the overall impacts experienced by biotic components of the sea associated with Marafiq-Y1 site during last four years. The impacts in process related water circuit are categorized in impingement, embayment or entrapment and entrainment. It has been a widely established ecological impact that a certain number of organisms are bound to be lost due to these impacts in any seawater based industrial process. Universally passive planktonic organisms drawn into the Plant through intake pumps and screens are most likely to be mutilated and killed. This impact is called 'Impingement', whereas 'Embayment' is the deviation seen in the confined structure of the Intake Bay compared to CS or open sea. Once seawater enters the Plants, the planktons are in a state of 'Entrainment'. When the seawater passes through Plant equipment, organisms are exposed to various chemical laced environments, such as disinfectants, biocides, acids, etc., or damage and shear due to physical contact with mechanical parts, like pumps and valves or physical effects of pressure changes or mortality due to $O_2$ depletion as a result of deaeration or thermal shocks in condenser tubes followed by elevated salinity contact. All these factors exert a cumulative impact on planktonic survival.

Since most of the phytoplankton and zooplankton can produce replacement generations within a matter of hours/days and the impact remained largely confined to the brine discharge site in case of Marafiq-Y1; and given a reasonable recovery period and area, the situation tended to become quite normal.

Marginal increase in Chlorophyll production was noted as the in the Intake Bay during January-April as an impact of embayment, but encountered its substantial depletion compared to CS during October. When the Chlorophyll production was compared in the Discharge Zone to CS and the Intake Bay, there was loss of Chlorophyll production restricted to the point of immediate Discharge and very slightly in WS1 and WS2. The seawater after passing through Plant structures exits without usual concentration of the dissolved $O_2$; but due to $O_2$ replenishment while passing through cascaded brine discharge channel resulted in higher production of Chlorophyll pigments in the receiving sea. During July and October, the dry weight biomass of plankton showed positive embayment effect but negative in January. The impingement and entrainment effects were evident during July. Compared to CS and open sea, a loss of major planktonic groups (diatoms, dinoflagellates and blue-green algae) was noticed in the Intake Bay, whereas the total population of zooplankton showed an increase by 58% in the Intake Bay compared to the CS. This increase was 8% for *Annelida*, 12% for *Appendicularia*, 15% for fish eggs, 40% for *Arthropoda*, 70% for *Chordata* and 375% for Protozoa. Unidirectional currents maintained by a huge battery of Intake Pumps and the sheltered nature of the Intake structure are attributed for the abundance of these groups in the Intake Bay. The stream of currents flowing into the Intake Bay brings in extra loads of passively floating plankton into the bay, where many groups flourish while others perish. Similar biological impacts affecting the Outfall Bay population for short durations attributable to impingement, entrapment and entrainment have been discernibly reported by many authors from other industrial institutions [128, 159, 172]. The ecological characteristics in the receiving seawater dominated by temperature and salinity were not limiting the abundance of the above-mentioned groups, but compared to Intake Bay and CS, the most abundant group of zooplankton, such as the *arthropoda, chordata* and protozoa, experienced some population loss in the area of receiving water.

9 The Summary of Short-Term Acute Impacts

The short-term acute impacts of the brine discharges are reported by Cheshire (1975) [128]. These impacts are confined to the point of immediate and direct Discharge. The mortality of plankton, benthos and fish in the Discharge Zones are normally attributed to thermal loading and elevated salt concentrations brought about by the warm brine Discharges. The osmotic equilibrium of body fluids in many organisms gets disturbed by the perturbations in seawater salinity. The osmotic equilibrium of body fluids differs for different species. Kinne (1963) [162] and Lange (1970) [166] reported that in laboratory experiments, extreme perturbation in salinity was found to cause mortality of the organisms. Krishnan and Kanmpandy (1987) [165] observed some other adverse acute effects on the marine organisms, such as larval mortality, shrinkage of body cells, slow development rate, failure of osmoregulatory mechanisms, etc. An acute toxicity of the ecosystem would occur only when brine discharges with unusual levels of temperature, salinity, metal ions, etc., are suddenly dumped into the sea. This short-term acute toxicity may lead to the mortality of plankton and benthic animals in the exposed region.

10 The Summary of Long-Term Cumulative Impacts (During 2016-2019)

Price, et al., (1993) [188] implicated desalination activity as a major environmental pressure on the Arabian Gulf ecosystem and it was anticipated that the ecological effect of coastal Power Plants had been an area of serious environmental concern. Mickley (1996) [181] indicated possible long-term cumulative effects of exposure to desalination discharges in a particular site. Ecologists [188] noticed chances in the species composition, shifting of spawning seasons and reduction in the spawning stock size of Prawns due to environmental pollution. Several investigators accepted the potential for ecological effects associated with the intake structures and processes related to the passage of seawater through the cooling and discharge circuits. According to USEPA (1976) [211], large number of fish and invertebrates get killed on the travelling screens. Benda and Gulvas (1976) [123] found a direct correlation between the species impinged, their abundance and seasonality in seawater. Maryland Power Plant Siting Program [82] reported the relative sensitivity of eight estuarine fish species to impingement stress. The impinged fish had reduced resistance to diseases following the loss of surface mucus or scales and were prone to even normal predator pressure.

All desalination plants in GCC Countries depend on the regional seas for their feed and brine discharges and the principal method of brine disposal is the coastal surface discharge.

The track experience of Marafiq-Y1 and the review of the Discharges monitoring data demonstrated that Marafiq-Y1 is fully compliant with the Receiving Water Guidelines stipulated in the Environmental Protection Standards (MEPA 1409-01) of the PME.

The impacts of the brine discharge from Marafiq-Y1 have been normal and very limited. Slightly elevated parameters rapidly returned to ambient values in the Recovery Zones because greater and more intense oceanic circulations in the Red Sea have inherent advantages of faster diffusion, dissipation, mixing, dilution and dispersion.

The cascading pattern of the brine discharge Channel played beneficial role in normalizing the temperature before reaching to receiving water.

The absence of the traces of heavy metals, DBP, PHCs, POPs, PCBs, etc., in the tissues of Fishes and the dead and live Corals in WS1, WS2 and CS, indicated that the brine discharge from Marafiq-Y1 had no acute or long-term threat to the marine life and the dead Corals seen had died due to natural lifecycle process.

The brine discharge had not impeded marine primary production except in a very limited area of the immediate discharge point. The phytoplankton population did not show much deviation in the Outfall from the Control Site throughout the year. There was a little drop only in the density at the Discharge site with a rapid recovery. The overall species composition was also not found to be affected by the brine discharge.

The zooplankton community in the Discharge Bay were occasionally, but slightly, influenced by entrapment, entrainment and impingement effects. The elevated temperature and salinity did not limit the occurrence of coelentoreta, aschelminthes, *annelida, mollusca, appendicularia* and fish eggs.

Beneficial effects of mixing were obvious in the rapid restoration of planktonic organisms in the Recovery Zone.

Considering the local bathymetry, circulation and currents, sufficiently deep and suitably designed outfall Mixing Zone to carry the brine plume rapidly to the deep sea was found beneficial.

Since Mixing Zone is a shifting entity, from season to season and one tidal cycle to another, each Plant requires a well-designed Mixing Zone to allow the brine discharge mixing rapidly and return the seawater conditions to ambient levels with respect to aquatic life.

Example 3. Microbial Diversity in Seawater Near Marafiq Desalination Plants Shows Nonthreatening Impact on Marine Ecosystem The active biomass indicating the active microbial cells, the bacterial and phytoplankton cell counts, bacterial cells classification as low and high nucleic acid content cells, identification of active bacterial population, characterization of microbial diversity and taxonomic affiliation by next generation sequencing of 16S Ribosomal RNA gene, clustering of sequences at 97% similarity for specific operational taxonomic units (OUT), diversity-index (Shannon H.) calculation, clustering of sequence dataset at OTU level, multidimensional scaling of same dataset corroborating the clustering results, phyla distribution of sequence datasets, major phyla distribution and corresponding class distribution, relative sequence representativeness of major phylotypes, etc., were conducted during years 2016-2019. Additionally, temporal survey of seawater microbial community was performed by pyro-sequencing of 16S rRNA gene of DNA extracted from samples and used ribosomal database project classifier (RDPC) for taxonomical assignments of the 16S rRNA gene sequences at 95% confidence level for years 2016-2019. Also, used hierarchical assignment files from RDPC for relative abundance of sequences assigned at respective genus and collated unclassified groups for principal component analysis and similarity analysis, etc., for the stated years.

Based on real-time data, it is shown that the brine discharge from Marafiq-Yanbu Power and Desalination Plants has been absolutely nonthreatening or minimal impact on the coastal environment throughout the years 2016-2019 despite the speculations of the environmentalists that the desalination plant effluents pose potential threat to the marine environment and the diversity of aquatic species.

The driver for this comprehensive study over years was a proactive action from Marafiq management to assess the claim from environmentalists that coastal brine discharges are posing serious risks to biological diversity of several marine ecosystems in the world, and without any dedicated investigation stretched over years, it was difficult to evaluate the degree of real long-term impact in the perspective of importance of the biodiversity to the functioning of marine ecosystem and their processes. Since Marafiq-Y1 was annually discharging brine at an average rate of about 950 m$^3$/hr (minimum 736.66 and maximum 1,082.375), the study was initiated in August 2012 and continued until July 2019. Detailed analyses on quarterly basis from WS1 and WS2 around Outfall Channel of Marafiq-Y1 and the open sea (CS) were carried out in order to assess the prime effects of the brine discharge from Marafiq-Y1 on the marine environment and the degree of compliance with environmental regulations. During seven years of rigorous experimental study, the areas which were covered are as follows:

- Mapped oceanographic features, like currents, waves, tides, stratification, brine transport patterns, buoyancy, discoloration due to residual pretreatment chemicals and ultimate fate of the brine discharge to evaluate if the location of the Intake and Discharge Bays were environmentally sustainable.
- Conducted detailed analyses on quarterly basis from CS, WS1 and WS2 to determine the Physico-Chemical impacts of the brine discharge, such as Temperature, pH, Salinity, Density, Total Suspended Solids (TSS), Total Dissolved Solids (TDS), Turbidity, heavy metals (like Cu, Fe, Zn, Cr, Ni, etc.), Residual Chlorine (R—Cl$_2$), Disinfection By-Products (DBPs), Petroleum Hydrocarbons (PHCs), Persistent Organic Pollutants (POPs), Polychlorinated Biphenyls (PCBs), etc., which remained quasi identical.
- Investigated Short-term acute and Long-term cumulative impacts of the brine discharge on living resources, viz., bacteria, plankton, benthos and seagrass ecosystems, in WS1 and WS2 and assessed PHCs, POPs, PCBs and heavy metals accumulation in aquatic animal tissues and their Bio-geo-chemical cycling in ecosystems.
- Studied the impacts of brine discharge on the primary production, Chlorophyll production, phytoplankton, zooplankton and overall biotic resources.
- Conducted quarterly Survey of marine organisms to document their incidence and density at all Stations for the assessment of environmental impacts on the aquatic ecosystems, particularly based on the response of ecosystems, populations, communities and species.
- Studied the potential to alter the species and community structure of organisms living in the water column and on the sea floor besides conventional water quality measurements.

Detailed analyses on quarterly basis from WS1 and WS2 around Outfall Channel of Marafiq-Y1 and the open sea (CS) were carried out for seven consecutive years in order to assess the prime effects of the brine discharge from Marafiq-Y1 on the marine environment and the degree of compliance with environmental regulations.

The scope of work was to study following organic and microbiological aspects:

- Identifying microbial strains, characterization of microbial diversity and taxonomic affiliation of sequences using pyro-sequencing of 16S Ribosomal RNA gene and total genomic DNA extraction from the seawater; and
- Using biodiversity as a reliable quantitative tool to evaluate the environmental impact of anthropogenic activities, particularly brine discharge, on the marine ecosystem.

Materials and Methods

Results

Figure 9:
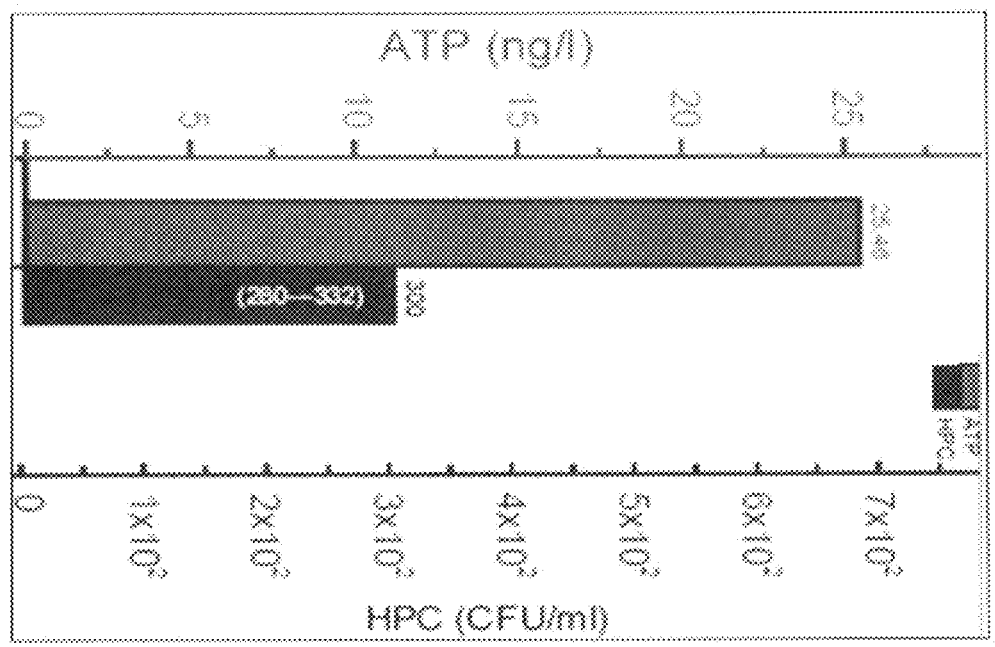
FIG. 9 is a graph for the overall HPC and ATP results showing slightly higher microbial contents in the CS, WS1, WS2 and WS3 samples (Prior Art).

Active biomass in Station samples was determined by ATP and HPC analyses (FIG. 9). Average ATP and HPC values during 2016-2019 at WS2 were 72.4±5.5 ng/l and 6.6×10$^3$±6.1×10$^2$ CFU/ml, respectively. These values indicate higher active microbial cells present in the samples. The average ATP and HPC results from different Sampling Stations are presented in Table 6.

TABLE 6

Average ATP and HPC results from different Sampling Stations (Years 2016-2019)

| Month/Year | Sample Station | HPC (CFU/ml) | ATP(ng/l) |
|---|---|---|---|
| January 2016 | WS3 | 6.0 × 10$^3$ (1.2 × 10$^2$) | — |
|  | CS | 3.5 × 10$^3$ | 35.46 |
| April 2017 | CS | 6.1 × 10$^3$ (1.2 × 10$^2$) | 42.4 (5) |
|  | SW3 | 1.1E+03 (5.0E+01) | 3.17 |

TABLE 6-continued

Average ATP and HPC results from different Sampling Stations (Years 2016-2019)

| Month/Year | Sample Station | HPC (CFU/ml) | ATP(ng/l) |
|---|---|---|---|
| July 2018 | SW1 | 1.6E+02 (1.5E+02) | 22.50 (5) |
| | SW2 | 6.8E+03 (6.1E+02) | 72.6 (5.8) |
| September 2019 | SW2 | 1.8E+03 (5.4E+01) | 32.53 (5.1) |

In January 2016, the seawater sample from Intake Bay (WS3) exhibited significantly high Heterotrophic Bacterial Count, i.e., 6,000 CFU/ml compared to the source water (CS) which was lower, $3.5 \times 10^3$ CFU/ml. Results for the samples collected from different Sampling Stations during April 2017, July 2018 and September 2019 also show a great deal of variance, which might be attributed to difference in sampling locations and also seasonal variations. Also, sometimes significantly high ATP contents and HPC values are observed due to quick re-growth of the microbial cells after the removal of any prevailing stressful condition. It is known that once the stress is removed, a tiny number of surviving bacteria can demonstrate a tremendous growth cycle, termed as after-growth, at the expense of readily available AOC, generated from the degradation of non-AOC substances present in seawater [86].

Figure 10:
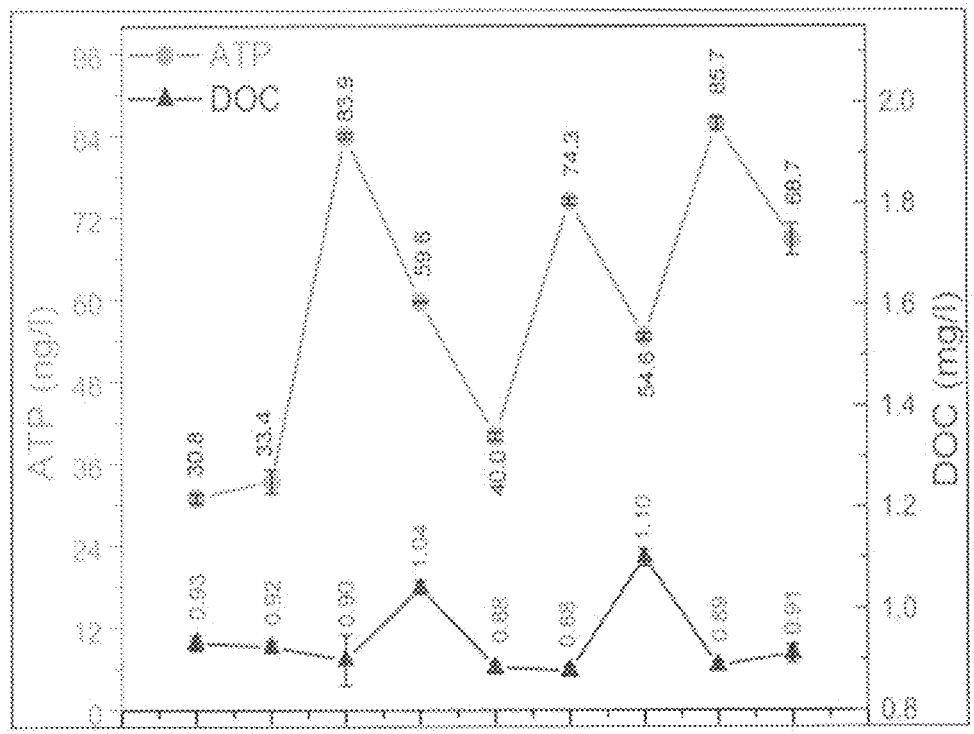
FIG. 10 is a graph showing changes of ATP with DOC in seawater samples (Prior Art).

FIG. 10 compares the change of ATP with DOC in the samples collected from CS.

Flow Cytometric (FMC) Analyses

Flow Cytometric (FCM) Analyses were performed to determine the bacterial and phytoplankton cell counts in the samples. All samples were fixed with 2% of glutaraldehyde solution to stop any microbial activity after sampling and analyzed in triplicate. While considering analytical error due to non-living particles and narrow difference between the background of free stain and signal intensity of stain-bound to cellular DNA, any value of cell count≤200 cells/ml was considered negligible. The results of Flow Cytometric Analysis for the Samples collected from CS, WS1, WS2 and WS3 during years 2016-2019 are presented in Table 7.

TABLE 7

Results of Flow Cytometric Analysis for the Samples collected from CS, WS1, WS2 and WS3 during 2016-2019.

| Month/Year | Sample Station | LNA Cells/ml | HNA Cells/ml |
|---|---|---|---|
| January 2016 | CS | $3.1 \times 10^5$ ($1.3 \times 10^3$) | $8.7 \times 10^5$ ($2.2 \times 10^3$) |
| April 2017 | SW3 | $7.7 \times 10^5$ ($1.8 \times 10^4$) | $5.5 \times 10^5$ ($7.3 \times 10^4$) |
| July 2018 | SW1 | $3.3 \times 10^4$ ($1.5 \times 10^2$) | $2.0 \times 10^4$ ($1.3 \times 10^2$) |
| September 2019 | SW2 | $1.4 \times 10^4$ ($2.2 \times 10^3$) | $8.1 \times 10^3$ ($1.0 \times 10^3$) |

Bacterial cells were counted at CS, WS1, WS2 and WS3 and classified as Low Nucleic Acid (LNA) and High Nucleic Acid (HNA) content cells using SYBR® Green-I as DNA stain. Most researchers report that HNA are actively growing cells [87]. Total bacterial cell count in open sea beyond CS was in the order of $10^6$-$10^7$. Total number of bacterial cells was in the order of $10^5$-$10^6$. LNA and HNA cell counts in January 2016 were $3.1 \times 10^5$ and $8.7 \times 10^5$ cells/ml, respectively in CS samples. In April 2017, these values were $7.7 \times 10^5$ and $5.5 \times 10^5$; $3.3 \times 10^4$ and $2.0 \times 10^4$ in July 2018; and $1.4 \times 10^4$ and $8.1 \times 10^3$ in September 2019, respectively. The phytoplankton cell count during January 2016 in CS and beyond was $4.4 \times 10^4$.

Microbial Diversity

1 Identification of Microbial Strains

As Manes, et al., characterized active bacterial population in seawater samples [61, 88], analysis to characterize the microbial diversity and the taxonomic affiliation near Marafiq-Y1 site was carried out during years 2016-2019 on the samples by next generation sequencing of 16S Ribosomal RNA Gene. The overall phyla distribution in CS, WS1, WS2 and WS3 samples showed that the community characterized by proteobacteria was the dominant phylum corresponding to about 82% of the total sequences with varying class distribution and abundance at different sampling stations.

Amongst proteobacteria, alphaproteobacteria exclusively represented the class members by about 60% of the sequences in CS samples. The second most represented phylum was bacteroidetes corresponding to about 20%. Alphaproteobacteria and gammaproteobacteria were found evenly distributed; each corresponding to about 41% of the total sequences and betaproteobacteria corresponded to about 9% classes. A substantial difference was noticed at WS3 compared to CS. WS3 was dominated by gammaproteobacteria, whereas CS largely represented alphaproteobacteria and betaproteobacteria. WS1 and WS2 were showing abundance of betaproteobacteria represented 32% class members.

The clustering of sequences at 96% similarity revealed specific Operational Taxonomic Units (OTUs) for each station. The CS was dominated by OTUs affiliated to alphaproteobacteria, 5% of sequence representativeness by hyphomicrobiaceae, 7% by rhodobacteraceae, 6% by rhodospirillaceae and 5% by unknown alphaproteobacteria. WS1 was mostly represented by two betaproteobacteria phylotypes, viz., zoogolea ramigera (11%) and ramlibacter (6%).

It was noticed that bacterial community composition in seawater (CS) and brine discharge bay differed from each other. At WS1 and WS2, the ubiquitous pelagibacter phylotype was highly represented by 22% and 25%, respectively, of the sequences, whereas CS was dominated by cyanobacteria *Prochlorococcus marinus* reaching 72% of sequence representativeness. The differences in the bacterial community structure and diversity (Shannon H Index) could be responsible for such discrepancy in bacterial compositions of CS, WS1 and WS2.

Figure 11:
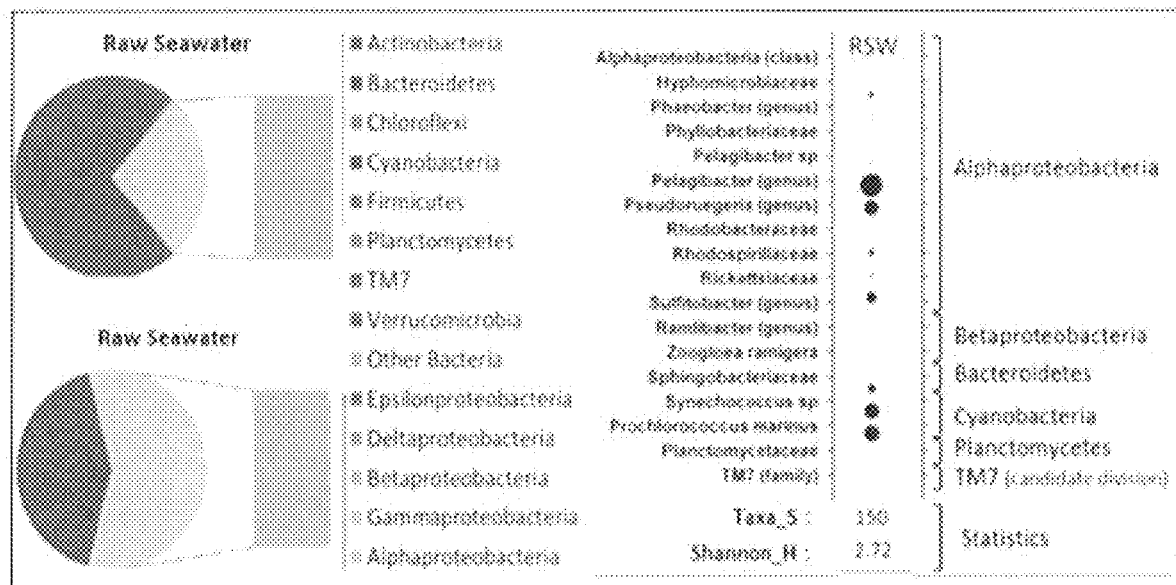
FIG. 11 is a graph showing phyla distribution of sequence datasets from CS, WS1 and WS2 (Prior Art).

The calculated Diversity Index (Shannon H), revealed that microbial community remained higher at CS during these years. The clustering of the sequence dataset at OTU level revealed that samples could be grouped <20% similarity. The Multidimensional Scaling (MDS) of the same dataset corroborate the clustering results. FIG. 11 represents phyla distribution of sequence datasets from CS, WS1 and WS2, major phyla distribution and corresponding class distribution of proteobacteria phylum, relative sequence representativeness of major phylotypes (>3%) identified in the samples from CS, WS1 and WS2, and the Diversity Index (Shannon H) calculated for each sample during the years studied.

2 Pyro-Sequencing Data Analysis

Pyro-sequencing of 16S rRNA gene of DNA extracted from seawater samples was performed and obtained data was analyzed. All obtained raw sequence reads were checked for the quality based on procedures [89]. Ribosomal Database Project (RDP) Classifier was used for the taxonomical assignments of the 16S rRNA gene sequences at 95% confidence level [90]. Hierarchical assignment files were downloaded from RDP Classifier and relative abundance of sequences assigned at respective genus, and unclassified groups were collated for Principal Component Analysis (PCA) and Bray-Curtis Similarity Analysis with square root transformation by Primer-Ev-5.2.4.

3 Taxon Distribution of DNA Samples

Figure 12A:
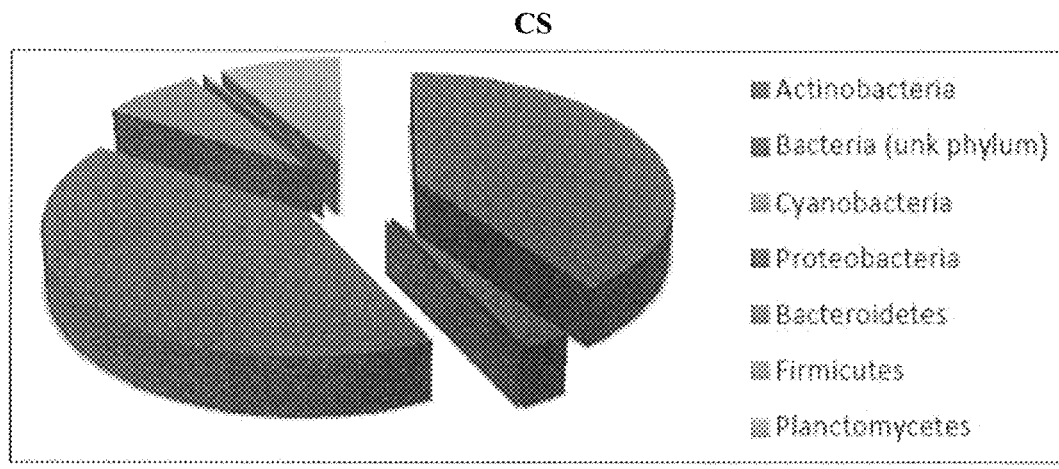
FIGS. 12A and 12B are graphs showing taxon distribution of DNA samples in seawater (CS) and discharge Out-bay (WS2) (Prior Art).
Figure 12B:
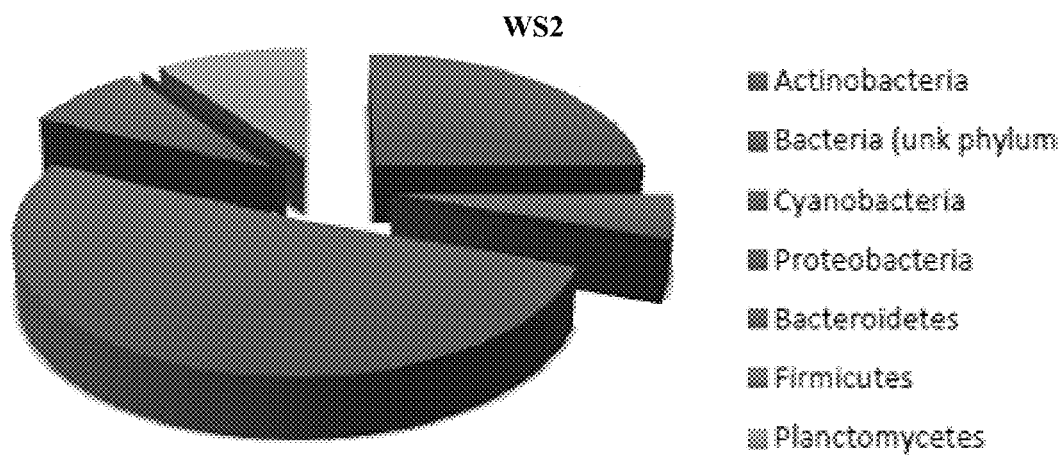

The taxon distribution of DNA samples in CS and WS2 are represented in FIGS. 12A and 12B.

CS and WS2 samples were dominated by actinobacteria and proteobacteria phyla. Actinobacteria phylum represented a genus affiliated to *Ponticoccus sp.* by about 26% and 17% of the sequences, whereas the proteobacteria represented members of alphaproteobacteria class affiliated to the genus *Ruegeria sp.* by 14% and 9% of the sequences. The genera *Ponticoccus* and *Ruegeria* were marine bacteria present in coastal marine waters and sediments [91, 92] and belonged to *Roseobacter* class of the rhodobacteraceae family (alphaproteobacteria), which is known to be associated with high organic content environments.

*Ruegeria sp., Ponticoccus* genera (alphaproteobacteria) and propionibacteriaceae (actinobacteria) family members were absent or poorly represented in the open sea indicating that such species were more adapted to sessile and nutrient competitive environments than pelagibacter sp., which is known to be free living ubiquitous marine bacteria [93].

Figure 13:
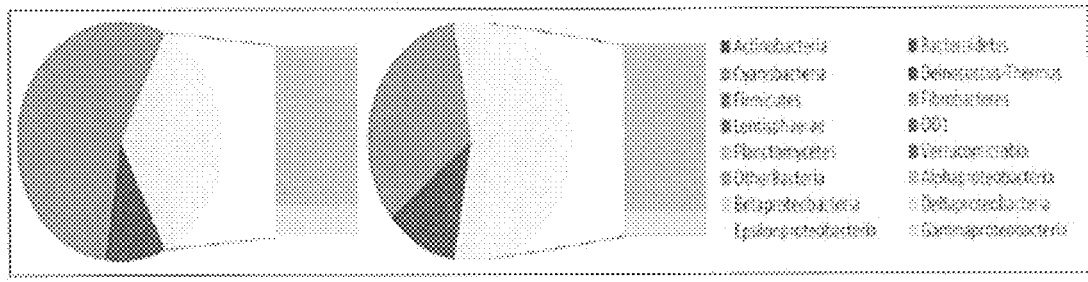
FIG. 13 is a graph showing phyla and Proteobacteria class distribution (inset) of sequences in CS and WS3 samples (Prior Art).
Figure 14:
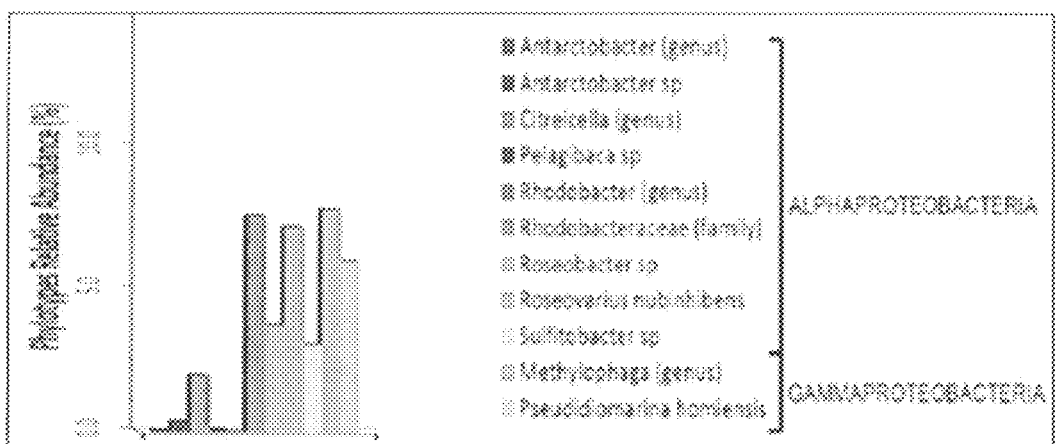
FIG. 14 is a graph showing taxa (Family, Genus and Species) in the sample represented by over 3% of the sequences (Prior Art).

FIGS. 13 and 14 represent phylogenetic affiliation and taxonomic distribution of the Ribosomal 16S RNA gene sequence dataset.

The phylogenetic affiliation of the different OTUs obtained after clustering the sequence datasets revealed some differences between the bacterial communities of water samples from different sampling stations. The differences of major species/groups identified in CS and WS1/WS2 could be observed by higher presence of pelagibacter sp. (alphaproteobacteria) in CS samples and *Pseudidiomarina sp.* (gammaproteobacteria) in WS1/WS2 samples. Table 8 shows the taxonomic classification of 16S rRNA gene sequence set after clustering and their average relative abundance (>0.5% representativeness) in the Red Sea samples collected from Control Station (CS) and Working Stations WS1, WS2 and WS3 near Marafiq-Y1. The data is the average of triplet samples collected on quarterly basis during years 2016-2019.

TABLE 8

Average Taxomomic classification of 16S rRNA gene sequence set in Red Sea samples from Control Station (CS) and Working Stations (WS1, WS2 and WS3) near Marafiq-Y1 during years 2016-2019.

| Taxon Affiliation | Representativeness (%) | | | |
|---|---|---|---|---|
| | CS | WS1 | WS2 | WS3 |
| Actinobacteria | | | | |
| Order - Actinomycetales | 0 | 0 | 0 | 0 |
| Family - Propionibacteriaceae | 0.1 | 0 | 0.1 | 0.1 |
| Sp. - *Propionibacterium* | 0 | 0 | 0 | 0 |
| Alphaproteobacteria | | | | |
| Class - Alphaproteobacteria | 0.8 | 0.4 | 0.6 | 1 |
| Sp. - *Brevundimonas* | 0 | 0 | 0 | 0 |
| Sp. - *Erythrobacter* | 0 | 0 | 0 | 0 |
| Family - Hyphomicrobiaceae | 0.1 | 0.1 | 0.1 | 0.1 |
| Family - Hyphomonadaceae | 0.1 | 0 | 0 | 0.2 |
| Genus - *Hyphomonas* | 0.1 | 0.1 | 0.1 | 0.2 |
| Sp. - *Hyphomonas* | 0 | 0 | 0 | 0 |

TABLE 8-continued

Average Taxomomic classification of 16S rRNA gene sequence set in Red Sea samples from Control Station (CS) and Working Stations (WS1, WS2 and WS3) near Marafiq-Y1 during years 2016-2019.

| Taxon Affiliation | Representativeness (%) | | | |
|---|---|---|---|---|
| | CS | WS1 | WS2 | WS3 |
| Sp. - *Mesorhizobium* | 0 | 0 | 0 | 0 |
| *Mautella Italica* | 0 | 0 | 0 | 0 |
| Genus - *Paracoccus* | 0 | 0 | 0 | 0 |
| Genus - *Pelagibacter* | 12.4 | 6.6 | 4.5 | 12.8 |
| Sp. - *Pelagibacter* | 54.2 | 29.7 | 18.8 | 56.4 |
| Family - Phyllobacteriaceae | 0.1 | 0.1 | 0.1 | 0.1 |
| Genus - *Ponticoccus* | 0.2 | 0.1 | 0.1 | 0.1 |
| Sp. - *Ponticoccus* | 0.1 | 0 | 0.1 | 0.1 |
| Sp. - *Pseudoruegeria* | 0 | 0 | 0 | 0 |
| Family - Rhizobiaceae | 0 | 0 | 0 | 0 |
| Order - Rhizobiales | 1 | 0.5 | 0.6 | 0.8 |
| Genus - *Rhodobacteraceae* | 0 | 0 | 0 | 0 |
| Family - Rhodobacteraceae | 1.1 | 0.7 | 1 | 0.7 |
| Sp. - *Rhodobacteraceae* | 0 | 0 | 0 | 0 |
| Order - Rhodobacterales | 0.1 | 0.1 | 0.1 | 0.1 |
| Family - Rhodoblaceae | 0 | 0 | 0 | 0 |
| Family - Rhodospirilaceae | 0.1 | 0.1 | 0.1 | 0.1 |
| Family - Rickettsiales | 12.6 | 11.8 | 12 | 12.4 |
| Genus - *Roseobacter* | 0 | 0 | 0 | 0 |
| Sp. - *Roseobacter* | 0 | 0 | 0 | 0 |
| Genus - *Roseovarius* | 0 | 0 | 0 | 0 |
| *Roseovarius nubinhibens* | 0 | 0 | 0 | 0 |
| Genus - *Ruegeria* | 0 | 0 | 0 | 0 |
| *Ruegeria atiantica* | 0 | 0 | 0 | 0 |
| *Ruegeria pomeroyl* | 0 | 0 | 0 | 0 |
| Sp. - *Ruegeria* | 0 | 0 | 0 | 0 |
| Family - Sphingomonadaceae | 0 | 0 | 0 | 0 |
| Order - Sphingomonadales | 0 | 0 | 0 | 0 |
| *Sulfitobacter japonica* | 0 | 0 | 0 | 0 |
| Sp. - *Tateyamaria* | 0 | 0 | 0 | 0 |
| Genus - *Thalassospira* | 0 | 0 | 0 | 0 |
| Sp. - *Thalassospira* | 0 | 0 | 0 | 0 |
| Gammaproteobacteria | | | | |
| Order - Alteromonadales | 0 | 0 | 0 | 0 |
| Family - Idiomarinaceae | 0 | 0 | 0 | 0 |
| Sp. - *Marinobacter* | 0 | 0 | 0 | 0 |
| Sp. - *Dielphllus* | 0 | 0 | 0 | 0 |
| Genus - *Pseudidiomarina* | 0 | 0 | 0 | 0 |
| *Pseudidiomarina maritima* | 0 | 0 | 0 | 0 |
| Sp. - *Pseudidiomarina* | 0 | 0.9 | 1.3 | 0 |
| Order - Pseudomonadales | 0.7 | 0.3 | 0.4 | 0.6 |
| Phylum - Proteobacteria | 0.9 | 0.6 | 0.7 | 0.9 |
| Bateroidetes | | | | |
| Phylum - Bateroidetes | 0.5 | 0.4 | 0.4 | 0.6 |
| Family - Bateroidaceae | 0 | 0 | 0 | 0 |
| Family - Cytophagaceae | 0 | 0 | 0 | 0 |
| Family - Flavobacteriaceae | 0.7 | 0.4 | 0.4 | 0.6 |
| Order - Flavobacteriales | 0.4 | 0.3 | 0.4 | 0.5 |
| Genus - *Flavobacterium* | 0.7 | 0.4 | 0.6 | 0.8 |
| Sp. - *Flavobacterium* | 1.5 | 1.1 | 1.2 | 1.4 |
| Genus - *Flexibacteriaceae* | 0 | 0 | 0 | 0 |
| Genus - *Microscilla* | 0 | 0 | 0 | 0 |
| Family - Saprospiraceae | 0 | 0 | 0 | 0 |
| Family - Sphingobacteriaceae | 2.6 | 2.2 | 2.5 | 2.5 |
| Order - Sphingobacteriales | 0.6 | 0.3 | 0.4 | 0.6 |
| Firmicutes | | | | |
| Phylum - Firmicutes | 0 | 0 | 0 | 0 |
| Family - Clostridiaceae | 0 | 0 | 0 | 0 |
| Plantcomycetes | | | | |
| Phylum - Plantcomycetes | 0 | 0 | 0 | 0 |
| Family - Plantcomyceae | 0.1 | 0.1 | 0.1 | 0.1 |
| Class - Plantcomycetacia | 0 | 0 | 0 | 0 |
| Family - Plantcomycetales | 0.9 | 0.5 | 0.6 | 0.6 |
| Order - Plantcomycetales | 0.1 | 0.1 | 0.1 | 0.1 |
| Genus - *Rhodopirellula* | 0.2 | 0 | 0.1 | 0.2 |

TABLE 8-continued

Average Taxomomic classification of 16S rRNA gene sequence set in Red Sea samples from Control Station (CS) and Working Stations (WS1, WS2 and WS3) near Marafiq-Y1 during years 2016-2019.

| Taxon Affiliation | Representativeness (%) | | | |
|---|---|---|---|---|
| | CS | WS1 | WS2 | WS3 |
| Cyanobacteria | | | | |
| Sp. - *Bynechococcus* | 0.6 | 0.3 | 0.3 | 0.5 |
| Unk. Phylum - Bacteria | 2.4 | 2 | 2.2 | 2.5 |
| Taxa_S | 49 | | | |
| Sequence No. | 7321 | | | |
| Sjhannon_H | 1.75 | | | |
| Dominance_D | 0.35 | | | |
| Evenness_e^H/S | 0.12 | | | |

The above data shows that there was not much deviation in the average relative abundance from open Red Sea area (CS), which is Control Station or Reference Point, to the Working Stations (WS1, WS2 and WS3), which are the points at the Brine Discharge Bay Outlet or the Recovery Zones and the Intake Bay, respectively. The above data confirms that there was no noticeable impact of the brine discharge on the marine aquatic microorganisms during the years 2016-2019.

The phylogenetic affiliation of different OTUs obtained after clustering sequence datasets showed that all station samples contained *Antarctobacter, Roseobacter sp.*, rhodobacteraceae, *Roseovarius nubinhibens* and *Sulfitobacter*, but with different concentration profiles. The differences on major species/groups identified could be observed by the presence of *Methylophaga* (3.7%) and *Pseudidiomarina homiensis* (2.4%), both gammaproteobacteria, and *Sulfitobacter* (1.9%, alphaproteobacteria) in WS1 and WS2 samples on average during years 2016-2019. Usually, *Pseudidiomarina sp.* Dominated the bacterial community in both marine sediments [94] and reef coral holobiont [95]. Remarkably, *Pseudidiomarina homiensis* was identified in a phenanthrene (polycyclic-aromatic hydrocarbon) degrading bacteria screen [96] and its relative high abundance coincided with the relatively high PHA concentration in the samples. However, WS1 sample was dominated by *Antarctobacter sp.* (11.6% of sequences, alphaproteobacteria). Members of *Antarctobacter* genera, i.e., rhodobacteraceae family, were associated with concentrated brine environments of WS1 and WS2 [97]. Other rhodobacteraceae affiliated groups, i.e., *Roseobacter* clade and *Roseovarius nubinhibens*, described as degraders of organic-sulfur compounds (dimethylsulfoniopropionate) and generalists of DOC were in nutrient-rich environments [98, 99]. It indicated that these species should have been adapted more where nutrient competition rules the survival.

Tables 9A and 9B show the average of full year data of microbial community composition (≥3% phylotypes) at Marafiq-Y1 Control Station (CS) in the Red Sea during years 2016-2019.

TABLE 9A

Average Microbial Community Composition (≥3% phylotypes) at Marafiq-Y1 Control Station (CS) in the Red Sea during Years 2016-2019 (January-June).

| Taxonomic Classification | | Percentage of Sequence Representation (2016-2019) | | | | | |
|---|---|---|---|---|---|---|---|
| | | January | February | March | April | May | June |
| class: alphaproteobacteria | *pelagibacter* (genus) | 2 | 2 | 3 | 1 | 6 | 6 |
| | *sulfitobacter* sp. | 2 | <0.5 | <0.5 | 0 | <0.5 | <0.5 |
| | rickettsiaceae (unclassified family) | 1 | 2 | 2 | <0.5 | 8 | 7 |
| phylum: proteobacteria | *pelagibacter* sp. | 8 | 11 | 11 | 9 | 10 | 18 |
| | *marinovum* sp. | 11 | 14 | 14 | 15 | 6 | 7 |
| phylum: cyanobacteria | *synechococcus* (genus) | 2 | 2 | 1 | 2 | 2 | 3 |
| | *synechococcus* sp. | 28 | 30 | 35 | 48 | 45 | 33 |
| phylum: bacteroidetes | *flavobacterium* (genus) | 1 | 2 | 2 | 2 | <0.5 | 2 |
| | *flavobacterium* sp. | 2 | 2 | <0.5 | 2 | 3 | 3 |

TABLE 9B

Average Microbial Community Composition (≥3% phylotypes) at Marafiq-Y1 Control Station (CS) in the Red Sea during Years 2016-2019 (July-December).

| Taxonomic Classification | | Average % of Sequence Representation (2016-2019) | | | | | |
|---|---|---|---|---|---|---|---|
| | | July | August | September | October | November | December |
| class: alphaproteobacteria | *pelagibacter* (genus) | 4 | 3 | 2 | 1 | 2 | 1 |
| | *sulfitobacter* sp. | <0.5 | 0 | <0.5 | <0.5 | <0.5 | <0.5 |
| | rickettsiaceae (unclassified family) | 6 | 1 | <0.5 | 3 | 2 | 2 |
| phylum: proteobacteria | *pelagibacter* sp. | 18 | 8 | 3 | 3 | 8 | 7 |
| | *marinovum* sp. | 6 | 8 | 8 | 8 | 8 | 8 |
| phylum: cyanobacteria | *synechococcus* (genus) | 6 | 6 | 5 | 8 | 7 | 7 |
| | *synechococcus* sp. | 17 | 34 | 40 | 40 | 38 | 30 |
| phylum: bacteroidetes | *flavobacterium* (genus) | 2 | 2 | 2 | 1 | 1 | 2 |
| | *flavobacterium* sp. | 5 | 3 | 2 | 2 | 1 | 1 |

4 Temporal Survey of Seawater Microbial Community

Figure 15:
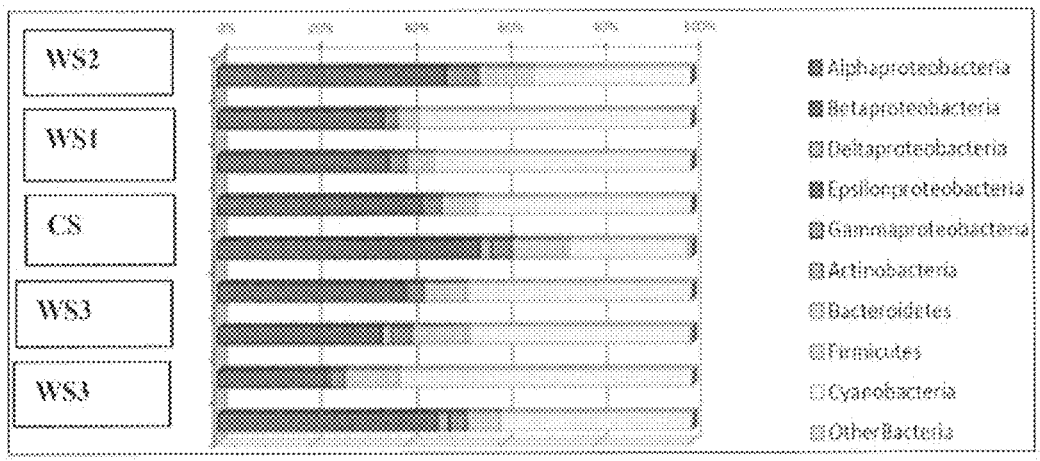
FIG. 15 is a graph showing seawater quality parameter monitoring for microbial community distribution (Prior Art).

Besides ATP and DOC parameters, temporal survey of seawater microbial community was performed by pyrosequencing of the 16S ribosomal RNA gene and the taxonomic classification and affiliation of sequences. The distribution and relative abundance of the major phyla from the samples are shown in FIG. 15.

All samples from CS, WS1, WS2 and WS3 during years 2016-2019 mainly represented cyanobacteria (pico-phytoplankton) and proteobacteria phyla followed by bacteroidetes with variable abundances at different sampling stations. All samples showed alphaproteobacteria class (proteobacteria) affiliated sequences with dominance (about 56% of the Sequences). The *Synechococcus* genera were considerably abundant phylotype among the cyanobacteria phyla with 54% of the sequences at WS3. The distribution of major phylotypes (≥3%) revealed no major changes in the microbial community composition between the samples collected on quarterly basis. Dominant groups always remained dominant, indicating that seawater and the Discharge Bay samples had stable microbial distribution. Qian, et al., reported dominance of the cyanobacteria in photic-zone at offshore locations associated with deep Red Sea brine pools [100].

5 Microbial Communities Comparison at Different Sampling Stations

The microbial communities in CS shared low similarity of 16.4% with those present in WS1, WS2 and WS3 samples and clustered apart from the suspended microbial communities. Amongst microbial community detected, on average basis the genus *Acinetobacter* accounted for a relative abundance of 21.6%, *Ralstonia* (8.5%), *Diaphorobacter* (6.3%), unclassified comamonadaceae (7.3%), *Stenotrophomonas* (5.4%) and unclassified enterobacteriaceae (3.6%) during the years 20126-2019. These bacterial populations were present in lower relative abundance in the CS samples, ranging from 0.8% to 3.5% of the total microbial community. The higher relative abundance of these bacterial populations in WS3 compared to CS samples indicated a preferential concentration of the microorganisms most probably due to prevailing embayment conditions.

Microbial communities also slightly differed between WS1 and WS2. The WS1 sample shared 62.9% similarity with the WS2 sample. The relative abundance of unclassified alphaproteobacteria, *Janthinobacterium* and *Pedobacter* decreased in WS2 compared to WS1. But genera *Janthinobacterium* and *Pedobacter* were found >3-folds higher in relative abundance at WS3.

However, *Silicibacter, Pseudomonas* and unclassified rhodobacteraceae were present at >2-folds higher relative abundances in the middle of the Discharge Bay compared to WS1 and WS2 throughout the years 2016-2019. The genus *Silicibacter* was present with the highest abundance of 12.7% and unclassified rhodobacteriaceae with 70.8% during these years. These bacterial populations might be $Cl_2$ tolerant, thus had passed intact through the desalination process and remained biologically active. The analytical results of ATP in the middle of Discharge Bay were about 1.5-folds higher, which coincided with this increase in the relative abundance of these two bacterial groups.

6 Relative Abundance of the Bacterial Populations

Figure 16:
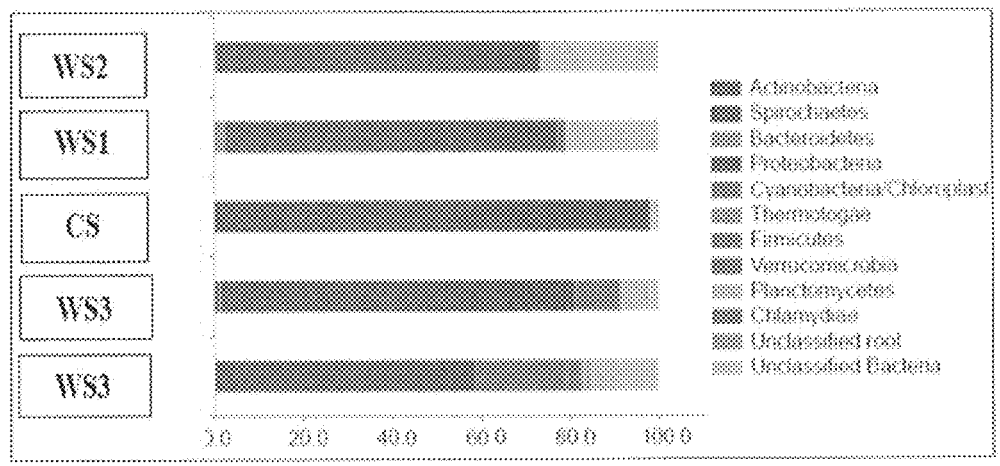
FIG. 16 is a graph showing microbial community with relative abundance of the predominant phyla (Prior Art).
Figure 17:
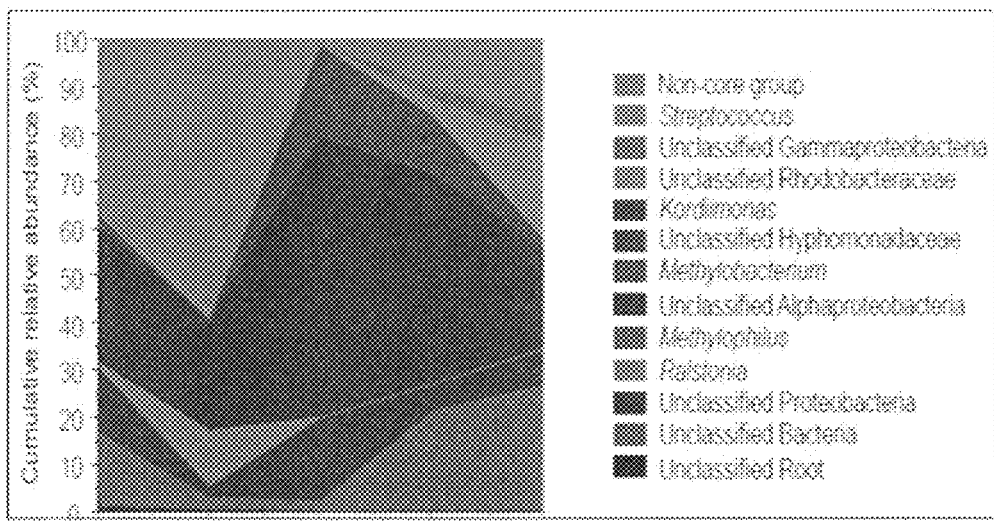
FIG. 17 is a graph showing relative abundance of the bacterial populations with core bacterial groups (Prior Art).

Phylum proteobacteria was predominant in all sampling stations accounting on average for 56.9-98.3% of the total microbial community during years 2016-2019. Phylum cyanobacteria was also abundant, i.e., 20.4%, in WS3. Phylum proteobacteria mainly comprised of unclassified proteobacteria, alphaproteobacteria and gammaproteobacteria. The bacterial population present in several samples included various unclassified groups and genera, like *Ralstonia, Methylophilus, Methylobacter, Kordiimonas* and *Streptococcus*. Among these, the relative abundance of unclassified hyphomonadaceae was higher in SW3 compared to CS. Similarly, about 5.6-folds higher relative abundance of the unclassified rhodobacteraceae was observed in WS1 and WS2. FIGS. 16 and 17 show microbial community with relative abundance of the predominant phyla.

Despite overlapping latitudinal ranges and shared biogeographic significance, all coastal brine discharge sites on Middle East water-bodies are uniquely different.

The immediate brine Discharge Zone is slightly less productive in marine primary production than the ambient sea, but the receiving water returns to ambient conditions in Recovery Zone, as evidenced by rapid planktonic organisms' restoration in the Recovery Zone.

Yearly planktonic population composition in Outfall was similar to Control Station with slight deviation in the density and incidence frequency from ambient conditions.

Recovery Zones showed substantial replenishment and restoration of population.

The brine discharge from Marafiq-Y1 did not affect overall species composition.

The study showed that effluent from Marafiq-YI has nonthreatening and very limited impacts on the marine environment and minimal on aquatic species diversity.

A comprehensive database for environmental planning and management and environmental studies to resolve problems from desalination plants need to be realized by the entire desalination community.

As desalination plants would continue to be a major source of coastal discharges, vigilant monitoring is desired to keep the adjacent seas free from pollution.

Biologically, the immediate brine Discharge Zone was found slightly less productive than the ambient sea. Although, both the zones showed similar composition of planktonic population on the site but the density and frequency of incidence exhibited a slight deviation from the ambient conditions. Slight biological effects, such as impingement, entrapment and entrainment are discussed too. However, the Recovery Zones showed substantial replenishment and restoration of the population. Several other aspects of brine disposal, such as mixing, dilution and dispersion have also been discussed in the light of regulatory requirements.

These studies on the impacts of the brine discharge on the biological diversity in the adjacent marine environment thoroughly presented enormous information. Based on data, the brine discharge from the Marafiq-Yanbu-I Desalination Plants had nonthreatening (or in the worst case the minimal) impact on coastal environment.

It is understood that the disclosed method is not limited to the particular methodology, protocols, and reagents described as these may vary. It is also to be understood that the terminology used herein is for the purpose of describing particular embodiments only, and is not intended to limit the scope of the invention which will be limited only by the appended claims.

It must be noted that as used herein and in the appended claims, the singular forms "a", "an", and "the" include plural reference unless the context clearly dictates otherwise. Thus, for example, reference to "an inhibitor" includes a plurality of such inhibitors, reference to "the inhibitor" is a reference to one or more inhibitors and equivalents thereof known to those skilled in the art, and so forth.

Throughout the description and claims of this specification, the word "comprise" and variations of the word, such as "comprising" and "comprises," means "including but not limited to," and is not intended to exclude, for example, other additives, components, integers or steps.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. It should be understood that all of the individual values and sub-ranges of values contained within an explicitly disclosed range are also specifically contemplated and should be considered disclosed unless the context specifically indicates otherwise. Finally, it should be understood that all ranges refer both to the recited range as a range and as a collection of individual numbers from and including the first endpoint to and including the second endpoint. In the latter case, it should be understood that any of the individual numbers can be selected as one form of the quantity, value, or feature to which the range refers. In this way, a range describes a set of numbers or values from and including the first endpoint to and including the second endpoint from which a single member of the set (i.e. a single number) can be selected as the quantity, value, or feature to which the range refers. The foregoing applies regardless of whether in particular cases some or all of these embodiments are explicitly disclosed.

Unless defined otherwise, all technical and scientific terms used herein have the same meanings as commonly understood by one of skill in the art to which the disclosed method belongs. Although any methods and materials similar or equivalent to those described herein can be used in the practice or testing of the method, the particularly useful methods, devices, and materials are as described. Publications cited herein and the material for which they are cited are hereby specifically incorporated by reference. Nothing herein is to be construed as an admission that the invention is not entitled to antedate such disclosure by virtue of prior invention. No admission is made that any reference constitutes prior art. The discussion of references states what their authors assert, and applicants reserve the right to challenge the accuracy and pertinency of the cited documents. It will be clearly understood that, although a number of publications are referred to herein, such reference does not constitute an admission that any of these documents forms part of the common general knowledge in the art.

Although the description of materials, components, steps, techniques, etc. may include numerous options and alternatives, this should not be construed as, and is not an admission that, such options and alternatives are equivalent to each other or, in particular, are obvious alternatives.

Those skilled in the art will recognize, or be able to ascertain using no more than routine experimentation, many equivalents to the specific embodiments of the method and compositions described herein. Such equivalents are intended to be encompassed by the following claims.

REFERENCES

1. Schewe J., Heinke J., Gerten D., Haddeland I., Amell N. W., Clark D. B., Dankers R., Eisner S., Fekete B. M., Colon-Gonzalez F. J., Gosling S. N., Kim H., Liu X., Masaki Y., Portmann F., Satoh Y., Stacke T., Tang Q., Wada Y., Wisser D., Albrecht T., Frieler K., Piontek F., Warszawski L. & Kabat P., (2014), Multimodel assessment of water scarcity under climate change, Proc. Natl. Acad. Sci., 111 (9), 3245-3250.
2. Mekonnen M. M. & Hoekstra A. Y., (2016), Four billion people facing severe water scarcity, Sci. Adv., 2(2), e1500323.
3. Richter B. D., Abell D., Bacha E., Brauman K., Calos S., Cohn A., Disla C., Friedlander O'Brien S., Hodges D., Kaiser S., Loughran M., Mestre C., Reardon M. & Siegfried E., (2013), Tapped out: how can cities secure their water future?, Water Policy, 15(3), 335-363.
4. Djuma H., Bruggeman A., Eliades M. & Lange M. A., (2016), Non-conventional water resources research in semi-arid countries of the Middle East, Desalin. Water Treat., 57(5), 2290-2303.
5. Damania R., Desbureaux S., Hyland M., Islam A., Moore S., Rodella A. S., Russ J. & Zaveri E., (2017), Uncharted Waters: The New Economics of Water Scarcity & Variability, World Bank, Washington, DC, Internet page openknowledge.worldbank.org/handle/10986/28096.
6. World Population Prospects, (2012), The United Nations, New York, 2013.
7. Rijsberman F. R., (2006), Water scarcity: Fact or fiction?, Agric. Water Manag., 80, 5-22. doi:10.1016/j.agwat.2005.07.001.
8. Venkatesan A. K., Ahmad S., Johnson W. & Batista J. R., (2011), Salinity reduction & energy conservation in direct & indirect potable water reuse, Desalination, 272, 120-127, doi:10.1016/j.desal.2011.01.007.
9. FAO, (2012), Web page unwater.org/statistics res.html#sthash.OITf6L7 m.dpuf (April 2019)
10. Fernandez-Torquemada Y., Gonzalez-Correa J. M., Loya A., Ferrero L. M., Diaz-Valdes M. & Sanchez-Lizaso J. L., (2009), Dispersion of brine discharge from seawater reverse osmosis Desalination plants, Desalination & Water Treatment, 5, 137-145.
11. WWAP, (2012), Managing Water under Uncertainty & Risk. World Water Assessment Programme, World Water Development, The United Nations, New York, Report 4.
12. Elimelech M. & Phillip W. A., (2011), The future of seawater Desalination: energy, technology, & the environment, Science, 333 (6043), 712-717.
13. Gude V. G., (2017), Desalination & water reuse to address global water scarcity, Rev. Environ. Sci. Biotechnol., 16(4), 591-609.
14. Ozair G., Al-Sebaie K. Z. and Al-Zahrany S. A., (2017), Impact of Long Term Concentrated Brine Disposal on the Ecosystem of Near-shore Marine Environment—A Case Study, Proceed. IDA World Cong., Sao Paulo, Brazil.
15. The Role of Desalination in an Increasingly Water-Scarce World, p. 93.
16. Ghaffour N., Missimer T. M. & Amy G. L., (2013), Technical review & evaluation of the economics of water Desalination: current & future challenges for better water supply sustainability, Desalination, 309, 197-207.
17. Caldera U. & Breyer C., (2017), Learning curve for seawater reverse osmosis Desalination plants: capital cost trend of the past, present, & future, Water Resour. Res., 53(12), 10523-10538.
18. Dane N. C. & Toor G. S., (2018), Desalination of water: a review, Curr. Pollut. Rep., p. 1-8.
19. Sood A. & Smakhtin V., (2014), Can desalinization & clean energy combined help to alleviate global water scarcity?, Jour. Am. Water Resour. Assoc., Internet site doi.org/10.1111/jawr.12174 (April 2019)
21. Ozair G. and Feda M. O., (2013), Brine Disposal Implications on Near-shore Physico-Chemical Quality of Marine Environment-Proceed. IDA World Cong. on Desalination & Water Re-Use, Tianjin, China.
22. International Hydrographic Organization, (1953, 2010).
23. Sofianos S. S., Johns W. E. & Murray S. P., (2002), Heat & freshwater budgets in the Red Sea from direct observations at Bab el Mandeb, Deep Sea Res., 2(49), 1323-1340, doi:10.1016/50967-0645(01)00164-3.
24. Morcos S. A., (1970), Physical & chemical oceanography of the Red Sea, Oceanogr. Mar. Biol. Ann. Rev., 8, 73-202.
25. Zahran M. A., (2010), Climate-Vegetation: Afro-Asian Mediterranean & Red Sea Coastal Lands, vol. 4, Springer Sci. & Business Media, Dordrecht, Netherlands, doi: 10.1007/978-90-481-8595-5.
26. Rohling E. J., (1994), Glacial conditions in the Red Sea, Paleoceanography, 9, 653-660, doi: 10.1029/94PA01648.
27. Siccha M., Trommer G., Schulz H., Hemleben C. & Kucera M., (2009), Factors controlling the distribution of planktonic foraminifera in the Red Sea & implications for the development of transfer functions, Mar. Micropaleontol., 72(3), 146-156, doi:10.1016/j.marmicro.2009.04.002.
28. Boyer T., Levitus S., Garcia H., Locarnini R. A., Stephensand C. & Antonov J., (2005), Objective analyses of annual, seasonal, & monthly temperature & salinity for the World Ocean on a 0.25 grid, Int. Jour. Climatol., 25(7), 931-945, doi:10.1002/joc.1173.
29. Fishelson L., (1971), Ecology & distribution of the benthic fauna in the shallow waters of the Red Sea, Marine Biology, 10, 113-133.
30. Belkin I. M., (2009), Rapid warming of large marine ecosystems, Progress in Oceanography, 81, 207-213.
31. Raitsos D. E., Hoteit, I., Prihartato, P. K., Chronis, T., Triantafyllou, G., and Abualnaja, Y., (2011), Abrupt warming of the Red Sea, Geophysical Research Letters, 38.
32. Raitsos D. E., Pradhan Y., Brewin R. J. W., Stenchikov G. & Hoteit I., (2013), Remote sensing the phytoplankton seasonal succession of the Red Sea, PloS one 8, e64909.
33. Rhein, M., et al., (2009), Observations: Ocean, Climate Change (2013): the physical science basis, Contribution of Working Group I to the V Assessment Report of the Intergovernmental Panel on Climate Change, Cambridge University Press, Cambridge, UK & NY, USA.
34. Kleypas J. A., Danabasoglu G. & Lough J. M., (2008), Potential role of the ocean thermostat in determining regional differences in coral reef bleaching events, Geophysical Research Letters 35.
35. Cantin N. E., Cohen A. L., Karnauskas K. B., Tarrant A. M. & McCorkle D.C., (2010), Ocean warming slows coral growth in the central Red Sea, Science, 329, 322-325.
36. Sherman K., Belkin I., Friedland K. D., O'Reilly J. & Hyde K., (2009), Accelerated warming & emergent trends in fisheries biomass yields of the world's large marine ecosystems, AMBIO, 38, 215-224.
37. Sawall Y., Al-Sofyani A., Banguera-Hinestroza E. & Voolstra C. R., (2014), Spatio-temporal analyses of Symbiodinium physiology of the coral Pocillopora *verrucosa* along large-scale nutrient & temperature gradients in the Red Sea, PloS one 9.
38. Roik A., Roder C., Rothig T. & Voolstra C. R., (2016), Spatial & seasonal reef calcification in corals and calcareous crusts in the central Red Sea, Coral Reefs 35, 681-693.
39. Chaidez V., Dreano D., Agustil S., Duarte C. M. & Hoteit I., (2017), Decadal trends in Red Sea maximum surface temperature, Scientific Reports, 7: 8144, doi:10.1038/s41598-017-08146-z.
40. Poloczanska E. S., et al., (2013), Global imprint of climate change on marine life. Nature Climate Change, 3, 919-925.
41. Wilkinson C. P., (1998), the 1997-1998 mass bleaching event around the world, Status of Coral Reefs of the World: 1998 Report, Australian Institute of Marine Science, Townsville, Australia, p. 23.
42. Stillman J. H., (2003), Acclimation capacity underlies susceptibility to climate change, Science, 301, 65-65.
43. Burrows M. T., et al., (2014), Climate velocity & geographical limits to shifts in species distributions, Nature, 507, 492-495.
44. Burrows M. T., et al., (2011), The pace of shifting climate in marine & terrestrial ecosystems, Science, 334, 652-655.
45. Ngugi D. K., Antunes A., Brune A. & Stingl U., (2012), Biogeography of pelagic bacterioplankton across an antagonistic temperature salinity gradient in the Red Sea Molecular Ecology, 21(2), 388-405, doi: 10.1111/j.1365-294X.2011.05378.x.
46. Mezger E. M., Nooijer L. J. de, Boer W., Brummer G. J. A. & Reichart G. J., (2016), Salinity controls on Na incorporation in Red Sea planktonic foraminifera, Paleoceanography, 31, 1562-1582, doi:10.1002/2016PA003052.
47. Kirchman D. L., Dittel A. I., Malmstrom R. R. & Cottrell M. T., (2005), Biogeography of major bacterial groups in the Delaware estuary, Limnol Oceanogr, 50: 1697-1706.
48. Johns W. E., Jacobs G. A., Kindle J. C., Murray S. P. & Mike C., (1999), Arabian marginal seas and gulfs, University of Miami RSMAS technical report, 2000-01, 60.
49. Global Distribution of Coral Reefs Dataset, (2010).
50. Racault M. F., Raitsos D. E., Berumen M. L., Brewin R. J. W., Platt T., Sathyendranath S. & Hoteit I., (2015), Phytoplankton phenology indices in coral reef ecosystems: Application to ocean-color observations in the Red Sea, Remote Sensing of Environment, Elsevier, Internet site dx.doi.org/10.1016/j.rse.2015.01.019 (April 2019)
51. Nanninga G. B., Saenz-Agudelo P., Manica A. & Berumen M. L., (2014), Environmental gradients predict the genetic population structure of a coral reef fish in the Red Sea, Mol. Ecol., 23(3), 591-602.
52. Raitsos D. E., Brewin R. J. W., Zhan P., Dreano D., Pradhan Y., Nanninga G. B. & Hoteit I., (2017), Sensing coral reef connectivity pathways from space, Sci. Rep., 7.
53. Saenz-Agudelo P., Dibattista J. D., Piatek M. J., Gaither M. R., Harrison H. B., Nanninga G. B. & Berumen M. L., (2015), Seascape genetics along environmental gradients in the Arabian Peninsula: Insights from ddRAD sequencing of anemonefishes, Mol. Ecol., 24 (24) 6241-6255.

54. Turak E., Brodie J. & DeVantier L., (2007), Reef-building corals and coral communities of the Yemen Red Sea, Fauna Arab, 23, 1-40.
55. Nag O. S., (2018), How Much of the Ocean Have We Explored?, World Atlas, Web page worldatlas.com/articles/how-much-of-the-ocean-is-still-unexplored.html (April 2019)
56. Holm-Hansen 0. & Booth C. R., (1966), The Measurement of Adenosine Triphosphate in the Ocean & its Ecological Significance, Limnology and Oceanography, 11:510-519.
57. Chen G. H. & Leung D. H. W., (2000), Utilization of Oxygen in a Sanitary Gravity Sewer, Water Res., 34:3813-3821.
58. Hamilton R. D. & Holm-Hanson O., (1967), Adenosine Triphosphate Content of Marine Bacteria, Limnology and Oceanography, 12:319-324.
59. Reasoner D. J. & Geldreich E. E., (1985), A New Medium for the Enumeration and Subculture of Bacteria from Potable Water, Appl. Environ. Microbiol., 49:1-7.
60. Servais P., Casamayor E. O., Courties C., Catala P., Parthuisot N. & Lebaron P., (2003), Activity and Diversity of Bacterial Cells with High and Low Nucleic Acid Content, Aquatic Microbial Ecology, 33:41-51.
61. Manes C. L. D. O., West N., Rapenne S. & Lebaron P., (2011), Dynamic Bacterial Communities on Reverse-Osmosis Membranes in a Full-scale Desalination Plant, Biofouling, 27:47-58.
62. Dowd S., Sun Y., Secor P., Rhoads D., Wolcott B., James G. & Wolcott R., (2008), Survey of Bacterial Diversity in Chronic Wounds Using Pyrosequencing, DGGE, and Full Ribosome Shotgun Sequencing, BMC Microbiol, 8:43.
63. Dowd S., Callaway T., Wolcott R., Sun Y., McKeehan T., Hagevoort R. & Edrington T., (2008), Evaluation of the Bacterial Diversity in the Feces of Cattle Using 16s rDNA Bacterial Tag-encoded Flx Amplicon Pyrosequencing (btefap), BMC Microbiology, 8(1):125.
64. Hammer Ø., Harper D. & Paul D., (2001), Past: Paleontological Statistics Software Package for Education and Data Analysis., Palaeontol Electronica.
65. folk.uio.no/ohammer/past/(April 2019) (Internet site)
66. Penru Y., Simon F. X., Guastalli A. R., Esplugas S., Llorens J. & Baig, S., (2011), Characterization of Natural Organic Matter from Mediterranean Coastal Seawater, Fourth IWA Specialty Conference on Natural Organic Matter, Costa Mesa, CA, US.
67. Huber S. A., Balz A., Abert M. & Pronk W., (2011), Characterization of Aquatic Humic and Non-humic Matter with Size-exclusion Chromatography—Organic Carbon Detection—Organic Nitrogen Detection (LC-OCD-OND), Water Res., 45:879-885.
68. Leenheer A. J., Croue J. P., Benjamin M., Gregory V. K., Hwang J. C., Bruchet A. & George R. A., (2000), Comprehensive Isolation of Natural Organic Matter from Water for Spectral Characterizations & Reactivity Testing, Natural Organic Matter & Disinfection By-Products, American Chemical Society, Washington DC, p. 68-83.
69. Zimmermann C. F., Keefe C. W. & Bashe J., (1997), US-EPA Method #440.0: Determination of Carbon & Nitrogen in Sediments & Particulates of Estuarine/Coastal Waters Using Elemental Analysis, US Environmental Protection Agency.
70. Dalvi A. G. I., Al-Rasheed R. & Javeed M. A., (2000), Studies on Organic Foulants in the Seawater Feed of Reverse Osmosis Plants of SWCC, Desalination, 132: 217-232.
71. Bruchet A., Rousseau C. & Mallevialle J., (1990), Pyrolysis-GC-MS for Investigating High-molecular-weight THM Precursors & Other Refractory Organics, Jour. Amer. Water Works Assoc., 82: 66-74.
72. Leenheer J. A. & Croue J. P., (2003), Characterizing Aquatic Dissolved Organic Matter, Environ. Sci. Technol., 37:18A-26A.
73. Christy A. A., Bruchet A. & Rybacki D., (1998), Characterization of Natural Organic Matter by Pyrolysis/GC-MS, Environ. International, 25:181-189.
74. Chen M. Y., Lee D. J., Yang Z., Peng X. F. & Lai J. Y., (2006), Fluorecent Staining for Study of Extracellular Polymeric Substances in Membrane Biofouling Layers, Environ. Sci. Technol., 40:6642-6646.
75. Chen M. Y., Lee D. & Tay J., (2007), Distribution of Extracellular Polymeric Substances in Aerobic Granules, Appl. Microbiol. Biotechnol., 73:1463-1469.
76. Naumann D., Schultz C. & Helm D., (1996), What Can Infrared Spectroscopy Tell Us about the Structure & Composition of Intact Bacterial Cells?, Infrared Spectroscopy of Biomolecules, John Wiley & Sons, NY, p. 279-310.
77. Schmitt J. & Flemming H. C., (1998), FTIR Spectroscopy in Microbial & Material Analysis, International Biodeterioration & Amp; Biodegradation, 41:1-11
78. Smith B. C., (1998), Infrared Spectral Interpretation—A Systematic Approach, CRC Press, Florida, USA.
79. Coates, (2000), Interpretation of Infrared Spectra, A Practical Approach, Encyclopedia of Analytical Chemistry, John Wiley & Sons, Ltd., Chichester, UK, p. 10815-10837.
80. Leenheer J. A., (2009), Systematic Approaches to Comprehensive Analyses of Natural Organic Matter, Ann. Environ. Sci., 3:1-130.
81. Benning L. G., Phoenix V. R., Yee N. & Tobin M. J., (2004), Molecular Characterization of Cyanobacterial Silicification Using Synchrotron Infrared Micro-spectroscopy, Geochim. Cosmochim. Acta, 68:729-741.
82. MPPSP, (1977), Maryland Power Plant Siting Program, Summary of Current Findings: Culvert Cliffs Nuclear Power Plant Aquatic Monitoring Program, Prepared by Martin Marietta Corporation, Baltimore, Md., p. 57.
83. Leenheer J. A. & Rostad C., (2004), Tannins & Terpenoids as Major Precursors of Suwannee River Fulvic Acid, US Geological Survey.
84. Leenheer J. A., Noyes T. I., Rostad C. E. & Davisson M. L., (2004), Characterization & Origin of Polar Dissolved Organic Matter from the Great Salt Lake, Biogeochemistry, 69:125-141.
85. Leenheer J. A., Nanny M. A. & McIntyre C., (2003), Terpenoids as Major Precursors of Dissolved Organic Matter in Landfill Leachates, Surface Water & Groundwater, Environ. Sci. Technol., 37:2323-2331.
86. Flemming H. C., Schaule G., Griebe T., Schmitt J. & Tamachkiarowa A., (1997), Biofouling—The Achilles Heel of Membrane Processes, Desalination, 113:215-225.
87. Lebaron P., Servais P., Agogue H., Courties C. & Joux F., (2001), Does the High Nucleic Acid Content of Individual Bacterial Cells Allow Us To Discriminate Between Active Cells & Inactive Cells in Aquatic Systems?, Applied and Environ. Microbio., 67:1775-1782.
88. Manes C. L. D. O., Barbe C., West N. J., Rapenne S. & Lebaron P., (2011), Impact of Seawater-Quality and Water Treatment Procedures on the Active Bacterial Assemblages at Two Desalination Sites, Environ. Sci. Technol., 45:5943-5951.

89. Hong P. Y., Li X., Yang X., Shinkai T., Zhang Y., Wang X. & Mackie R. I., (2012), Monitoring Airborne Biotic Contaminants in the Indoor Environment of Pig & Poultry Confinement Buildings, Environ. Microbio., 14:1420-1431.
90. Cole J. R., Wang Q., Cardenas E., Fish J., Chai B., Farris R. J., Kulam-Syed-Mohideen AS., McGarrell D. M., Marsh T., Garrity G. M. & Tiedje J. M., (2009), The Ribosomal Database Project—Improved Alignments and New Tools for rRNA Analysis, Nucleic Acids Research, 37:D141-145.
91. Hwang C. Y. & Cho B. C., (2008), *Ponticoccus Litoralis* gen. nov., Sp. nov., A Marine Bacterium in the Family Rhodobacteraceae, Int. Jour. Syst. Evol. Micr., 58:1332-1338.
92. Brinkhoff T., Giebel H. A. & Simon M., (2008), Diversity, Ecology & Genomics of the *Roseobacter* Glade: A Short Overview, Arch. Microbiol., 189:531-539.
93. Morris R. M., Rappe M. S., Connon S. A., Vergin K. L., Siebold W. A., Carlson C. A. & Giovannoni S. J., (2002), SAR11 Clade Dominates Ocean Surface Bacterioplankton Communities, Nature, 420:806-810.
94. Hu Z. Y. & Li Y., (2007), *Pseudidiomarina Sediminum* Sp. nov., A Marine Bacterium Isolated from Coastal Sediments of Luoyuan Bay in China, Int. Jour. Syst. Evol. Micr., 57:2572-2577.
95. Sweet M. J., Croquer A. & Bythell, J. C., (2011), Development of Bacterial Biofilms on Artificial Corals in Comparison to Surface-Associated Microbes of Hard Corals, PLoS ONE, 6:e21195.
96. Jean W. D., Leu T. Y., Lee C. Y., Chu T. J., Lin S. Y. & Shieh W. Y., (2009), *Pseudidiomarina Marina* Sp. nov. and *Pseudidiomarina Tainanensis* Sp. nov. & Reclassification of *Idiomarina Homiensis* and *Idiomarina Salinarum* as *Pseudidiomarina Homiensis* comb. nov. & *Pseudidiomarina Salinarum* comb. nov., respectively, Int. Jour. Syst. Evol. Micr., 59:53-59.
97. Labrenz M., Collins M. D., Lawson P. A., Tindall B. J., Braker G. & Hirsch P., (1998), *Antarctobacter Heliothermus* Gen. nov., Sp. Now, a Budding Bacterium from Hypersaline & Heliothermal Ekho Lake, Int. Jour. Syst. Bacteriol., 48:1363-1372.
98. Malmstrom R. R., Kiene R. P., Cottrell M. T. & Kirchman D. L., (2004), Contribution of SAR11 Bacteria to Dissolved Dimethylsulfoniopropionate & Amino Acid Uptake in the North Atlantic Ocean, Applied & Environ. Microbio., 70:4129-4135.
99. Poretsky R. S., Sun S., Mou X. & Moran M. A., (2010), Transporter Genes Expressed by Coastal Bacterioplankton in Response to Dissolved Organic Carbon, Environ. Microbiol., 12:616-627.
100. Qian P. Y., Wang Y., Lee O. O., Lau S. C., Yang J., Lafi F. F., Al-Suwailem A. & Wong T. Y., (2011), Vertical Stratification of Microbial Communities in the Red Sea Revealed by 16S rDNA Pyro-sequencing, ISME Jour., 5:568-568.
101. Abdul Azis, P. K., Al-Tissan, I., Al-Daili, M., Green, T. N., Dalvi, A. G. I. and Javeed, M. A., (1999), "Ecological Evaluation of the Depth Profile of the Nearshore Waters of the Al-Jubail Desalination & Power Plants", Research Activities & Studies, Research & Technical Affair Department, SWCC, Vol. 9.
102. Abdul Wahhab, S. and Jupp, B., (2009), "Levels of Heavy Metals in Sub-tidal Sediments in the Vicinity of Thermal Power/Desalination Plants: A Case Study", Desalination, 244:261-282.
103. Abu Qdais, H. A., (1999), "Environmental Impact of Desalination Plants on the Arabian Gulf", Proc. IDA World Cong. on Desalination & Water Reuse, San Diego, USA, p. 249-260.
104. Abuzinada, A. H., Jorg-Barth, H., Krupp, F., Boer, B. and Al-Abdessalaam, T. Z., "Protecting the Gulf's Marine Ecosystems from Pollution", Birkhauser Verlag, Switzerland, p. 207-222.
105. Al-Awadi, F. M. A., (1995), "Environmental Impact of Sites on P&D Plants", Desalination & Water Reuse, 4(4):28-31.
106. Al-Awadi, A. A., (1999), "Regional Report on Desalination—Middle East", Proc. IDA World Congress on Desalination & Water Reuse, San Diego, USA., 29 August-3 September, p. 13-21.
107. Al-Awadi. F. M. A., (1991), "The Impact of the Gulf War on Desalination Plants in Kuwait", Desolination & Water Reuse, 1(4):16-20.
108. Al-Barwani, H. H. and Purnama, A., ( ) "Brine Discharges from Two Coastal Desalination Plants", Sultan Qaboos University, Muscat, Sultanate of Oman, Web page ifh.uni-karlsruhe.de/science/envflu/research/brinedis/publications/novasci.pdf
109. Al-Ghabdan and Al-Amri, (1993), "Environmental Impact Assessment: Integrated Methodology—A Case Study of Kuwait, Arabian Gulf", Coastal Management, 21:271-298.
110. Al-Gobaisi, D. M. K., (1994), "A Quarter—Century of Seawater Desalination by Large Multi-Stage Flash Plants in Abu Dhabi", Desalination, 99, 483-508.
111. Al-Golaikah, A. M., (1986), "Desalination by the Saline Water Conversion Corporation of Saudi Arabia", Topics in Desalination, SWCC, KSA, 198-201.
112. Al-Hajri, K. and Ahmed, H. D., (1997), "The Gulf Sea Basin: A Clean Water Supply Intake or a Dumping Sink", Proc. Third Gulf Water Conference, Bahrain, 8-13 March, p. 977-997.
113. Ali, M. Y. and Riley, J. P., (1986), "The Distribution of Halomethanes in the Coastal Waters of Kuwait", Marine Pollution Bulletin, 17(9), p. 409-414.
114. Al-Sayari, S. S. and Zotl, J. G., (1978), "Quaternary Period in Saudi Arabia", Springer Verlag, Wien, New York, p. 334.
115. Al-Sofi, M. A. K., (1986), "MSF Chemical & Fuel Consumption in Dual Purpose Plants", Topics in Desalination, SWCC, KSA.
116. Al-Tayaran, A. M. and Madany, I. M., (1992), "Impact of a Desalination planton the Physical & Chemical Properties of Seawater", Bahrain, Water Research, 26(4), 435-441.
117. Al-Yakoob, S., Olayan, A. H. B., Bahloul, M., (1994), "Trace in the Gills of the Fish from the Arabian Gulf", Bull. Environ. Contamin. Toxicol, 53, 718-725.
118. Al-Yamani, F., (2008), "Importance of the Freshwater Influx from the Shatt Al-Arab River on the Arabian Gulf Marine Environment", Kuwait Institute of Scientific Research, Kuwait.
119. Amal, K. and Ali, A. Z. D., (1986), "Trace Elements Geochemical Association in the Arabian Gulf", Mar. Pollut. Bull., 17, p. 353-356.
120. Arabian Gulf: Wikipedia, en.wikipedia.org/wiki/Arabian_Gulf
121. Are the World's Oceans on the Brink of Disaster? (2011), Globe Net, June.
122. Association of Monterey Bay Area Governments (AMBAG), (2006), Desalination Feasibility Study in the Monterey Bay Region, Web page ambag.org/(February 2017).

123. Benda, R. S. and Gulvas, J., (1976), Effects of Palisades Nuclear Power Plant on Lake Michigan, Edited by Esch, G. W. and Mc. Farlane R. W., Thermal Ecology II, U. S. Energy Research and Development Admin., Oak Ridge, Tenn. (Conf. 750425).

124. Bijma Jelle and Wegener Alfred, (2011), The Potentially Deadly Trio of Factors-Warming, Acidification & Anoxia—Affecting Today's Oceans, International Earth System Expert Workshop on Ocean Impacts & Stresses, IPSO Oxford, 18 p.

125. Buros, O. K., (1994), "Desalting as an Environmentally Friendly Water Treatment Process", Water Treatment Technology Program, Report No: 13, Department of the Interior, Bureau of Reclamation, Denver Office, USA.

126. Bushnak, A. A., (1993), "Water Desalination: The Experience of GCC Countries", U. N. Economic and Social Commission for Western Asia., p.63.

127. CAMERI, (2004), "Mathematical Model for Spreading of Brine Outlet at Sea Desalination plantat Ashkelon VID".

128. Cheshire, R. H., (1975), Biological Impact of a Large Scale Desalination plantat Key West Florida, In. Tropical Mar. Pollution, 99-153, Edited by E. J. Fargusson Wood & R. E. Johannes, Elsevier Publishing Company, Amsterdam.

129. Cheung William, (2011), Vanishing Resource: The Tale of the Chinese Bahaba, International Earth System Expert Workshop on Ocean Impacts & Stresses, IPSO Oxford, 18 p.

130. Ciocanea, A., Badescu, V., Cathcart, R. B. and Finkl, C. W., (2013), Reducing the Risk Associated to Desalination Brine Disposal on the Coastal Areas of Red Sea, Coastal Hazards, Coastal Research Library, vol. 1000, p. 285-316, Internet site link.springer.com/chapter/10.1007%2F978-94-007-5234-4_12# (February 2017).

131. Cushing, D. H. and Dickinson, R. R., (1976), Biological Response in the Sea to Climatic Changes, Adv. Mar. Biol., 14, 1-22.

132. Danoun, R., (2007), "Desalination Plants: Potential Impacts of Brine Discharge on Marine Life", Ocean Technology Group, The University of Sydney, Australia.

133. Dawoud, M. A. and Al-Mulla, M. M., (2012), "Environmental Impacts of Seawater Desalination: Arabian Gulf Case Study", International Journal of Environment & Sustainability, vol. 1, No. 3, p. 22-37, Web page sciencetarget.com 134. Desalination & Water Re-Use (D&WR), (2007), IDA, August-September, p. 36-44.

135. Drami, D., Yacobi, Y. Z., Stambler, N. and Kress, N., (2011), "Seawater Quality & Microbial Communities at a Desalination plantMarine Outfall— A Filed Study at the Israeli Mediterranean Coast", Water Research, 45:5449-5462.

136. Edwards, A. J. and Head, S. M., (1986), Red Sea, Pergammon Press, Oxford.

137. Elshorbagy, W. and Elhakeem, A. B., (2008), "Risk Assessment Maps of Oil Spill for Major Desalination Plants in United Arab Emirates", Desalination, vol. 228, p. 200-216.

138. English Daily 'Arab News', (2016-2017), multiple issues, Jeddah, KSA.

139. English Daily 'Saudi Gazette', (2017), Jeddah, KSA, Issue 4 January

140. Everest, W. R. and Murphree, T., (1995), "Desalting Residuals: A Problem or a Beneficial Resource", Desalination, 102, 107-117.

141. Fernandez-Torquemada, Y., Gonzalez-Correa, J. M., Loy a, A., Ferrero, L. M., Diaz-Valdes, M. and Sanchez-Lizaso, J. L., (2009), "Dispersion of Brine Discharge from Seawater Reverse Osmosis Desalination Plants", Desalination & Water Treatment, 5,137-145.

142. Fischetti, M., (2012), How Much Water Do Nations Consume?, Scientific American, May 21, Web page scientificamerican.com/article.cfm?id=graphic-science-how-much-water-nations-consume 143. Friedland, A. C. and Gat, Y., (1976), "Environmental Effects of the Eilat Seawater Desalination Plant", Proc. Sci. Conf. Israel Ecol Soc., 26-34.

144. Friedland, A. C., Gat, Y. and Kon, D., (1980), Improving the Environmental Effects of the Eilat Seawater Desalination Plant, Proc. 7th Intl. Symp. on Fresh Water from the Sea, 1, 131-136.

145. Gasson, C., (2012), "GWI 2013 Desalination Market Preview", IDA News, November-December, p. 8.

146. Haury, L. R. and Pipier, R. E., (1988), Zooplankton: Scales of Biological & Physical Events in Marine Organisms as Indicators, eds., D. F. Soule, G.s. Kleppel, Springer Verlag, NY, USA, p. 342.

147. Hoegh-Guldberg Ove, (2011), End of paradise: Coral Reefs Facing Multiple Attacks, International Earth System Expert Workshop on Ocean Impacts & Stresses, IPSO Oxford, 18 p.

148. Hoepner, T. and Windelberg, J., (1996), Elements of Environmental Impact Studies on Coastal Desalination Plants, Desalination, 108, 11-18.

149. Hoepner, T., (1999), "A Procedure for Environmental Impact Assessment for Seawater Desalination", Desalination, 124, p. 1-12.

150. Hopner, T. and Lattermann, S., (2002), "Chemical Impacts from Seawater Desalination Plants—A Case Study of the Northern Red Sea", Desalination, 152, p. 133-140.

151. Hopner, T. and Windelberg, J., (1996), "Elements of Environmental Impact Studies on Coastal Desalination Plants", Desalination, 108, 11-18.

152. Hutchinson Tom, (2011), Pollution and Marine Species: New Challenges of an Old Problem, International Earth System Expert Workshop on Ocean Impacts & Stresses, IPSO Oxford, 18 p.

153. IDA (International Desalination association), (2007), "Worldwide Desalting Plant Inventory", No. 20, CD, Media Analytics Ltd, Oxford, UK.

154. IDA, (2010-2011), "Desalination Year Book", GWI Desal Data/IDA, p. 1-12.

155. IDA, (2012-2013), "Desalination Year Book", GWI Desal Data/IDA, p. 1-10.

156. International Desalination Association (IDA), (2016-2017), Desalination Year Book, GWI Desal Data/IDA, p. 1-12.

157. International Hydrographic Organization, (1953, 2010), "Limits of Oceans & Seas", Special Publication No. 23, 3rd Edition, Retrieved 7th February, Imp. Monegasque, Monte Carlo.

158. Jawwad, M. and Al-Tabatabaei, M., (1999), "Impact of Current Power Generation & Water Desalination Activities on Kuwaiti Marine Environment", Proc. IDA World Congress on Desalination & Water Reuse, San Diego, USA, 29 August-3 September, p. 231-240.

159. Jensen, L. D, (1978), Fourth National Workshop on Entrainment and Impingement, Ecological Analyst, Melville, N. Y., p. 424.

160. Khordagui, H., (1997), Environmental Consideration of Brine Water Disposal from Desalination Plants, Proc. IIIrd Gulf Water Conf., Bahrain, 8-13 March, 957-976.
161. Khordagui, H., (2002), "Environmental Impacts of Power-Desalination on the Gulf Marine Ecosystem", Inc: Khan, et al., (EDS), "The Gulf Ecosystem: Health & Sustainability", Backhuys Pub., Leiden.
162. Kinne, O., (1963), The effect of Temperature and Salinity on Marine and Brackish Water Animals, I. Temperature, Oceanogr. Mar. Biol Ann. Review, 1, Pergammon Press, UK.
163. Kress, N. and Galil Bella, S., (2012), "Seawater Desalination in Israel & Its Environmental Impact", Desalination & water Re-Use, IDA, February-March, vol. 21, No. 4, p. 26.
164. Kress, N., Galil Bella, S., and Shoham-Frider, E., (2011), "Marine Monitoring at the Brine Disposal Site of the Via Maris Desalination plantOff Palmachim—Results from May & September, 2010", National Monitoring Program Report (IOLR): H-25/2011, p.89, Incl: D&WR, vol. 21, Issue 4, p.29.
165. Krishnan, T. and Kannupandi, T., (1987), Influence of Salinity on Larval Survival and Development of the Mangrove Crab, Metaplax Distincta H. Milne Edwards, 1952, Decapoda: Grapsidae, Proc. Natn. Sem. Estuarine Management, 373-376.
166. Lange, R., (1970), Isosmotic Intracellular Regulation and Euryhalinity in Marine Bivalves, J. Exp. Mar. Bio. Ecol., 5, 170-179.
167. Latif, N. A., Al-Wadi, E. M. and Clenutt, B. A., (1989), "Trihalomethane Formation in Multistage Flash Distillation Plants", Proc. IVth World Congress on Desalination & Water Reuse, Kuwait, 205-226.
168. Lattermann, S. and Hoepner, T., (2003), Seawater Desalination—Impacts of Brine & Chemical Discharges on the Marine Environment, Desalination, 220:1-15.
169. Lattermann, S. and Hopner, T., (2008), "Environmental Impact & Impact Assessment of Seawater Desalination", Desalination Pub., L'Aquila, Italy, p. 142.
170. Lattermann, S., (2010), "Development of An Environment Impact Assessment & Decision Support System for Seawater Desalination Plants", CRC Press, Balkema, Internet site repository.tudelft.nl
171. Latteman, S., (2011), How Has Desalination Affected the Arabian Gulf? IDA Journal, Vol. 3, No. 1, p.12-13.
172. Majewski, W. and Miller D.C., (1979), Predicting Effects of Power Plant Once-Through Cooling on Aquatic Systems, UNESCO, Paris.
173. Malik, A. U., Mayankutty, P. C., Andijani, I. N. and Al-Fozan, S. A., (1993), "Materials Performance & Failure Evaluation in SWCC MSF Plants", Proc. IDA WRPC World Conference on Desalination & Water Treatment, Vol. I, November, p. 547-558.
174. Manna, A. J. I., (1994), "Environmental Impact of Dual Purpose Plants", Desalination & Water Reuse, 4(0:46-49.
175. Mayan Kutty, P. C. and Al-Jarrah, S. A., (1991), "Disinfection Byproducts: Present Status & Future Perspective in Seawater Desalination", Research Activities & Studies, Research & Technical Affairs Department, SWCC, Vol. II, 53-72.
176. Mayan Kutty, P. C., Nomani, A. A. and Thankachan, T. S., (1990), "Monitoring of Organic Pollutants in Seawater and Product Water Samples from 3 MSF Plants in the Eastern Coast of Saudi Arabia", Research Activities & Studies, Research & Technical Affair Department, SWCC, Vol. 1, 1-46.
177. Mayan Kutty, P. C., Nomani, A. A. and Thankachan, T. S., (1991a), "Analysis of Water Samples from Jeddah for Organic Pollutants", Research Activities & Studies, Research & Technical Affairs Department, SWCC, Vol. II, 182-219.
178. Mayan Kutty, P. C., Nomani, A. A. and Thankachan, T. S., (1991b), "Monitoring of Oil Spill Contaminants on Water Samples from SWCC Desalination Plants at Al-Jubail and Al-Khobar", Research Activities & Studies, Research & Technical Affairs Department, SWCC, Vol. II, 156-181.
179. MEPA, (1987b), "Red Sea", Report No: 3, Meteorology & Environmental Protection Administration, Saudi Arabia and International Union for Conservation of Nature & National Resources, Switzerland, p. 105.
180. Meteorology & Environmental Protection Administration (MEPA), (1987a), "Arabian Gulf" Report No: 5, MEPA, Saudi Arabia and International Union for Conservation of Nature & Natural Resource, Switzerland, p. 248.
181. Mickley, M., (1996), "Environmental Considerations for the Disposal of Desalination Concentrates", Desalination & Water Reuse, 5(4):56-61.
182. Middle East Desalination Research Center (MEDRC), (2002), Assessment of the Composition of Desalination plantDisposal Brines, Project Report No: 98-AS-026, MEDRC, Oman.
183. Mohsen, M. S. and Al-Jayyousi, O. R., (1999), "Brackish Water Desalination: An Alternative for Water Supply Enhancement", Desalination, 124, 163-174.
184. Morin, O. H., (1994), "Desalting as a Friendly Water Treatment Process, Desalting as an Environmentally Friendly Water Treatment Process", 3.1-3.14 (Ed. Buros, O. K.), US. Dept. of Interior, USA.
185. Ozair, G. et al., (2013), "Best Practices in the Management of Disinfection By-Products & Their Formation Potential", submitted for presentation at the International Desalination Association World Congress on Desalination and Water Reuse, Tianjin, China.
186. Potts, J. P. E., (1994), "Permitting of Concentrate Discharge", Desalination and Water Reuse, 4(1):40-44.
187. Preen, A., (1989), "The Status & Conservation of Dugongs in the Arabian Region", Vol. 1, MEPA Coastal & Marine Management Series, Report No: 10.
188. Price, A. R. G., Mathews, C. P., Ingle, R. W. and Al-Rasheed, K., (1993), Abundance of Zooplankton and Peneid Shrimp Larvae in the Western Gulf—Analysis of Pre-War and Post-War Data, Mar. Pollut. Bull., 27: 273-278.
189. Proceedings of IDA Conference, (2007), Maspalomas, Canary Islands, September
190. Raveendran, N., (1995), "Reverse Osmosis Water Desalination Operation & Maintenance Experiences in the Middle East", Proc. of the IDA World Congress on Desalination & Water Sciences, Abu Dhabi, Vol. III, 109-131.
191. Red Sea: Wikipedia, en.wikipedia.org/wiki/Red_Sea
192. Regional Organization for the Protection of the Marine Environment (ROPME), (1999), "Regional Report of the State of the Marine Environment", ROPME/GC-9/002, p. 219.
193. Regional Organization for the Protection of the Marine Environment (ROPME), (2003), State of the Marine Environment Report, ROPME, Kuwait.

194. Report of the Experts Meeting on Environmentally Sound Management of Seawater Desalination Plants & Brine Discharges, (2002), Forli, Italy, 16-18 May, UNEP (DEC)/MED WG.205/5.
195. Reynolds, M., (1993), "Physical Oceanography of the Gulf, Straits of Hormuz, and the Gulf of Oman: Results from the Mt. Mitchell Expedition", Marine Pollution Bulletin—27, The Gulf War: Coastal & Marine Environmental Consequences, 35-59.
196. Roberts, D. A., Johnson, E. L. and Knott, N. A., (2010), "Impacts of Desalination plantDischarges on the Marine Environment: A Critical Review of Published Studies", Water Research, 44:5117-5128.
197. Rogers, A. D. and Laffoley, Dan, (2011, 2012), State of Ocean Report, International Earth System Expert Workshops on Ocean Impacts & Stresses, IPSO Oxford; Web site stateoftheocean.org/(February 2017)
198. Rogers, A. D. and Laffoley, Dan, (2012), Main Ocean Stressors, Web page stateoftheocean.org/science/stressors/(February 2017)
199. Safrai, I. and Zask, A., "Environmental Regulations for Discharging Desalination Brine to the Sea & Its Possible Impacts", Ministry of Environmental Protection, Israel, Web page ildesal.org.il/pdf/130.pdf
20. Pinto F. S. & Marques R. C., (2017), Desalination projects economic feasibility: a standardization of cost determinants, Renew. Sust. Energ. Rev., 78, 904-915.
200. Saline Water Conversion Corporation (SWCC), (1998), "Annual Report", SWCC, Riyadh, KSA.
201. Shams El-Din, A. M., Arain, R. and Hammoud, A., (2000), "On the Chlorination of Seawater", Desalination, vol. 129, p. 53-62.
202. Shams El-Din, A. M., Shawki Azis and B. Makkawi, (1994), Electricity & Water Production in the Emirate of Abu Dhabi & Its Impact on the Environment", Desalination, 97(1-3), 373-388.
203. Sheppard, C., Al-Husaini, M., Al-Jamali, F., Al-Yamani, F., Baldwin, R., Bishop, J., Benzoni, F., Dutrieux, E., Dulvy, N., Durvasula, S., Jones, D., Loughland, R., Medio, D., Nithyanandan, M., Pilling, G., Polikarpov, I., Price, A., Purkis, S., Riegl, B., Saburova, M., Namin, K., Taylor, O., Wilson, S. and Zainal, K., (2010), The Gulf: A Young Sea in Decline, Marine Pollution Bulletin, 60: 13-38.
204. Sheppard, C., Price, A. and Roberts, C., (1992), Marine Ecology of the Arabian Region: Patterns & Process in Extreme Tropical Environments, Academic Press.
205. SWCC, (1996), "Environmental Data", Environmental Committee, SWCC, KSA.
206. The Global State of the Ocean: Interactions between Stresses, Impacts and Some Potential Solutions, (2013), Marine Pollution Bulletin, 74:2:491-552, September; Web page stateoftheocean.org/science/state-of-the-ocean-report/(February 2017).
207. UNEP, (2002), "Report on the Experts Meeting (16th-18th May) on Environmentally Sound Management of Seawater Desalination Plants & Brine Discharges—Mediterranean Action Plan", Report #UNEP(DEC)/MED WG.205/5, June, Italy.
208. UNEP, (2003), "Seawater Desalination in the Mediterranean: Assessment & Guidelines", Mediterranean Action Plan (MAP), Tech. Report #139, UNEP, MAP, Program for the Assessment & Control of Pollution in the Mediterranean Region (MEDPOL), Athens, Greece.
209. UNESCO, (1995), IOC PERSGA-ACOPS, "Workshop on Oceanographic Input to Integrated Coastal Zone Management in the Red Sea & Gulf of Aden", Intergovernmental Oceanographic Commission, Workshop Report No: 126, p. 121.
210. United Nations Environment Program(UNEP), (1999), "Overview on Land-based Sources & Activities Affecting the Marine Environment in the ROPME Sea Area", UNEP Regional Seas Reports and Studies #168, UNEP/GPA Coordination Office, Netherlands.
211. USEPA, (1976), Development Document for Best Technology Available for the Location, Design, Construction and Capacity of Cooling Water Adverse Environmental Impact, Washington D.C., EPA, 440/1-76/015-a.
212. Wangnick, K., (1998), "Desalting Plants Inventory", Report No: 15, IDA, USA.
213. Wenner, A. and Feo, E. F., (1995), "Project Financing of Desalination Facilities", Desalination, 102, 119-153.
214. World Health Organization (WHO), (2007), "Desalination for Safe Water Supply, Guidance for the Health & Environmental Aspects Applicable to Desalination", WHO, Geneva.

We claim:

1. A method for monitoring marine water-body sustainability at a site of discharge into a natural marine water-body, the method comprising:
    (a) establishing monitoring sites at:
        a plurality of designated distances from the site of discharge, and
        a plurality of designated depths from the site of discharge; and
    (b) obtaining samples from the natural marine water-body at the monitoring sites,
    wherein the site of discharge into the natural marine water-body is selected from the group consisting of water purification plants, water desalination plants, power plants, oil refineries, cement plants, leather tanneries, pharmaceutical plants, chemical plants, agricultural runoffs, municipal sewage dumping, flood water into the natural marine water-body and storm-water into the natural marine water-body.

2. The method of claim 1, wherein the monitoring sites comprise a mixing zone work station, a recovery zone work station, a control work station, or a combination thereof.

3. The method of claim 1, wherein the plurality of designated distances from the site of discharge comprises distances at:
    between about 45 m and 55 m offshore, comprising a mixing zone work station;
    between about 95 m and 105 m offshore and about 225 m and 275 m distant from the mixing zone work station, comprising a recovery zone work station; and
    between about 1,250 m and 1,750 m offshore, comprising a control work station.

4. The method of claim 1, wherein the plurality of designated depths at the monitoring sites comprises at least three depths:
    between about 0 m and about 5 m,
    between about 5 m and about 10 m,
    between about 25 m and about 30 m,
    and optionally, seabed.

5. The method of claim 1, wherein the samples are water samples and are obtained daily.

6. The method of claim 1, wherein the samples are water samples and marine biomass and are obtained once every three months.

7. The method of claim 1, wherein the samples are water samples and marine biomass and are obtained annually.

8. The method of claim 1, wherein the samples are processed for any one or more of physical and chemical monitoring; marine observational surveys; biological monitoring; biochemical and organic monitoring; microbial monitoring; and phylogenetic analysis.

9. The method of claim 1, wherein the site of discharge is a site for discharge from water desalination plants.

10. The method of claim 1, wherein the samples are processed to measure temperature, electrical conductivity, pH, salinity, total suspended solids (TSS), total dissolved solids (TDS), dissolved oxygen (DO), density, turbidity, total hardness, and chemical composition for physical and chemical monitoring.

11. The method of claim 1, wherein the monitoring sites are physically surveyed, marine habitats are enumerated, and wherein the samples are processed to assess plankton health for biological monitoring.

12. The method of claim 1, wherein the samples are processed to assess nutrient availability, nutrient recycling, and ecosystem metabolism for biochemical and organic monitoring.

13. The method of claim 1, wherein the samples are processed to assess adenosine-5'-triphosphate (ATP) levels, heterotrophic plate count (HPC), microbial cell counts, and algal cell counts for microbial monitoring.

14. The method of claim 1, wherein the samples are processed using 16S ribosomal RNA gene pyro-sequencing for phylogenetic analysis.

15. The method of claim 1 further comprising:
(c) analysis of data from the samples obtained in step (b), wherein the analysis establishes baseline samples, test samples, or both, for monitoring.

16. The method of claim 15, further comprising:
(d) establishing monitoring sites:
at a plurality of designated distances from a site of intake, and
a plurality of designated depths from the site of intake;
(e) obtaining samples from the natural marine water-body at the monitoring sites; and
(f) performing analysis of data from the samples obtained in step (e), wherein the analysis establishes baseline samples, test samples, or both, for monitoring,
wherein the site of intake is a site for intake of water desalination plants.

17. The method of claim 15, wherein step (b) occurs prior to discharge and the analysis of the samples establishes the baseline samples for monitoring.

18. The method of claim 15, wherein step (b) initially occurs after any discharge and the analysis of the samples establishes the baseline samples for monitoring.

19. The method of claim 15, wherein obtaining the samples from the natural marine water-body at the monitoring sites establishes the test samples for monitoring.

20. The method of claim 15, wherein the baseline samples and the test samples are obtained from the natural marine water-body at the monitoring sites daily, every three months, annually, or a combination thereof.

21. The method of claim 15, wherein the natural marine water-body is sustainable when the data from the test samples correspond to between about 90% and 100% of the data from the baseline samples, establishing zero or minimal impact of the discharge, intake, or both.

22. The method of claim 15, wherein the natural marine water-body is moderately sustainable when the data from the test samples correspond to between about 80% and about 90% of the data from the baseline samples, establishing moderate impact of the discharge, intake, or both.

23. The method of claim 15, wherein the natural marine water-body is marginally or partially sustainable when the data from the test samples correspond to between about 70% and about 80% of the data from the baseline samples, establishing partial or noticeable impact of the discharge.

24. The method of claim 15, wherein the natural marine water-body is not sustainable when the data from the test samples correspond to below about 70% of the data from the baseline samples, establishing alarming impact of the discharge.

* * * * *